(12) United States Patent
Shmunis et al.

(10) Patent No.: US 11,743,225 B2
(45) Date of Patent: Aug. 29, 2023

(54) SYSTEMS AND METHODS FOR CONVERTING EMAILS TO CHAT CONVERSATIONS

(71) Applicant: RingCentral, Inc., Belmont, CA (US)

(72) Inventors: Vladimir Shmunis, Incline Village, NV (US); Vlad Vendrow, Reno, NV (US); Patrice Khawam, San Francisco, CA (US); Christopher van Rensburg, Foster City, CA (US); Theodore Jaffe, Hillsborough, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 15/640,357

(22) Filed: Jun. 30, 2017

(65) Prior Publication Data

US 2019/0007362 A1 Jan. 3, 2019

(51) Int. Cl.
*H04L 51/56* (2022.01)
*H04L 51/046* (2022.01)
*H04L 51/04* (2022.01)
*H04L 51/216* (2022.01)

(52) U.S. Cl.
CPC .............. *H04L 51/56* (2022.05); *H04L 51/04* (2013.01); *H04L 51/046* (2013.01); *H04L 51/216* (2022.05)

(58) Field of Classification Search
CPC .............................. H04L 51/36; H04L 51/046
See application file for complete search history.

(56) References Cited

U.S. PATENT DOCUMENTS

| | | | |
|---|---|---|---|
| 8,341,532 B2 | 12/2012 | Ryan et al. | |
| 8,438,225 B2 * | 5/2013 | Serr | G06Q 10/00 709/204 |
| 2001/0037314 A1 * | 11/2001 | Ishikawa | G06Q 20/3674 705/67 |
| 2015/0032829 A1 * | 1/2015 | Barshow | H04L 51/16 709/206 |
| 2016/0065519 A1 * | 3/2016 | Waltermann | H04L 51/16 709/206 |
| 2016/0323235 A1 * | 11/2016 | Lindsay | H04L 51/36 |
| 2018/0217848 A1 * | 8/2018 | Garai | G06F 9/451 |

OTHER PUBLICATIONS

Canadian Office Action dated Dec. 17, 2019, in counterpart Canadian Application No. 2,999,572.
Canadian Office Action dated Jun. 21, 2022, in counterpart Canadian Application No. 2,999,572.

* cited by examiner

*Primary Examiner* — Hua Fan
(74) *Attorney, Agent, or Firm* — Finnegan, Henderson, Farabow, Garrett & Dunner, LLP

(57) ABSTRACT

The present disclosure relates to systems and methods for automatically converting one or more emails to one or more chat conversations and for automatically converting a chat conversation to an email thread.

6 Claims, 72 Drawing Sheets

2200
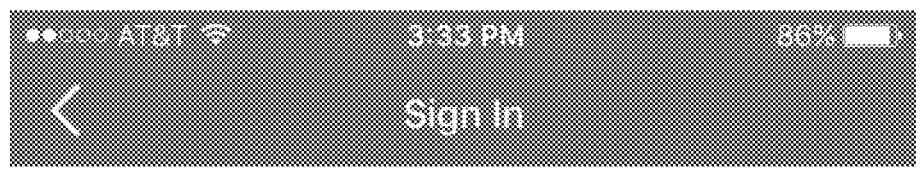
Email — 2201
Password — 2203
By signing in, you agree to the Terms of Service and Privacy Policy.
 — 2205
Forgot your password?
——— Or Sign In With ———
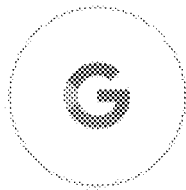 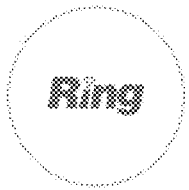 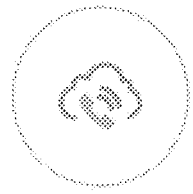
Google    RingCentral    Office@Hand
No account? Create one for free.
FIG. 22

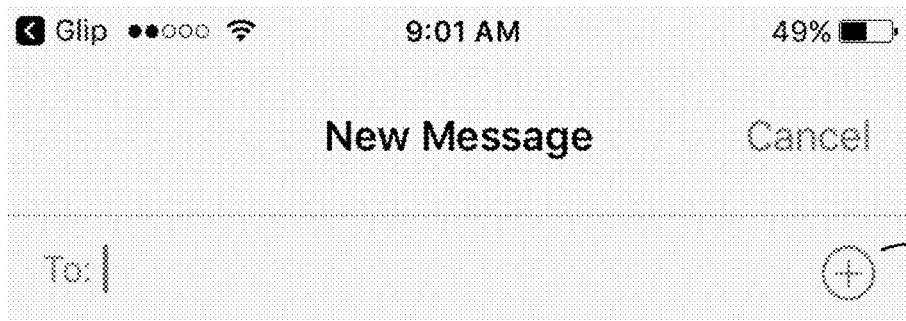
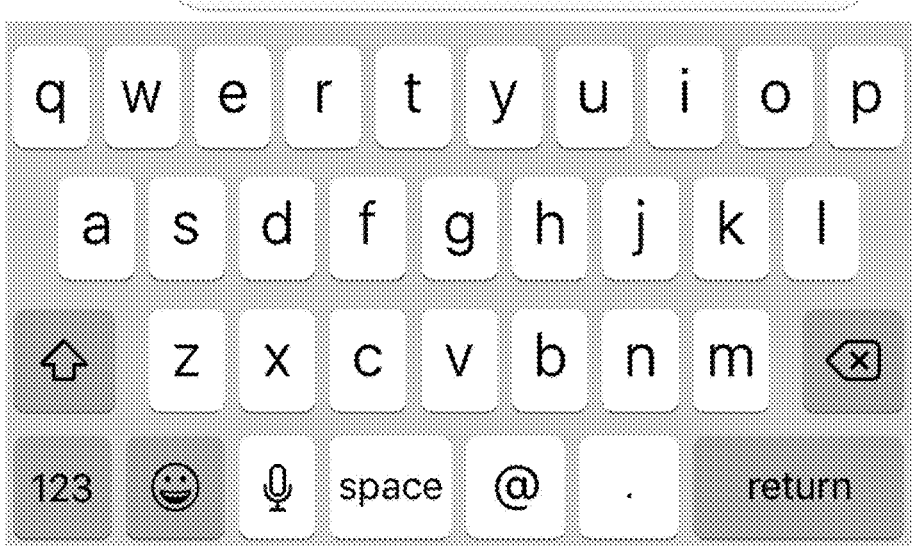
FIG. 25

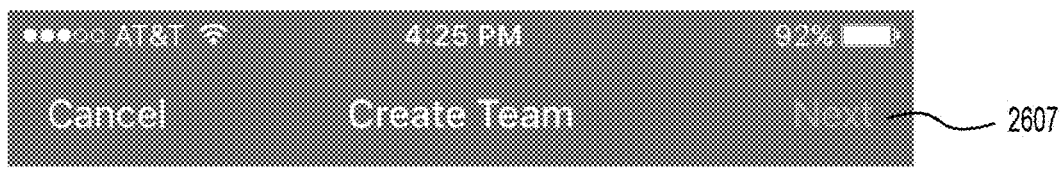
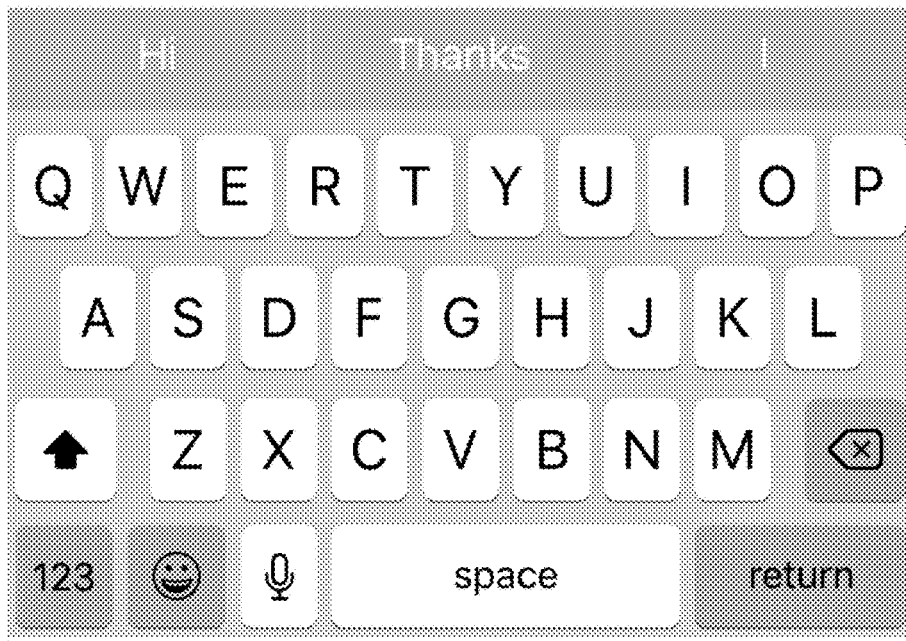
FIG. 26

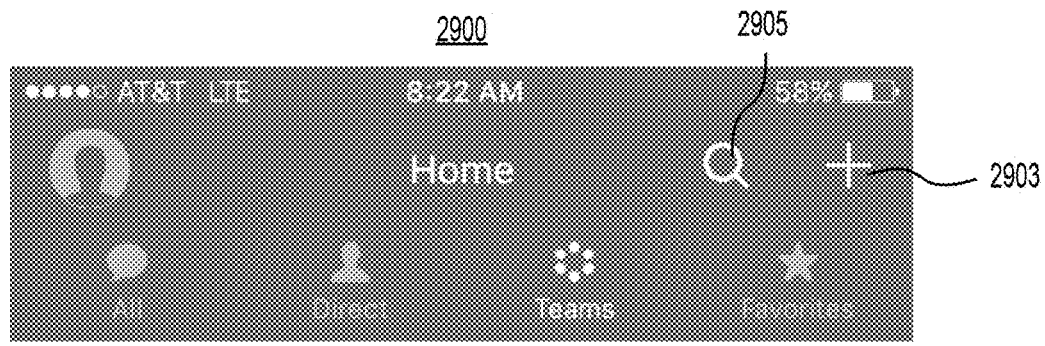
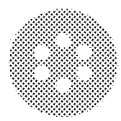
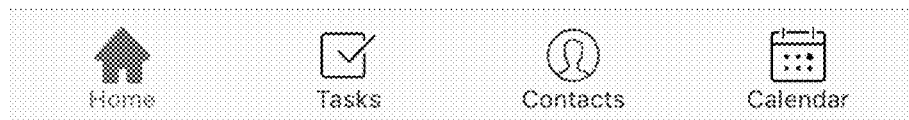
FIG. 29

FIG. 38

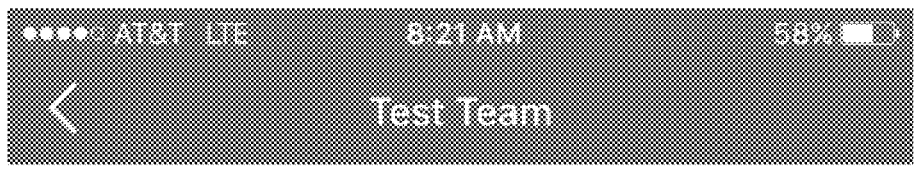
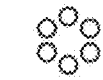     
Events (0)
 Add Event — 3901
FIG. 39

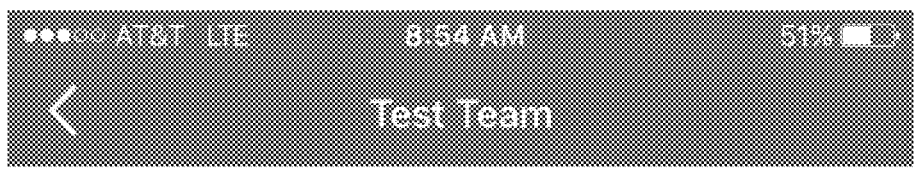
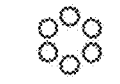
FIG. 40

4100
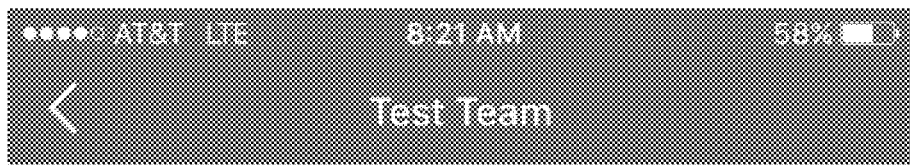
Notes (0)
 Add Note ~ 4101
FIG. 41

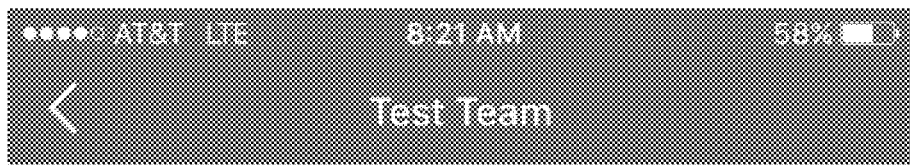
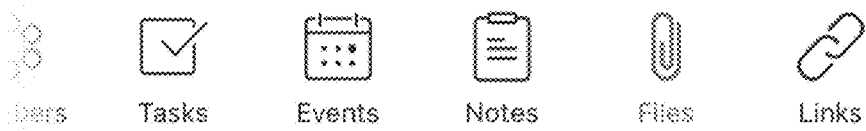
FIG. 42

4600
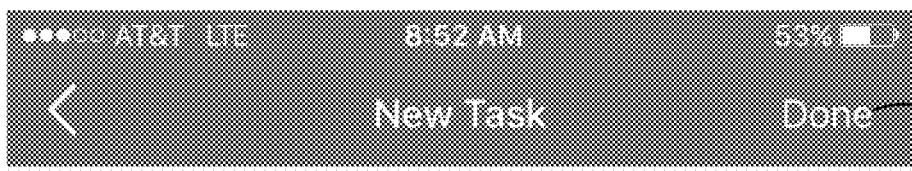# — 4615
Write patent application — 4601
Start Date 5/9/17 — 4603
Due Date 5/31/17 — 4605
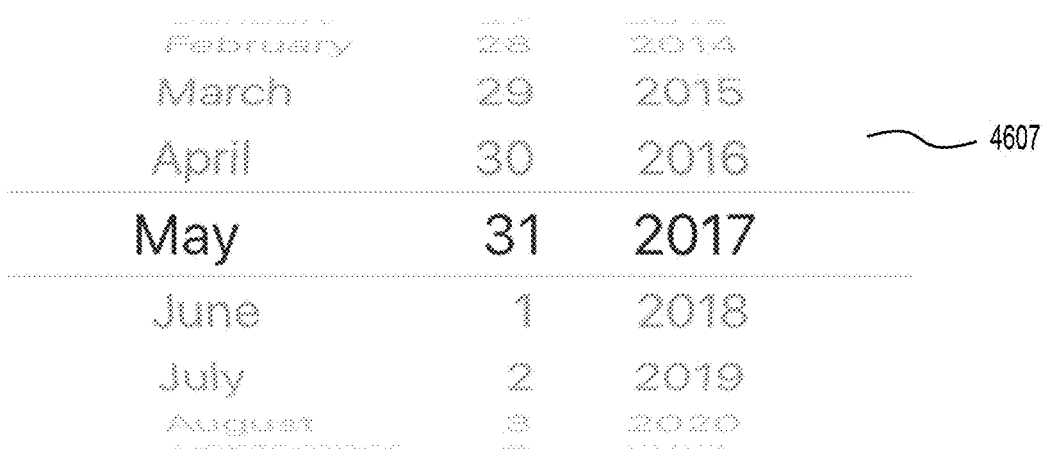 — 4607
Due Time — 4609
Repeat Never > — 4611
Complete When Checked > — 4613
FIG. 46

4700
| | |
|---|---|
| Start Date | 5/9/17 — 4701 |
| Due Date | 5/31/17 — 4703 |
| Due Time | 9:52 AM — 4705 |
| Repeat | Never > — 4707 |
| Complete When | Checked > — 4709 |
Color 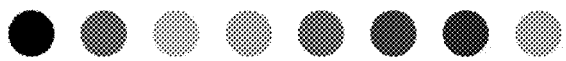 — 4711
Section — 4713
Add a description... — 4715
FIG. 47

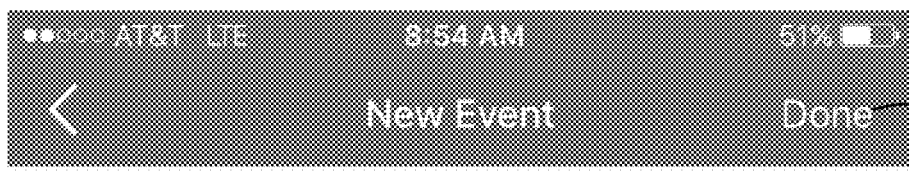
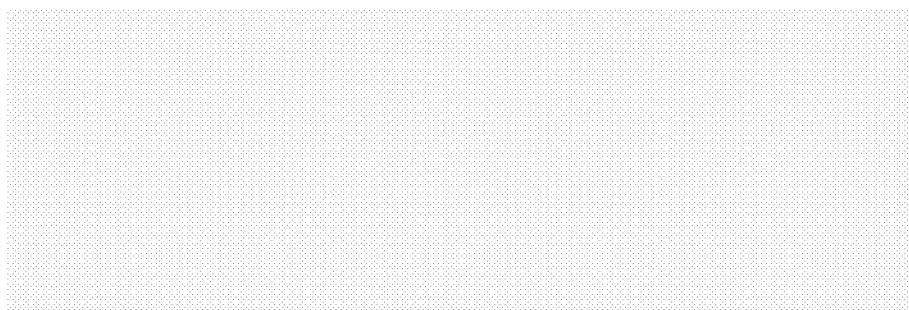
*FIG. 48*

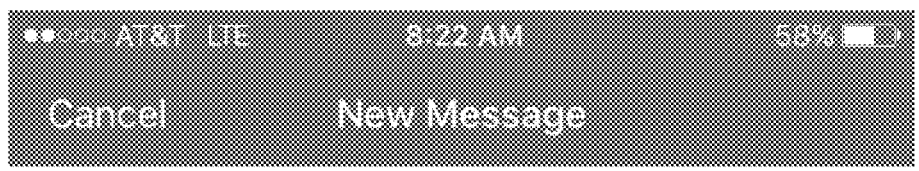
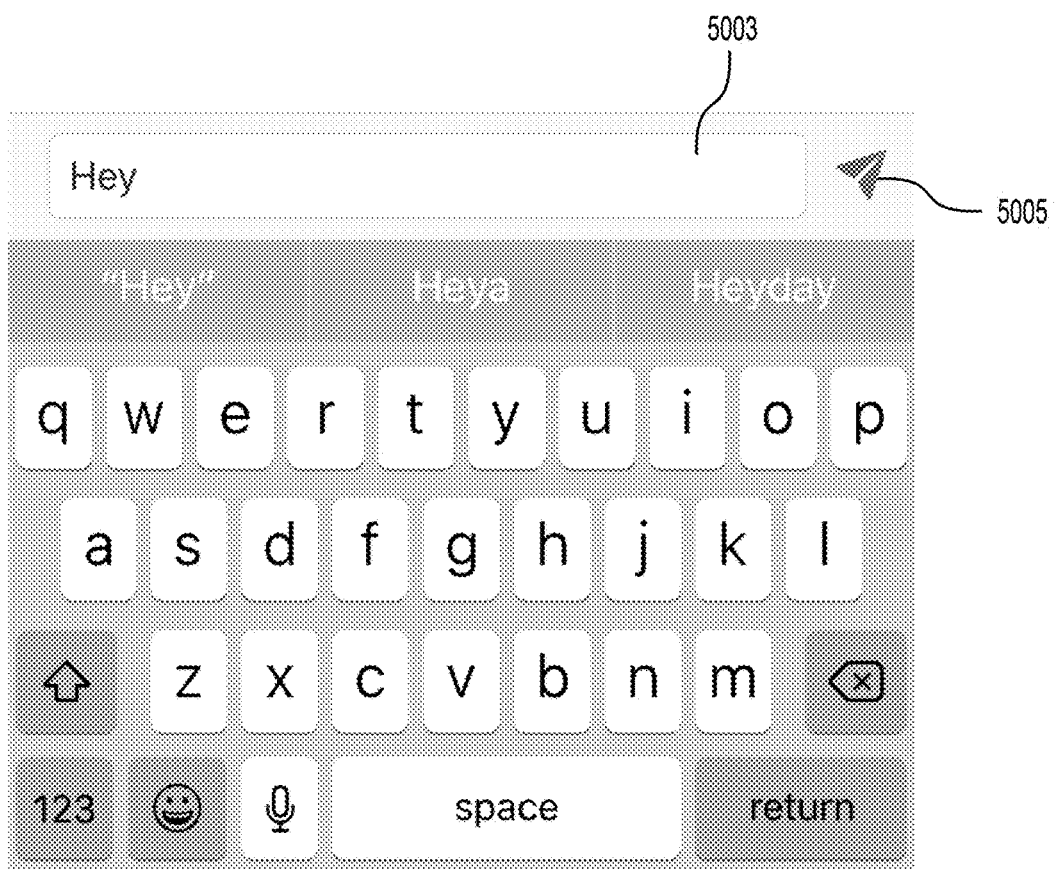
FIG. 50

5800
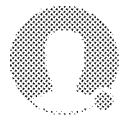 alexander.zajac@finnegan.com (me)
Hey                                                   8:22 AM
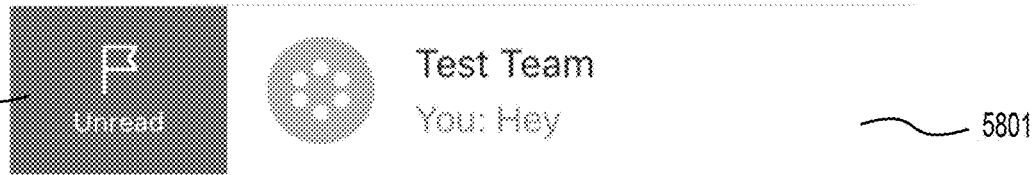
5803 — (Unread)    Test Team
                   You: Hey                          — 5801
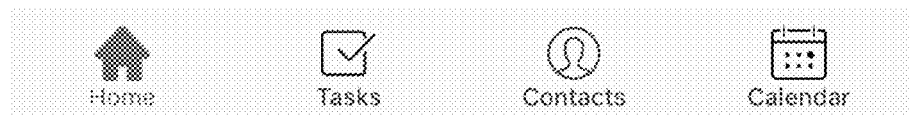
FIG. 58

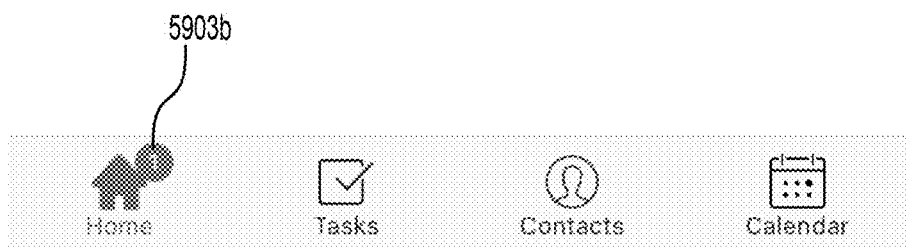
FIG. 59

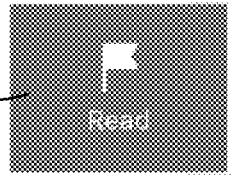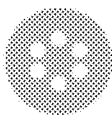
FIG. 60

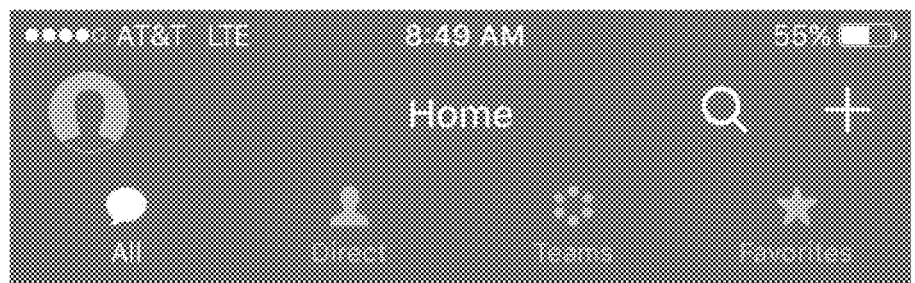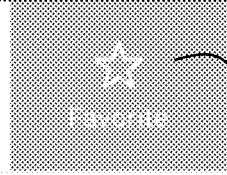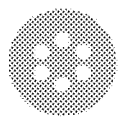
FIG. 61

 alexander.zajac@finnegan.com (me) — 6203
Hey                                    8:22 AM
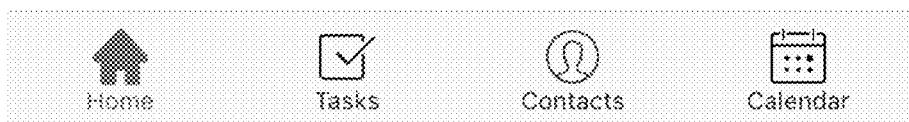
FIG. 62

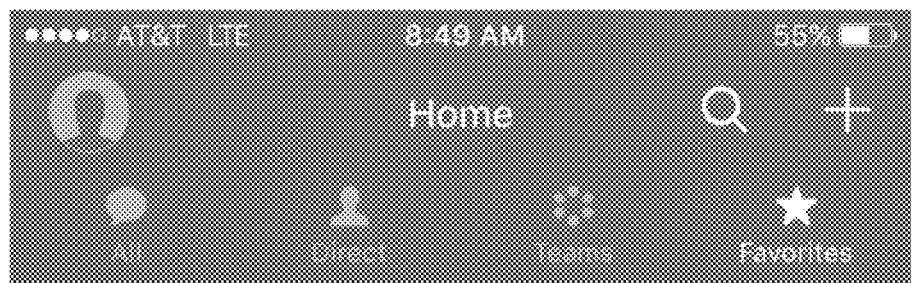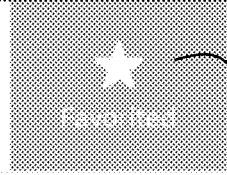
FIG. 63

6400
6401
6403
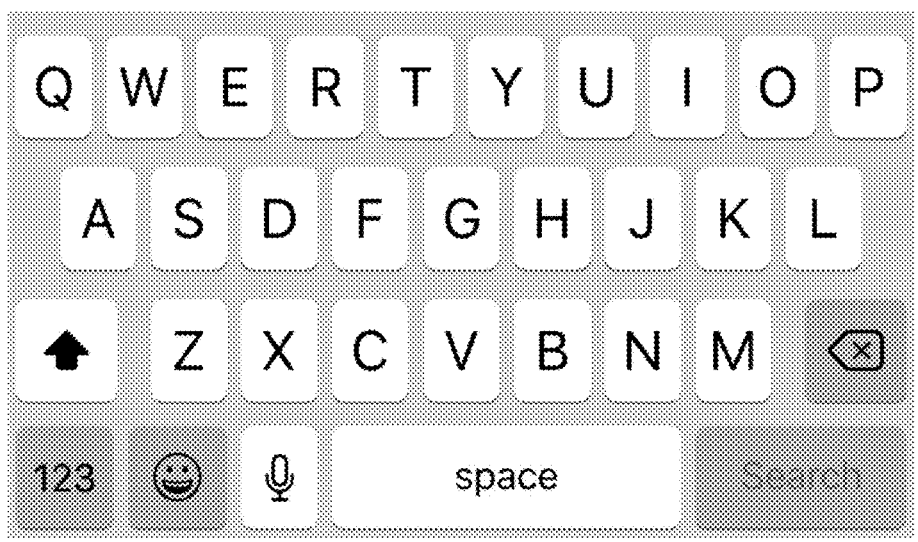
FIG. 64

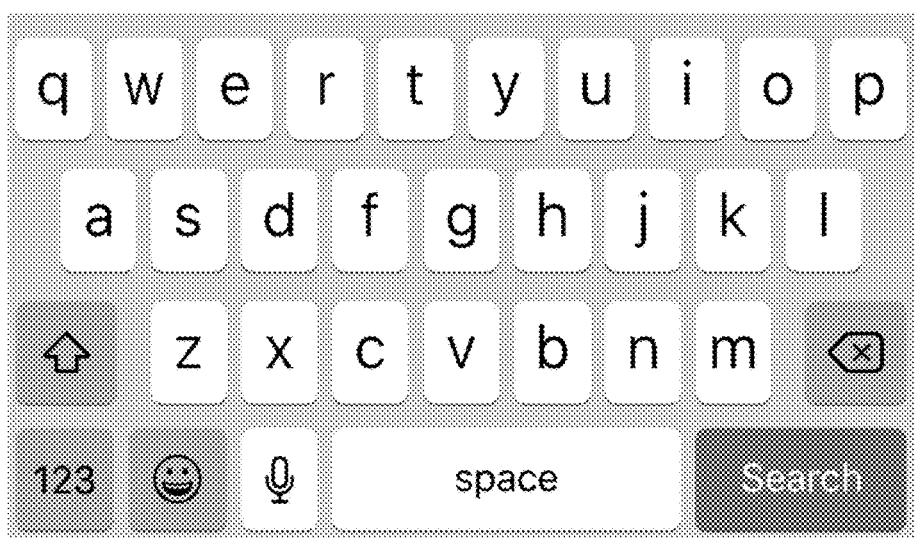
FIG. 65

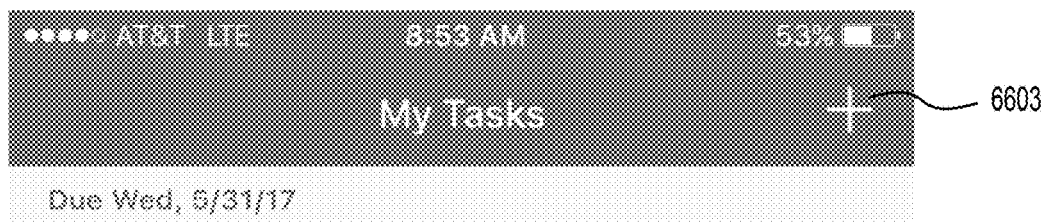
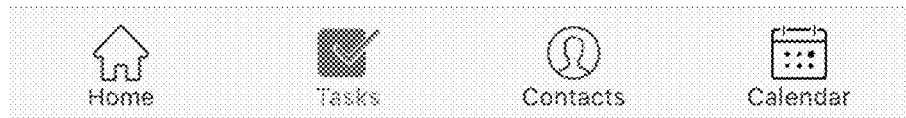
FIG. 66

SYSTEMS AND METHODS FOR CONVERTING EMAILS TO CHAT CONVERSATIONS

TECHNICAL FIELD

The present disclosure relates generally to the field of computer-supported collaborative work between plural users. More specifically, and without limitation, this disclosure relates to systems and methods for automatically converting one or more emails to one or more chat conversations in collaborative communications environments.

BACKGROUND

Within and across organizations, users are often presented with a variety of tools to facilitate collaborative communications. However, it can be difficult to manage chat conversations and sharing of content across various tools. For example, users may utilize one application to manage their email threads and a separate application to manage their chat conversations.

Such differentiation may make effective collaboration difficult. For example, a user may have to manually import portions of an email thread into a chat conversation or manually move files shared within a chat conversation to an email thread. As a result, there is a need for systems and methods that more fully integrate a variety of collaborative tools.

SUMMARY

In view of the foregoing, embodiments of the present disclosure provide systems and methods for providing integrated collaboration tools to users. In accordance with some embodiments, users may associate tasks, events, files, links, and the like with chat groups. Moreover, users may create teams having a plurality of users and associate tasks, events, files, links, and the like with teams. In some embodiments, users may also convert an email thread to one or more chat groups and/or convert a chat conversation to an email thread.

According to an example embodiment of the present disclosure, a system for creating a chat group based on one or more emails is described. The system may include a memory storing instructions and a processor configured to execute the instructions to: receive an email thread having at least one email, receive a request to generate a chat conversation, determine a plurality of recipients from the email thread, and initiate a chat conversation based on the plurality of recipients.

According to another example embodiment of the present disclosure, a method for creating a chat group based on one or more emails is described. The method may include receiving an email thread having at least one email, receiving a request to generate a chat conversation, determining a plurality of recipients from the email thread, and initiating a chat conversation based on the plurality of recipients.

According to an example embodiment of the present disclosure, a system for creating a chat conversation based on one or more emails is described. The system may include a memory storing instructions and a processor configured to execute the instructions to: receive an email thread having at least one email, receive a request to generate a chat conversation, determine a plurality of recipients from the email thread, create a chat conversation based on the plurality of recipients, and populate initial content of the chat conversation based on at least a portion of content from the email thread.

According to another example embodiment of the present disclosure, a method for creating a chat conversation based on one or more emails is described. The method may include receiving an email thread having at least one email, receiving a request to generate a chat conversation, determining a plurality of recipients from the email thread, creating a chat conversation based on the plurality of recipients, and populating initial content of the chat conversation based on at least a portion of content from the email thread.

According to yet another example embodiment of the present disclosure, a system for automatically converting one or more emails to one or more chat conversations is described. The system may include a memory storing instructions and a processor configured to execute the instructions to: receive an email thread having at least one email, receive a request to convert the email thread to a chat conversation, determine a plurality of recipients from the email thread, parse the email thread to determine one or more conversation flows, and generate one or more chat conversations based on the plurality of recipients and the one or more conversation flows.

According to another example embodiment of the present disclosure, a method for automatically converting one or more emails to one or more chat conversations is described. The method may include receiving an email thread having at least one email, receiving a request to convert the email thread to a chat conversation, determining a plurality of recipients from the email thread, parsing the email thread to determine one or more conversation flows, and generating one or more chat conversations based on the plurality of recipients and the one or more conversation flows.

According to an example embodiment of the present disclosure, a system for automatically converting a chat conversation to an email thread is described. The system may include a memory storing instructions and a processor configured to execute the instructions to: receive a chat conversation, receive a request to convert the chat conversation to an email thread, determine a plurality of recipients from the chat conversation, parse the chat conversation into an email thread, and transmit the email thread to an email host.

According to another example embodiment of the present disclosure, a method for automatically converting a chat conversation to an email thread is described. The method may include receiving a chat conversation, receiving a request to convert the chat conversation to an email thread, determining a plurality of recipients from the chat conversation, parsing the chat conversation into an email thread, and transmitting the email thread to an email host.

According to an example embodiment of the present disclosure, a system for authenticating a user of a collaboration service is described. The system may include a memory storing instructions and a processor configured to execute the instructions to: receive an identifier, compare the identifier to a database of known identifiers, and control access to the collaboration service based on the comparison.

According to another example embodiment of the present disclosure, a method for authenticating a user of a collaboration service is described. The method may include receiving an identifier, comparing the identifier to a database of known identifiers, and controlling access to the collaboration service based on the comparison.

According to an example embodiment of the present disclosure, a system for confirming a user of a collaboration service is described. The system may include a memory storing instructions and a processor configured to execute the instructions to: receive an email or request from a user, generate a response having a unique confirmation code, send the response having the confirmation code to the user, receive a code from the user, compare the code from the user to the confirmation code, and control access to the collaboration service based on the comparison.

According to another example embodiment of the present disclosure, a method for confirming a user of a collaboration service is described. The method may include receiving an email or request from a user, generating a response having a unique confirmation code, sending the response having the confirmation code to the user, receiving a code from the user, comparing the code from the user to the confirmation code, and controlling access to the collaboration service based on the comparison.

According to an example embodiment of the present disclosure, a system for automatically inviting a user to join a collaboration service is described. The system may include a memory storing instructions and a processor configured to execute the instructions to: determine that a contact does not have an account with the collaboration service, generate a message addressed to the contact and having a link to register for the collaboration service, and transmit the message to the contact.

According to yet another example embodiment of the present disclosure, a method for automatically inviting a user to join a collaboration service is described. The method may include determining that a contact does not have an account with the collaboration service, generating a message addressed to the contact and having a link to register for the collaboration service, and transmitting the message to the contact.

According to an example embodiment of the present disclosure, a system for creating a collaborative team is described. The system may include a memory storing instructions and a processor configured to execute the instructions to: receive at least one potential team member, receive a request to create a team, create the team, add the at least one potential team member to the team, and set permissions for members of the team.

According to another example embodiment of the present disclosure, a method for creating a collaborative team is described. The method may include receiving at least one potential team member, receiving a request to create a team, creating the team, adding the at least one potential team member to the team, and setting permissions for the added members.

According to an example embodiment of the present disclosure, a system for altering a collaborative team is described. The system may include a memory storing instructions and a processor configured to execute the instructions to: receive at least one contact from a user, receive a request to alter the team from the user, verify the user has permission to alter the collaborative team, and alter the team based on the at least one contact and the request.

According to another example embodiment of the present disclosure, a method for altering a collaborative team is described. The method may include receiving at least one contact from a user, receiving a request to alter the team from the user, verifying the user has permission to alter the collaborative team, and altering the team based on the at least one contact and the request.

According to an example embodiment of the present disclosure, a system for creating a note is described. The system may include a memory storing instructions and a processor configured to execute the instructions to: receive text content, receive a title, receive a request to add a note, and create the note based on the text content and the title.

According to another example embodiment of the present disclosure, a method for creating a note is described. The method may include receiving text content, receiving a title, receiving a request to add a note, and creating the note based on the text content and the title.

According to an example embodiment of the present disclosure, a system for creating a task or event is described. The system may include a memory storing instructions and a processor configured to execute the instructions to: receive a date, receive a title, receive a request to add a task or event, and create the task or event based on the date and the title.

According to another example embodiment of the present disclosure, a method for creating a task or event is described. The method may include receiving a date, receiving a title, receiving a request to add a task or event, and creating the task or event based on the date and the title.

According to an example embodiment of the present disclosure, a system for automatically facilitating file uploads in a chat conversation is described. The system may include a memory storing instructions and a processor configured to execute the instructions to: receive a chat message within a chat conversation, automatically detect that the chat message includes at least one file, and add the at least one file to a repository associated with the chat conversation.

According to another example embodiment of the present disclosure, a method for automatically facilitating file uploads in a chat conversation is described. The method may include receiving a chat message within a chat conversation, automatically detecting that the chat message includes at least one file, and adding the at least one file to a repository associated with the chat conversation.

According to an example embodiment of the present disclosure, a system for automatically collating links in a chat conversation is described. The system may include a memory storing instructions and a processor configured to execute the instructions to: receive a chat message within a chat conversation, automatically detect that the chat message includes at least one link, and add the at least one link to a repository associated with the chat conversation.

According to yet another example embodiment of the present disclosure, a method for automatically collating links in a chat conversation is described. The method may include receiving a chat message within a chat conversation, automatically detecting that the chat message includes at least one link, and adding the at least one link to a repository associated with the chat conversation.

According to an example embodiment of the present disclosure, a system for facilitating messaging between users is described. The system may include a memory storing instructions and a processor configured to execute the instructions to: receive at least one recipient, receive content, generate a message addressed to the at least one recipient and having the content, and transmit the message to the at least one recipient.

According to another example embodiment of the present disclosure, a method for facilitating messaging between users is described. The method may include receiving at least one recipient, receiving content, generating a message addressed to the at least one recipient and having the content, and transmitting the message to the at least one recipient.

According to an example embodiment of the present disclosure, a system for facilitating reactions to messages between users is described. The system may include a memory storing instructions and a processor configured to execute the instructions to: receive from a user a selection of at least one message having a plurality of recipients, receive a request to react to the selection, record the reaction in response to the request, and display the reaction with the selection to the user.

According to another example embodiment of the present disclosure, a method for facilitating reactions to messages between users is described. The method may include receiving from a user a selection of at least one message having a plurality of recipients, receiving a request to react to the selection, recording the reaction in response to the request, and displaying the reaction with the selection to the user.

According to an example embodiment of the present disclosure, a system for changing a status of a conversation or a message is described. The system may include a memory storing instructions and a processor configured to execute the instructions to: receive from a user a selection of at least one conversation or at least one message, receive a request to alter a status of the selection, record the altered status in response to the request, and display the altered status with the selection to the user.

According to another example embodiment of the present disclosure, a method for changing a status of a conversation or a message is described. The method may include receiving from a user a selection of at least one conversation or at least one message, receiving a request to alter a status of the selection, recording the altered status in response to the request, and displaying the altered status with the selection to the user.

According to an example embodiment of the present disclosure, a system for displaying events and tasks in a graphical format is described. The system may include a memory storing instructions and a processor configured to execute the instructions to: receive at least one event or task, automatically extract at least one date, at least one time, and at least one title from the received events or tasks, generate a graphical display including the extracted dates, times, and titles, and transmit the graphical display to a user device.

According to another example embodiment of the present disclosure, a method for displaying events and tasks in a graphical format is described. The method may include receiving at least one event or task, automatically extracting at least one date, at least one time, and at least one title from the received events or tasks, generating a graphical display including the extracted dates, times, and titles, and transmitting the graphical display to a user device.

According to an example embodiment of the present disclosure, a system for converting a chat conversation to an audio or video conference is described. The system may include a memory storing instructions and a processor configured to execute the instructions to: receive a selection of a chat message having a plurality of recipients, receive a request to initiate an audio or video conference, initiate an audio or video conference in response to the request, and notify the plurality of recipients of the initiation.

According to another example embodiment of the present disclosure, a method for converting a chat conversation to an audio or video conference is described. The method may include receiving a selection of a chat message having a plurality of recipients, receiving a request to initiate an audio or video conference, initiating an audio or video conference in response to the request, and notifying the plurality of recipients of the initiation.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings:

FIG. 22 is an example graphical user interface (GUI) for authenticating a user of a collaboration service, according to yet another example embodiment of the present disclosure.

FIG. 25 is an example graphical user interface (GUI) including an example text message having a link to register for a collaboration service, according to yet another example embodiment of the present disclosure.

FIG. 26 is an example graphical user interface (GUI) for creating a collaborative team, according to yet another example embodiment of the present disclosure.

FIG. 29 is an example graphical user interface (GUI) for displaying a list of collaborative teams, according to yet another example embodiment of the present disclosure.

FIG. 38 is an example graphical user interface (GUI) for receiving a request to add a task associated with a team and/or with one or more recipients, according to yet another example embodiment of the present disclosure.

FIG. 39 is an example graphical user interface (GUI) for receiving a request to add an event associated with a team and/or with one or more recipients, according to yet another example embodiment of the present disclosure.

FIG. 40 is an example graphical user interface (GUI) for displaying a list of events (or tasks) associated with a team, according to yet another example embodiment of the present disclosure.

FIG. 41 is an example graphical user interface (GUI) for receiving a request to add a note associated with a team and/or with one or more recipients, according to yet another example embodiment of the present disclosure.

FIG. 42 is an example graphical user interface (GUI) for displaying a list of files associated with a team, according to yet another example embodiment of the present disclosure.

FIG. 46 is an example graphical user interface (GUI) for creating a task, according to yet another example embodiment of the present disclosure.

FIG. 47 is another example graphical user interface (GUI) for creating a task, according to yet another example embodiment of the present disclosure.

FIG. 48 is an example graphical user interface (GUI) for creating an event, according to yet another example embodiment of the present disclosure.

FIG. 50 is another example graphical user interface (GUI) for sending a message to at least one recipient, according to yet another example embodiment of the present disclosure.

FIG. 58 is an example graphical user interface (GUI) for receiving a request to alter a status of a conversation, according to yet another example embodiment of the present disclosure.

FIG. 59 is an example graphical user interface (GUI) for displaying one or more messages associated with a team having an altered status, according to yet another example embodiment of the present disclosure.

FIG. 60 is another example graphical user interface (GUI) for receiving a request to alter a status of a conversation, according to yet another example embodiment of the present disclosure.

FIG. 61 is yet another example graphical user interface (GUI) for receiving a request to alter a status of a conversation, according to yet another example embodiment of the present disclosure.

FIG. 62 is another example graphical user interface (GUI) for displaying a list of one or more messages with an altered status, according to yet another example embodiment of the present disclosure.

FIG. 63 is yet another example graphical user interface (GUI) for receiving a request to alter a status of a conversation, according to yet another example embodiment of the present disclosure.

FIG. 64 is an example graphical user interface (GUI) for searching teams, contacts, and/or messages, according to yet another example embodiment of the present disclosure.

FIG. 65 is another example graphical user interface (GUI) for searching teams, contacts, and/or messages, according to yet another example embodiment of the present disclosure.

FIG. 66 is an example graphical user interface (GUI) for displaying a list of tasks (or events) associated with a user, according to yet another example embodiment of the present disclosure.

DETAILED DESCRIPTION

Figure 1:
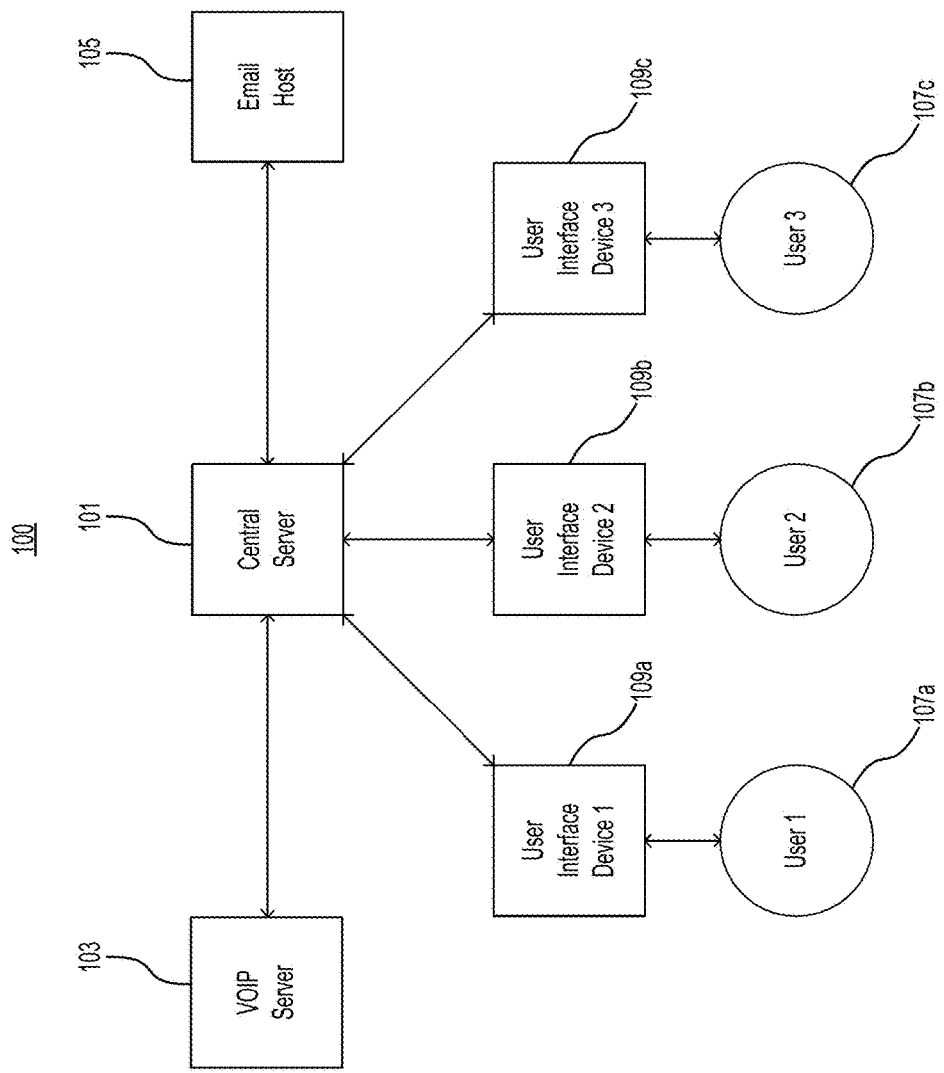
FIG. 1 is a diagram of an example system for collaboration, according to an example embodiment of the present disclosure.

The disclosed embodiments relate to systems and methods for providing integrated collaboration tools to users. Advantageously, disclosed embodiments may allow for users to associate tasks, events, files, links, and the like with chat groups. Additionally, embodiments of the present disclosure may allow users to create teams having a plurality of users and associate tasks, events, files, links, and the like with teams. In some embodiments, users may also convert an email thread to one or more chat groups and/or convert a chat conversation to an email thread, which may simplify real-time collaboration. Herein, an email thread may refer to one or more email messages.

According to an embodiment of the present disclosure, a processor may create a chat group based on one or more emails in an email thread. For example, the processor may receive an email thread having at least one email. In certain aspects, the email thread may be one email with quoted text from previous emails. In other aspects, the email thread may be a plurality of emails. In such aspects, at least some of the emails within the plurality may be connected by a common subject and/or recipients. Similarly, at least some of the emails may be unrelated either by subject or by recipients.

In certain aspects, a user may send the email thread to the processor via file upload. For example, the user may save the email thread as one or more .msg files, and then the processor may receive the .msg files either directly from one or more storage devices (e.g., via Integrated Drive Electronics (IDE), Serial AT Attachment (SATA), Small Computer System Interface (SCSI), Serial SCSI, Universal System Bus (USB), or the like) or over one or more networks (e.g., the Internet, Local Area Network (LAN), Wi-Fi, 4G, or the like).

In other aspects, a user may send the email thread to the processor by sending an authorization for the processor to retrieve the email thread from an email host. For example, a user may send to the processor a username and password for accessing the email host and an indication of which emails on the email host are to be included in the email thread. The processor may then retrieve the emails from the email host using the authorization. The processor and the email host may reside on one or more servers together and/or on one or more different servers.

According to an aspect of the present disclosure, the processor may receive a request to generate a chat conversation. For example, the user may use one or more buttons on a GUI to submit this request. By way of further example, the user may submit the request concurrently with the email thread. Similar to the email thread, the processor may receive the request directly or may receive it over one or more networks.

In certain aspects, a user may send the email thread to the processor by forwarding an email comprising the email thread to a dedicated email address or by sending an email to the dedicated email address with the email thread attached. In such aspects, the email host configured to receive email addressed to the dedicated email address may be further configured to send the forwarded email thread (or the attached email thread) and the request to generate a chat conversation to the processor. In this case, the processor and the email host may reside on one or more servers together and/or on one or more different servers, and the processor may receive the email thread and the request directly or may receive it over one or more networks.

According to an aspect of the present disclosure, the processor may determine a plurality of recipients from the email thread. For example, the processor may determine the recipients by extracting email addresses from the "To", "From", carbon copy ("CC"), and/or blind carbon copy ("BCC") fields within one or more emails in the email thread. By way of further example, the processor may parse text within one or more emails in the thread (whether quoted text or body text) to determine one or more recipients. The processor may parse the text directly for one or more email addresses and/or may parse the text for context clues. For example, the processor may parse the text for names (or partial names or nicknames or the like) that are included in a contact list maintained by the user. Such a contact list may allow the processor to map the parsed names to email addresses associated with the parsed names.

According to an aspect of the present disclosure, the processor may initiate a chat conversation based on the plurality of recipients. For example, the processor may activate a synchronous conferencing protocol or an asynchronous conferencing protocol. The processor may automatically add one or more of the recipients to the chat conversation. Alternatively, the processor may automatically notify one or more of the recipients of the chat conversation and request a response. For example, the processor may automatically add the user to the chat conversation and then send an invite to the remaining recipients asking them to join the chat conversation. In this example, the remaining recipients may either accept the invite and be added to the chat conversation or reject the invite and not be added to the chat conversation. For example, a recipient may use one or more buttons on a GUI to accept or reject the invite.

According to another embodiment of the present disclosure, a processor may receive an email thread having at least one email, receive a request to generate a chat conversation, determine a plurality of recipients from the email thread, and create a chat conversation based on the plurality of recipients, as described above. In some examples, the system may use machine learning to parse the text and determine which recipients to include or exclude in the chat conversation. For example, the email thread may contain correspondence between the recipients indicating that recipients A, B, and D should continue the discussion in chat, whereas recipient C should be excluded from the chat.

According to an aspect of the present disclosure, the processor may populate initial content of the chat conversation based on at least a portion of content from the email thread. For example, the processor may parse the email thread for text, files, and/or links. The processor may identify text sent from one recipient to at least one other recipient within the email thread and pre-populate the chat conversation with a chat comprising the identified text from the one recipient to the other recipients. The processor may also identify files and/or links sent from one recipient to at least one other recipient within the email thread and pre-populate the chat conversation with a chat message having the identified file(s) as attached and/or the identified link(s) as hyperlinks.

According to another embodiment of the present disclosure, a processor may automatically convert one or more emails to one or more chat conversations. For example, the processor may receive an email thread having at least one email, receive a request to convert the email thread to a chat conversation, and determine a plurality of recipients from the email thread, as described above.

According to an aspect of the present disclosure, the processor may parse the email thread to determine one or more conversation flows. For example, the processor may determine a temporal flow within the email thread by ranking the emails within the thread based on timestamps indicating when the emails were sent and/or timestamps indicating when the emails were received. The timestamps may be directly extracted from quoted text in the emails within the thread or from metadata of the emails within the thread.

The timestamps may also be extracted from context clues based on text within the emails. For example, text within the emails may refer back to previous portions of the conversation or may state that a follow-up will be forthcoming. The processor may map these context clues to particular emails or to quoted text within one or more emails and then construct a conversation timeline based on the context clues and the mapping. The timeline may comprise one line or may be multi-lined. For example, if the email thread split into two sub-groups of recipients with concurrent emails exchanged within the sub-groups, the processor may construct a fork within the timeline representing a split in the temporal flow. The fork may represent a divide between a main timeline and a tributary timeline.

In certain aspects, the processor may determine a logical flow within the email thread based on conversation dynamics. For example, context clues within the emails may indicate if a particular email or particular piece of quoted text is related to one or more subjects. The one or more subjects may be from a pre-populated list or may be derived on-the-fly by the processor. Based on this subject categorization, the processor may construct a conversation map of the logical flow within the email thread. The map may comprise one thread or may be multi-threaded. For example, if a side conversation ensues within an email thread, the processor may construct a fork within the map representing a split in the logical flow. The fork may represent a divide between a main map and a tributary map.

Any of the above algorithms for determining a temporal flow or a logical flow may be enhanced with machine learning. For example, the processor may be seeded with a learning library or construct a learning library on-the-fly which then allows for the algorithm (and/or the library) to be updated each time it is used. Other machine learning approaches are also possible, for example, neural networks, Bayesian networks, deep learning, or the like. In some examples, the system may use machine learning to rank the confidence of each temporal flow or logical flow based on training from a learning library. In further examples, the machine learning algorithm may incorporate input from the users associated with a temporal flow or logical flow to add temporal flows or logical flows that users rank as accurate to the learning library.

According to an aspect of the present disclosure, the processor may generate one or more chat conversations based on the plurality of recipients and the one or more conversation flows. For example, the processor may activate a synchronous conferencing protocol or an asynchronous conferencing protocol. The processor may automatically add one or more of the recipients to the chat conversation. Alternatively, the processor may automatically notify one or more of the recipients of the chat conversation and request a response. For example, the processor may automatically add the user to the chat conversation and then send an invite to the remaining recipients asking them to join the chat conversation. In this example, the remaining recipients may either accept the invite and be added to the chat conversation or reject the invite and not be added to the chat conversation. For example, a recipient may use one or more buttons on a GUI to accept or reject the invite.

Furthermore, the processor may pre-populate the chat conversation based on the one or more conversation flows. For example, the processor may generate chat messages between recipients that contain portions of the email thread in an order determined by the conversation flows. For example, if the conversation flow is temporal, the order may follow the constructed conversation timeline. Similarly, if the conversation flow is logical, the order may follow the constructed conversation map.

In cases where the conversation timeline or the conversation map contains a fork, the processor may construct two chat conversations, one associated with the main timeline or map and one associated with the tributary timeline or map. If the timeline or map contains a plurality of forks, the processor may repeat this process for some or all of the forks.

In certain aspects, a conversation associated with a tributary timeline or map may include the same recipients as the conversation associated with the main timeline or map. In other aspects, a conversation associated with a tributary timeline or map may include a sub-group of the recipients of the conversation associated with the main timeline or map. In still other aspects, some or all of the recipients of a conversation associated with a tributary timeline or map may differ from the recipients of the conversation associated with the main timeline or map.

The processor may also pre-populate the conversation associated with the main timeline or map with one or more files and/or one or more links in accordance with the description above. The processor may similarly pre-populate a conversation associated with a tributary timeline or map with one or more files and/or one or more links in accordance with the description above. In such embodiments, the processor may identify a location in a conversation timeline or in a conversation map for the one or more files or links in order to determine a location within the main conversation or a tributary conversation to place the file(s) and/or link(s).

According to another embodiment of the present disclosure, a processor may automatically convert a chat conversation to an email thread. For example, the processor may receive at least one chat conversation. As described above, the processor may receive one or more files (e.g., .msg files) having the chat conversation(s) either directly from one or more storage devices or over one of more networks. Alternatively or concurrently, the processor may receive an authorization for the processor to retrieve the chat conversation(s) from one or more servers in a chat network. For example, a user may send to the processor a username and password for accessing the server(s) and an indication of which chat messages on the server(s) are to be included in the chat conversation(s). The processor may then retrieve the chat messages from the servers using the authorization. The processor may reside on one or more of the servers in the chat network and/or may reside on one or more different servers.

According to an aspect of the present disclosure, the processor may receive a request to convert the chat conversation to an email thread. For example, the user may use one or more buttons on a GUI to submit this request. By way of further example, the user may submit the request concurrently with the chat conversation(s). Similar to the chat conversation(s), the processor may receive the request directly or may receive it over one or more networks According to an aspect of the present disclosure, the processor may determine a plurality of recipients from the chat conversation. For example, the processor may determine the recipients by extracting email addresses directly from the chat conversation(s). By way of further example, the processor may extract usernames directly from the chat conversation(s) and then map the extracted usernames to email addresses associated with the usernames.

By way of further example, the processor may parse text within the chat conversation(s) to determine one or more recipients. The processor may parse the text directly for one or more email addresses and/or may parse the text for context clues. For example, the processor may parse the text for names (or partial names or nicknames or the like) that are included in a contact list maintained by the user or in a shared contact list maintained by the organization to which the user belongs. Such a contact list may allow the processor to map the parsed names to email addresses associated with the parsed names.

According to an aspect of the present disclosure, the processor may parse the chat conversation(s) into an email thread. For example, as described above, the processor may determine a temporal flow or a logical flow for the chat conversation(s) and construct a conversation timeline or conversation map therefrom. Based on this timeline or map, the processor may generate a plurality of emails between the determined recipients. For example, the processor may generate an email from a first recipient to a second recipient with a third and fourth recipient list on the CC line. In this example, the generated email may include text, files, and/or links from the chat conversation(s).

By way of further example, the plurality of emails may include one or more initial emails and include replies thereto or forwards thereof. The plurality of emails may further include replies to replies, forwards of replies, replies to forwards, forwards of forwards, or the like. In certain aspects, replies and forwards may include all of the same recipients as emails to which the replies and forwards are related or may include different recipients. In certain aspects, a reply or a forward may shift some recipients from a CC line to a BCC line or vice versa, from a CC line to the To line or vice versa, from a BCC line to the To line or vice versa, or the like.

For example, the processor may determine whether to place a recipient on a CC line, a BCC line, or a To line based on how active the recipient was in the chat conversation(s), based on context clues within the chat conversation(s), or the like. In certain aspects, the processor may receive input from the user indicating whether a recipient should be placed on a CC line, a BCC line, or a To line. The processor may also use a combination of automatic determination and user input in order to place a recipient on a CC line, a BCC line, or a To line.

According to an aspect of the present disclosure, the processor may transmit the email thread to an email host. For example, the processor may forward the email thread having at least one email to the email host for direct placement in the email accounts of the recipients. In another example, the processor may transmit the emails comprising the thread to the email host for delivery. In this way, the processor may recreate the chat conversation(s) by having emails sent between the recipients that mimic the chat messages that were sent between the recipients. The processor may use a combination of forwarding the email thread and transmitting the emails for delivery in order to recreate or reconstruct the chat conversation(s).

According to another embodiment of the present disclosure, a processor may authenticate a user before executing requests from the user, as described both above and below. For example, a processor may receive an identifier from a user. In certain aspects, the identifier may comprise a known identity, e.g., a username, an email address, or the like. The identifier may further comprise an authenticator, for example, a password, a PIN, biometric data, or the like.

The processor may receive the identifier using one or more graphical user interfaces (GUIs). For example, the processor may use GUI 2200 of FIG. 22, described below.

According to an aspect of the present disclosure, the processor may compare the identifier to a database of known identifiers. For example, the processor may confirm that a username and password match a known username and password in the database. In certain aspects, the processor may hash or otherwise encrypt some or all of the identifier and compare the encrypted identifier to a databased of known encrypted identifiers. For example, the processor may hash a received password and then confirm that a username and the hashed password match a known username and a known hashed password in the database.

According to an aspect of the present disclosure, the processor may control access to the collaboration service based on the comparison. For example, if the identifier does not match a known identifier, the processor may refuse to accept data and/or requests from the user. Similarly, if the identifier matches a known identifier, the processor may then accept data from the user and/or execute requests received from the user.

In some embodiments, a processor may confirm that a user is not a spam program or other automated entity before executing requests from the user, as described both above and below. For example, if a processor receives an email (or other data) or request from a user, the processor may generate a response having a unique confirmation code. For example, the confirmation code may be a one-time passcode or other unique code. By way of further example, the processor may generate a response having a unique CAPTCHA.

According to an aspect of the present disclosure, the processor may send the response having the confirmation code to the user. For example, the processor may transmit an email having the confirmation code to the user (e.g., via an email host) or may transmit a Short Message Service (SMS) message, a Multimedia Messaging Service (MMS) message, or the like having the confirmation code to a device associated with the user (e.g., a smartphone). By way of further example, the processor may present the confirmation code directly to the user—for example, if the confirmation code is a CAPTCHA, the processor may transmit the CAPTCHA (e.g., to a web browser) for display on a screen associated with the user (e.g., on a laptop or desktop computer).

According to an aspect of the present disclosure, the processor may receive a code from the user. For example, the processor may receive an email or text message (SMS message, MMS message, etc.) from the user having a code. By way of further example, the processor may use a text box within a GUI to receive the code from the user.

According to an aspect of the present disclosure, the processor may compare the code from the user to the confirmation code. In certain aspects, the processor may hash or otherwise encrypt some or all of the code from the user and compare the encrypted code to the encrypted confirmation code. For example, the processor may hash the code received from the user and then confirm that it matches the hashed confirmation code.

According to an aspect of the present disclosure, the processor may control access to the collaboration service based on the comparison. For example, if the coder received from the user does not match the confirmation code, the processor may refuse to accept data and/or requests from the user. Similarly, if the code received from the user matches the confirmation code, the processor may then accept data from the user and/or execute requests received from the user.

According to another embodiment of the present disclosure, a processor may automatically invite a user to join a collaboration service. For example, the processor may determine that a particular contact does not have an account with the collaboration service. The processor may make this determination using a database of known users. For example, if the processor receives an email address or a phone number that does not appear in the database, the processor may determine that the contact associated with the email address or phone number does not have an account. Similarly, if the processor receives a username that does not appear in the database, the processor may determine that the contact associated with the username does not have an account. In certain aspects, the processor may hash or otherwise encrypt some or all of the email address, username, or the like and compare the encrypted code to a database of known users. For example, the processor may hash the received email address and then determine whether the hashed email address appears in the database of known users.

According to an aspect of the present disclosure, the processor may generate a message addressed to the contact and having a link to register for the collaboration service. For example, the processor may generate an email addressed to the contact that includes a link to register for (that is, create an account with) the collaboration service in the subject and/or body of the email. An example of an email having a link to register is depicted in GUI 2400 of FIG. 24.

Similarly, the processor may generate a text message (e.g., SMS message, MMS message, etc.) addressed to the contact that includes a link to register for the collaboration service. An example of a text message having a link to register is depicted in GUI 2500 of FIG. 25. In other examples, the processor may call the contact and playback an audio message to ask or encourage the contact to sign up with the collaboration service. In some examples, the processor may periodically follow up with the contact by sending one or more reminders in different message formats (e.g., email, SMS message, MMS message, etc. or combination thereof) at various time intervals until the contact has completed the registration with the collaboration service.

According to an aspect of the present disclosure, the processor may transmit the message to the contact. The mechanism of transmittal may depend on the format of the message. For example, if the message is an email, the processor may transmit the email to an email host for delivery to the inbox associated with the contact. By way of further example, if the message is a text message, the processor may transmit the email to an SMS host for delivery to a phone associated with the contact.

According to another embodiment of the present disclosure, a processor may create a collaborative team. For example, the processor may receive at least one potential team member. The processor may receive the at least one potential team member using one or more graphical user interfaces (GUIs). For example, a user may submit the potential team member(s) with GUI 2600 of FIG. 26, described below.

In certain aspects, the user may receive a list of contacts associated with the user from the processor. For example, a user may receive the list of contacts with GUI 2700 of FIG. 27, described below. The user may then select at least one contact from the list as the at least one potential team member. The processor may thus receive the selection and extract the at least one potential team member from the contact list.

According to an aspect of the present disclosure, the processor may receive a request to create a team. For example, the user may submit the request with GUI 2600 of FIG. 26, GUI 2800 of FIG. 28, or a combination thereof. In response to the request, the processor may create the team. After creation, a team may be visible to the user (and/or to team members within the team) via one or more GUIs, e.g., GUI 2900 of FIG. 29 or GUI 3100 of FIG. 31.

According to an aspect of the present disclosure, the processor may receive a request to add the at least one potential team member to the team. By being added to a team, a potential team member becomes a team member. Accordingly, the added team member may be visible (to the user, the team member, and/or to other team members within the team) on a list of team members included in the team via one or more GUIs, e.g., GUI 3200 of FIG. 32. In other aspects, the added team member may have limited visibility (i.e., masked with respect to others), or be invisible or hidden to other team members. For example, if a potential team member was listed in a BCC field of an email message used to create the team, the added team member may have limited visibility within the team.

In yet another aspect, the added team member may be incognito, such that the added member is shown as a participant, but the identity of the added user has been anonymized. For example, the incognito member may act as a fly-on-the-wall, a referee, an auditor, or the like whose presence is known by other team members yet the added member's identity has become hidden.

According to an aspect of the present disclosure, the processor may set permissions for members of the team. For example, the processor may set permissions such that some team members are allowed to add and/or remove team members while other team members are not. Similarly, the processor may set permissions such that some team members are allowed to add certain kinds of content to the team (e.g., files, links, notes, events, tasks, etc.) while other team members are not. These permissions may be based on default settings, options received from a user initiating creation of the team or from other team members, or the like.

Figure 35:
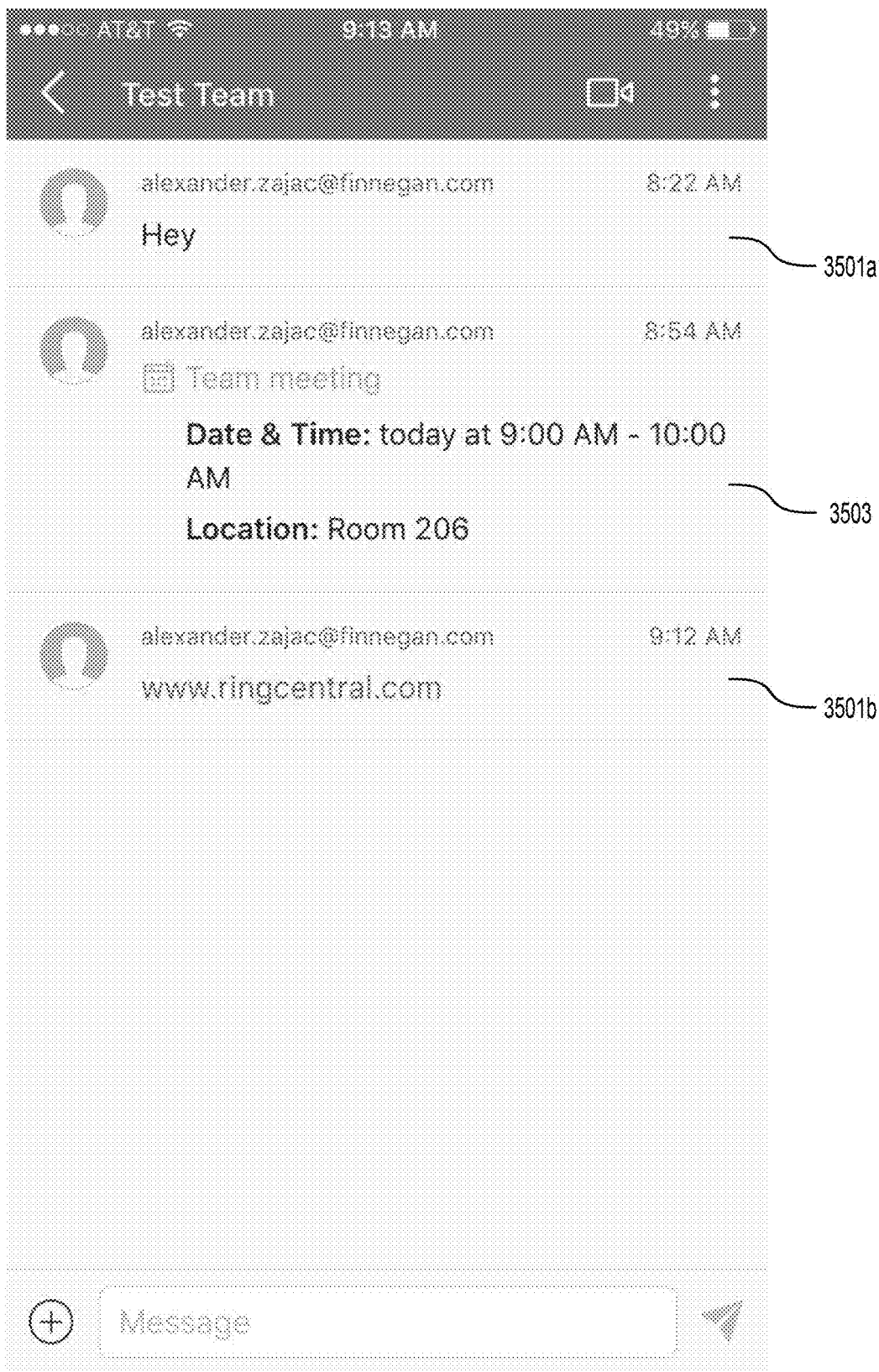
FIG. 35 is another example graphical user interface (GUI) for displaying a chat conversation associated with a team and/or with one or more recipients, according to yet another example embodiment of the present disclosure.
Figure 36:
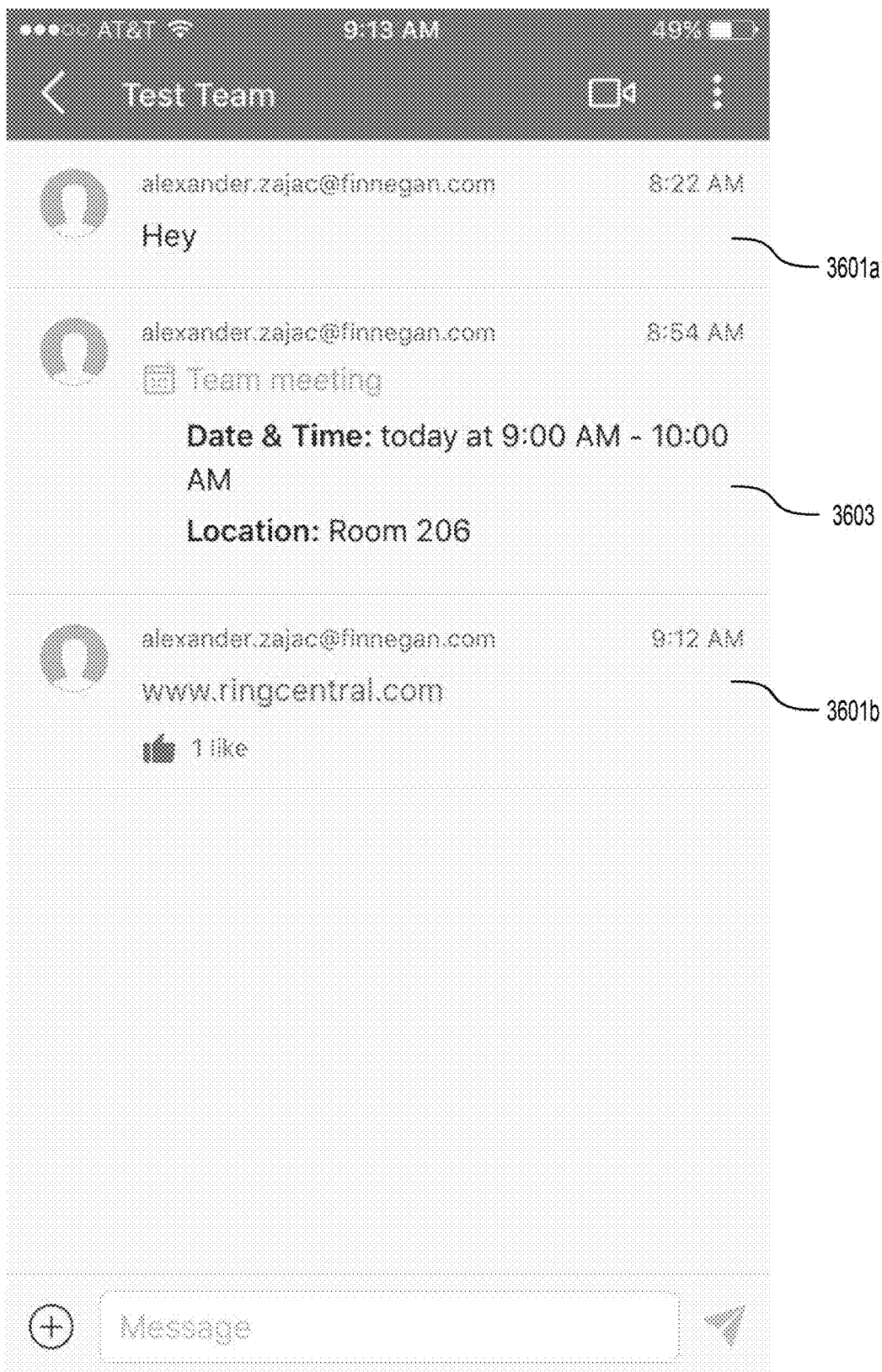
FIG. 36 is an example graphical user interface (GUI) for displaying a reaction to a message, according to yet another example embodiment of the present disclosure.
Figure 37:
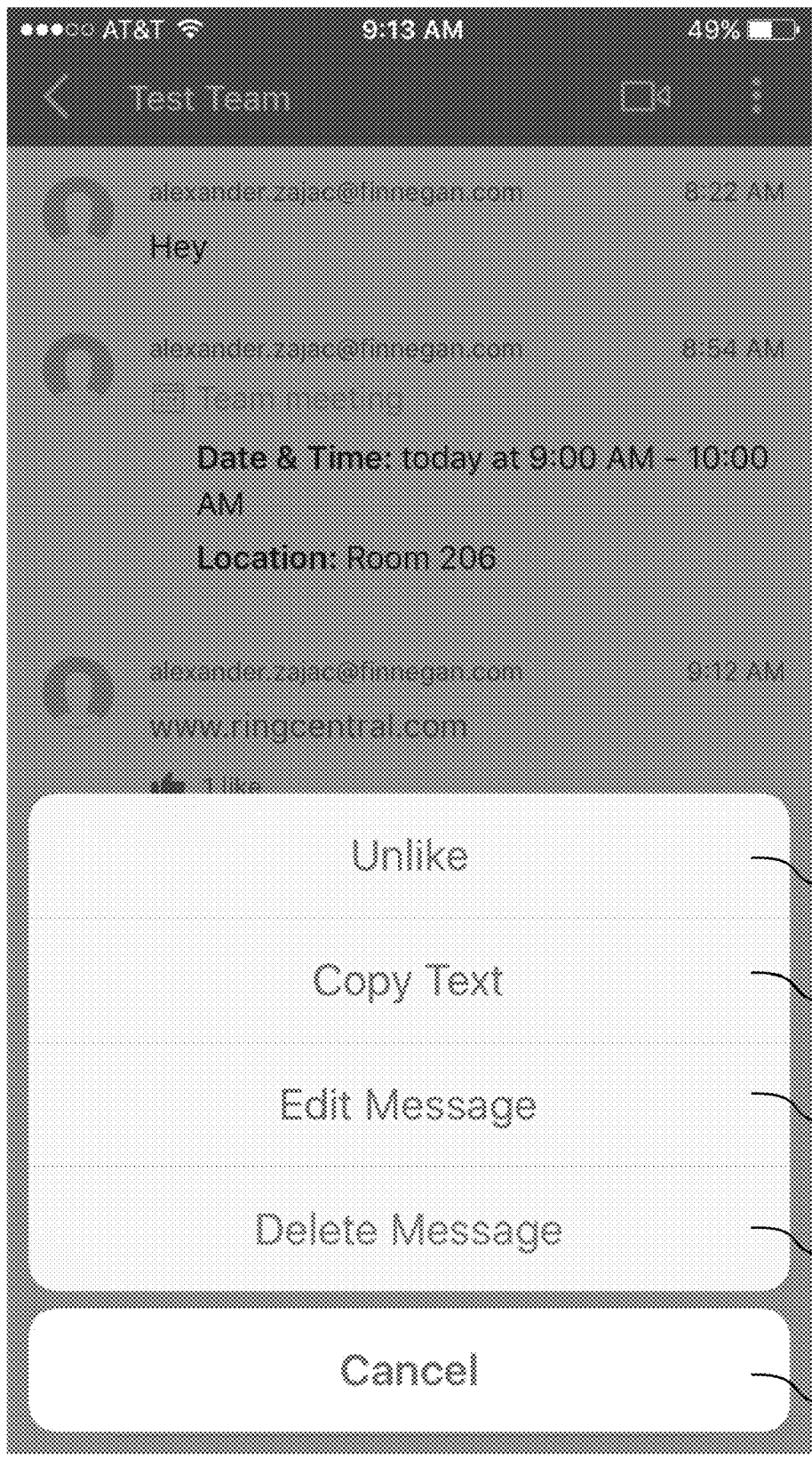
FIG. 37 is an example graphical user interface (GUI) for receiving a request to react to a message, according to yet another example embodiment of the present disclosure.

The formation of a team may allow for exchanging of group messages within the team. For example, GUI 3300 of FIG. 33, GUI 3400 of FIG. 34, and GUI 3500 of FIG. 35 depict example GUIs for exchanging messages within a team. Moreover, team members may react to messages exchanged within the group. For example, GUI 3600 of FIG. 36 and GUI 3700 of FIG. 37 depict example GUIs for reacting to messages within a team.

Figure 43:
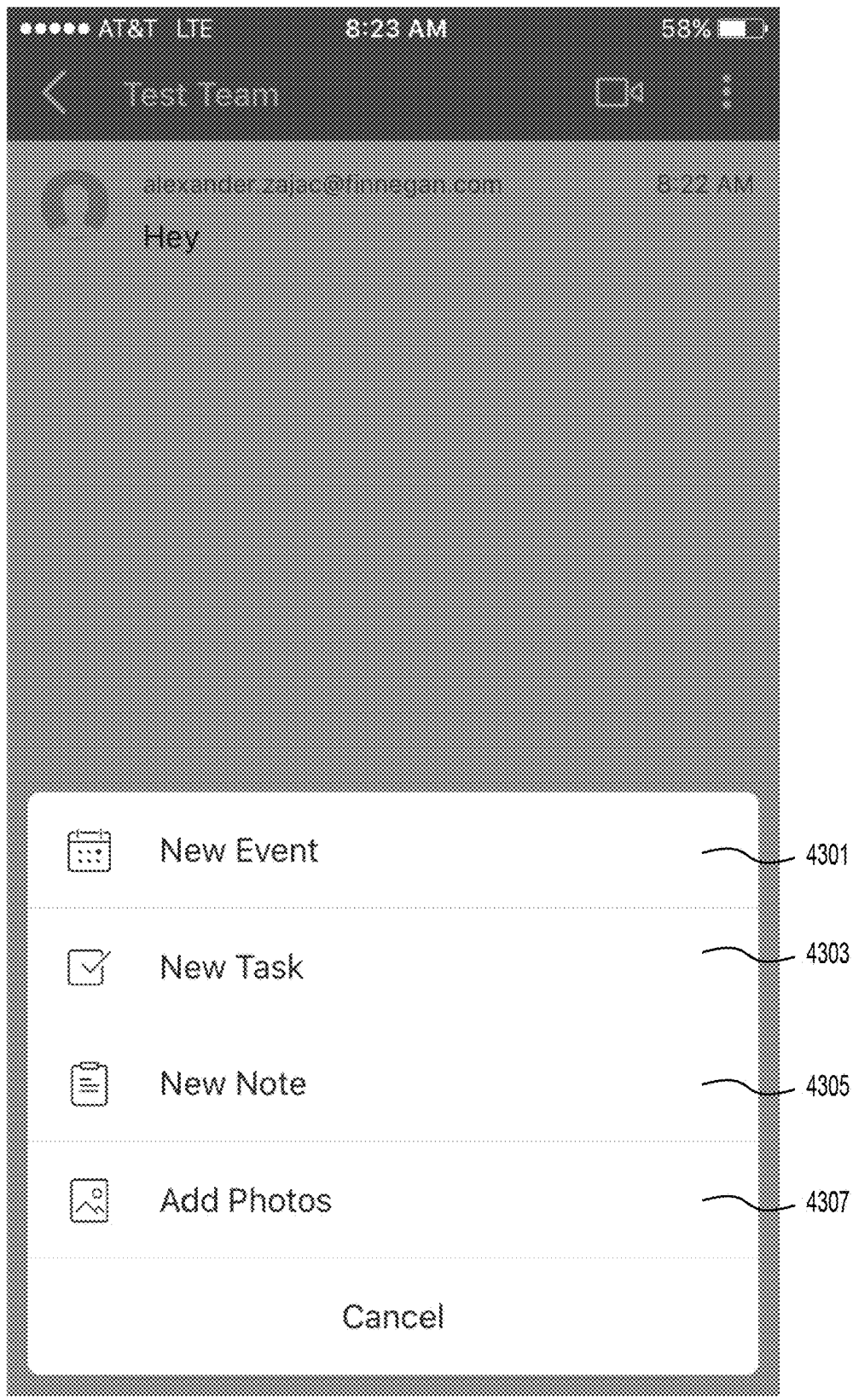
FIG. 43 is an example graphical user interface (GUI) for receiving a request to add an event, task, note, and/or file, according to yet another example embodiment of the present disclosure.

Furthermore, the formation of a team may allow for tasks and events to be created and distributed to team members. For example, GUI 3800 of FIG. 38 and GUI 3900 of FIG. 39 depict example GUIs for creating tasks within a team and events within a team, respectively. GUI 4300 of FIG. 43 depicts an additional example GUI for creating tasks or events within a team. GUI 4000 of FIG. 40 further depicts an example GUI for displaying events created within a team.

Furthermore, the formation of a team may allow for notes to be created and distributed to and/or collaboratively edited by team members. For example, GUI 4100 of FIG. 41 and GUI 4300 of FIG. 43 depict example GUIs for creating notes within a team. Moreover, the formation of a team may allow for files and links to be exchanged within a team. For example, GUI 4200 of FIG. 42 and GUI 4300 of FIG. 43 depict example GUIs for exchanging files upon selection within a team.

According to another embodiment of the present disclosure, a processor may alter a collaborative team. For example, the processor may receive at least one contact from a user. The contact may be associated with an already-created team or may be unassociated with a team. The processor may receive the contact using one or more graphical user interfaces (GUIs). For example, a user may submit the team member(s) with GUI 4400 of FIG. 44, described below.

In certain aspects, the user may receive a list of members within the team from the processor. For example, a user may receive the list of members with GUI 3200 of FIG. 32, described below. The user may then select at least one member from the list as the at least one contact. The processor may thus receive the selection and extract the at least one contact from the member list.

Similarly, the user may receive a list of contacts associated with the user from the processor. For example, a user may receive the list of contacts with GUI 2700 of FIG. 27, described below. The user may then select at least one contact from the list as the at least one contact. The processor may thus receive the selection and extract the at least contact from the contact list.

According to an aspect of the present disclosure, the processor may receive a request to alter the team from the user. For example, the user may submit the request with GUI 3200 of FIG. 32, GUI 4400 of FIG. 44, or a combination thereof.

According to an aspect of the present disclosure, the processor may verify the user has permission to alter the collaborative team. For example, if the user does not have permission to add members to the team, the processor may reject a request to add a member from the user. Similarly, if the user does not have permission to remove members from the team, the processor may reject a request to remove a member from the user.

In response to the request, the processor may alter the team based on the at least one team member and the request. For example, if the user sends a request to add the at least one contact to the team, the processor may add the contact(s) as team members. Afterward, the new member(s) may be visible (to the user, the added team member, and/or to other team members within the team) via one or more GUIs, e.g., GUI 3200 of FIG. 32. By way of further example, if the user sends a request to remove the at least one contact from the team (in this example, the at least one contact is a member within the team), the processor may remove the contact(s) as team members.

According to another embodiment of the present disclosure, a processor may create a note. A note may be associated with a single user, with a conversation (that is, a group of messages) between users, or with a team having a plurality of team members (also referred to as users).

The processor is adapted to receive and process text content. The processor may receive the text content using one or more graphical user interfaces (GUIs) (for example, by using a text box within the GUI(s)). For example, a user may input the text content via a keyboard or other input device, which then appears on GUI 4500 of FIG. 45, described below, before it is sent to the processor.

According to an aspect of the present disclosure, the processor may receive a title. The processor may receive the title using one or more graphical user interfaces (GUIs) (for example, by using a text box within the GUI(s)). For example, the user may send the title to the processor with GUI 4500 of FIG. 45, described below.

According to an aspect of the present disclosure, the processor may receive a request to add a note. For example, the user may submit the request with GUI 4100 of FIG. 41, GUI 4300 of FIG. 43, GUI 4500 of FIG. 45, or a combination thereof.

In response to the request, the processor may create the note based on the text content and the title. Afterward, the note may be visible to the user (or to team members within the team or to other users within the conversation) via one or more GUIs, e.g., GUI 4100 of FIG. 41.

According to another embodiment of the present disclosure, a processor may create a task or event. As used herein, an "event" refers to a title or name associated with an occurrence date (e.g., "Team Meeting" scheduled to occur on May 31, 2016), and a "task" refers to a title or name associated with a due date (e.g., "Legal Memo" due on Jun. 6, 2017). A task or event may be associated with a single user, with a conversation (that is, a group of messages) between users, or with a team having a plurality of team members (also referred to as users).

According to an aspect of the present disclosure, the processor may receive a date. The processor may receive the date using one or more graphical user interfaces (GUIs) (for example, by using a text box and/or an interactive calendar within the GUI(s)). For example, the user may send the title to the processor with GUI 4600 of FIG. 46, GUI 4700 of FIG. 47, GUI 4800 of FIG. 48, or a combination thereof.

According to an aspect of the present disclosure, the processor may receive a title. The processor may receive the title using one or more graphical user interfaces (GUIs) (for example, by using a text box within the GUI(s)). For example, the user may send the title to the processor with GUI 4600 of FIG. 46, GUI 4800 of FIG. 48, or a combination thereof.

According to an aspect of the present disclosure, the processor may receive a request to add a task or event. For example, the user may submit the request with GUI 3900 of FIG. 39, GUI 4000 of FIG. 40, GUI 4600 of FIG. 46, GUI 4800 of FIG. 48, or a combination thereof.

In response to the request, the processor may create the task or event based on the date and the title. Afterward, the task or event may be visible to the user (or to team members within the team or to other users within the conversation) via one or more GUIs, e.g., GUI 3900 of FIG. 39 or GUI 4000 of FIG. 40. Additionally or alternatively, the task or event may be visible to the user in a list format (e.g., via GUI 6600 of FIG. 66) and/or in a graphical format (e.g., via GUI 6700 of FIG. 67 or GUI 6800 of FIG. 68).

According to another embodiment of the present disclosure, a processor may automatically facilitate file uploads in a chat conversation. An uploaded file may be associated with a conversation (that is, a group of messages) between users or with a team having a plurality of team members (also referred to as users).

According to an aspect of the present disclosure, the processor may receive a chat message within a chat conversation. In certain aspects, the chat message may be addressed to one recipient or to a plurality of recipients. In other aspects, the chat message may be sent within a team (in which all or some of the team members comprise the recipients of the chat message).

According to an aspect of the present disclosure, the processor may automatically detect that the chat message includes at least one file. For example, the processor may determine that the chat message includes a photo along with text (as depicted in GUI 5400 of FIG. 54). Although the file comprises a single photo in this example, the chat message may include a plurality of files, either all of the same type (e.g., audio, photo, video, pdf, etc.) or of different types.

According to an aspect of the present disclosure, the processor may add the at least one file to a repository associated with the chat conversation (or with the team). After being added, the at least one file may be visible to the recipients within the conversation or to team members within the team via one or more GUIs, e.g., GUI 4200 of FIG. 42.

Alternatively, the user may send a file directly to the processor with a request to add the file to the repository. For example, the user may send the file and the request via one or more GUIs, e.g., GUI 5100 of FIG. 51.

According to another embodiment of the present disclosure, a processor may automatically collate links in a chat conversation. A link may be a hyperlink to (or text containing) a domain (such as "www.ringcentral.com") or a directory or a document (such as www.ringcentral.com/teams/overview.html).

According to an aspect of the present disclosure, the processor may receive a chat message within a chat conversation. In certain aspects, the chat message may be addressed to one recipient or to a plurality of recipients. In other aspects, the chat message may be sent within a team (in which all or some of the team members comprise the recipients of the chat message).

According to an aspect of the present disclosure, the processor may automatically detect that the chat message includes at least one link. For example, the processor may determine that text included in the chat message contains one or more links. The processor may make this determination using predetermined context clues (such as the text containing the character sequences "www."; ".com"; ".org"; ".html"; or the like) and/or employ a URL pattern matcher regular expression. Alternatively or concurrently, the processor may integrate one or more machine learning techniques with the determination such that the determination algorithm is modified each time it is used. For example, the processor may update a learning library each time the determination is made.

According to an aspect of the present disclosure, the processor may add the at least one link to a repository associated with the chat conversation (or with the team). After being added, the at least one link may be visible to the recipients within the conversation or to team members within the team via one or more GUIs.

Alternatively, the user may send a link directly to the processor with a request to add the link to the repository.

According to another embodiment of the present disclosure, a processor may facilitate messaging between users. For example, the processor may receive at least one recipient. The processor may receive the at least one recipient using one or more graphical user interfaces (GUIs). For example, a user may submit the recipient(s) using GUI 4900 of FIG. 49, described below.

In certain aspects, the user may receive a list of contacts associated with the user from the processor. For example, a user may receive the list of contacts with GUI 2700 of FIG. 27, described below. The user may then select at least one contact from the list as the at least one recipient. The processor may thus receive the selection and extract the at least one recipient from the contact list.

According to an aspect of the present disclosure, the processor may receive content from the user. As used herein, the term "content" may refer to text content (e.g., ASCII text, Unicode text, etc.), audio/video content (e.g., in the form of a video file, a photo file, an audio file, or the like), or the like. The processor may receive the content using one or more graphical user interfaces (GUIs) (for example, by using a text box within the GUI(s) and/or by using an upload dialog within the GUI(s)). For example, the user may send the title to the processor with GUI 5000 of FIG. 50, described below.

According to an aspect of the present disclosure, the processor may generate a message addressed to the at least one recipient and having the content. For example, if the content comprises a combination of text and a file, the processor may bundle the file with the text into a single message addressed to the at least one recipient. On the other hand, if the content comprises text over a threshold length, the processor may divide the text into a plurality of messages addressed to the at least one recipient.

According to an aspect of the present disclosure, the processor may transmit the message to the at least one recipient. For example, the at least one recipient may receive a notification of the incoming message via one or more user interface devices associated with the recipient. In certain aspects, the user may send a request to the processor to transmit the message; in this case, the processor may transmit the message in response to the request. For example, a user may submit the request using GUI 4900 of FIG. 49 or GUI 5000 of FIG. 50, described below.

According to another embodiment of the present disclosure, a processor may facilitate reactions to messages between users. For example, the processor may receive a selection of at least one message. The at least one message may have a plurality of recipients. The processor may receive the selection using one or more graphical user interfaces (GUIs). For example, a user may submit the selection using GUI 5200 of FIG. 52, described below.

In certain aspects, the user may receive a list of chat conversations (comprised of messages) from the processor. For example, a user may receive the list of conversations with GUI 3000 of FIG. 30, described below. The user may then select a conversation from the list, thereby selecting the messages therein as the at least one message. The processor may thus receive the selection and extract the at least one message from the selected conversation.

According to an aspect of the present disclosure, the processor may receive a request to react to the selection. In certain aspects, the processor may receive the selection separately from the request. In other aspects, the processor may receive the selection concurrently with the request. For example, GUI 5200 of FIG. 52 and GUI 3700 of FIG. 37 depict example GUIs in which a user submits a selection and a request concurrently.

According to an aspect of the present disclosure, the processor may record the reaction in response to the request. For example, the processor may record the reaction on a remote server and/or on a user interface device associated with the user. Based on the recordation, the processor may display the reaction with the selection to the user. For example, GUI 3600 of FIG. 36 depicts an example GUI in which the reaction is displayed to the user. In certain aspects, the reaction may also be transmitted for display to one or more of the plurality of recipients.

According to another embodiment of the present disclosure, a processor may alter a status of a conversation or a message. For example, the processor may receive a selection of at least one conversation or at least one message. The processor may receive the selection using one or more graphical user interfaces (GUIs). For example, a user may submit the selection using GUI 5800 of FIG. 58 or GUI 6000 of FIG. 60, described below.

In certain aspects, the user may receive a list of chat conversations (comprised of messages) from the processor. For example, a user may receive the list of conversations with GUI 3000 of FIG. 30, described below. The user may then select a conversation from the list, thereby selecting the messages therein as the at least one message. The processor may thus receive the selection and extract the at least one message from the selected conversation.

According to an aspect of the present disclosure, the processor may receive a request to alter a status of the selection. In certain aspects, the processor may receive the selection separately from the request. For example, GUI 5800 of FIG. 58, GUI 6000 of FIG. 60, GUI 6100 of FIG. 61, and GUI 6300 of FIG. 63 depict example GUIs in which a user submits a selection and a request separately. In other aspects, the processor may receive the selection concurrently with the request.

According to an aspect of the present disclosure, the processor may record the altered status in response to the request. For example, the processor may record the reaction on a remote server and/or on a user interface device associated with the user. Based on the recordation, the processor may display the altered status with the selection to the user. For example, GUI 5900 of FIG. 59 depicts an example GUI in which the altered status is displayed to the user.

According to another embodiment of the present disclosure, a processor may display events and tasks in a graphical format. For example, the processor may receive at least one event or task. The at least one event or task may be retrieved from a storage device operably connected to the processor and/or over a computer network.

According to an aspect of the present disclosure, the processor may automatically extract at least one date, at least one time, and at least one title from the received events or tasks. For example, the received events or tasks may be stored in one or more known data models with associated serialization formats. Such models include serialized data from which the at least one date, the at least one time, and the at least one title may be extracted.

By way of further example, the at least one event or task may include some or all of this information as metadata or other demarcated locations within a data file. By extracting the at least one date, the at least one time, and the at least one title from the metadata, the processor may achieve compatibility with calendaring and/or events scheduling features of other systems.

Alternatively or concurrently, the processor may extract some or all of this information by searching for predetermined formats within the data. For example, the processor may search for possible date formats, including, e.g., "XX/XX"; "XX/XX/XX"; "XX/XX/XXXX"; "X/X"; "X/X/XX"; "X/X/XXXX"; "X/XX/XX"; "X/XX/XXXX"; "XX/X/XX"; "XX/X/XXXX"; and the like. By way of further example, the processor may search for possible time formats, including, e.g., "X:XX"; "XX:XX"; "X:XX [AM/PM]"; "XX:XX [AM/PM]"; and the like.

Alternatively or concurrently, the processor may integrate one or more machine learning techniques with the searching such that the searching algorithm is modified each time it is used. For example, the processor may update a learning library each time for which a date and/or a time is searched. By searching the data directly, the processor may achieve compatibility with calendaring and/or events scheduling features of other systems. Moreover, the processor may extract the at least one date, the at least one time, and the at least one title from informal data (such as an email or other message) that is not stored in a known data model for events and/or tasks.

According to an aspect of the present disclosure, the processor may generate a graphical display including the extracted dates, times, and titles. For example, the processor may generate a graphical display like the GUIs 6700, 6800 depicted in FIG. 67, FIG. 68, or a combination thereof According to an aspect of the present disclosure, the processor may transmit the graphical display to a user device. For example, a user device (also termed a "user interface device") may comprise, for example, a smartphone, a tablet, a laptop computer, a desktop computer, or the like.

According to another embodiment of the present disclosure, a processor may convert a chat conversation to an audio or video conference. For example, the processor may receive a selection of at least one chat message. The at least one chat message may have a plurality of recipients. The processor may receive the selection using one or more graphical user interfaces (GUIs).

According to an aspect of the present disclosure, the processor may receive a request to initiate an audio or video conference. In certain aspects, the processor may receive the selection separately from the request. In other aspects, the processor may receive the selection concurrently with the request. For example, a user may submit the selection concurrently with the request using GUI 3400 of FIG. 34, described below.

According to an aspect of the present disclosure, the processor may initiate an audio or video conference in response to the request. After initiation, the processor may notify the plurality of recipients of the initiation.

For example, initiating a conference may comprise activating a synchronous conferencing protocol or an asynchronous conferencing protocol. In activating the protocol, the processor may automatically add some or all of the plurality of recipients to the conference and then send a notification to the added recipients. Alternatively, the notification sent to some or all of the plurality of recipients may include a request for a response. For example, the notification may allow a recipient to either accept and be added to the conference or to reject and not be added to the conference. For example, a recipient may use one or more buttons on a GUI to accept or reject the invite.

Turning now to FIG. 1, there is shown a diagram of example system 100 for collaboration. As depicted in FIG. 1, system 100 may include a central server 101. Central server 101 may comprise collaboration server 7201 of FIG. 72 or any other appropriate general or specialized computer. Although depicted as a single server in FIG. 1, central server 101 may comprise a plurality of servers. The plurality of servers may be housed within one server farm or distributed across a plurality of server farms.

Central server 101 may be operably connected to one or more VoIP servers (e.g., server 103) and to one or more email hosts (e.g., host 105). In some embodiments, VoIP server 103 and/or email host 105 may comprise one or more servers. For example, one or more of the servers comprising VoIP server 103 and/or email host 105 may be one or more of the same servers comprising central server 101. In certain aspects, one or more of the servers comprising VoIP server 103 and/or email host 105 may be housed within one or more of the same server farms as central server 101 or may be distributed across one or more different server farms.

As depicted in FIG. 1, system 100 further includes a plurality of users, e.g., user 107a, user 107b, and user 107c. Although FIG. 1 depicts system 100 as having three users, one skilled in the art would understand that system 100 may have any number of users.

As further depicted in FIG. 1, each user within system 100 is operably connected to the system via at least one user interface device. For example, user 107a is connected via user interface device 109a, user 107b is connected via user interface device 109b, and user 107c is connected via user interface device 109c. A user interface device may comprise, for example, a smartphone, a tablet, a laptop computer, a desktop computer, a gaming console, or the like. Although not depicted in FIG. 1, one or more users may also be separately operably connected to VoIP server 103 and/or email host 105 via the same and/or a different user interface device.

Central server 101 may perform one or more of the disclosed methods to facilitate collaboration between two or more users of system 100. For example, central server 101 may allow for messaging between one or more users of system 100; converting of one or more emails from a user of system 100 to a chat conversation using email host 105; converting of a chat conversation between users of system 100 to an audio or video conference using VoIP server 103; and other methods of facilitating collaboration consistent with the disclosed embodiments.

Figure 2:
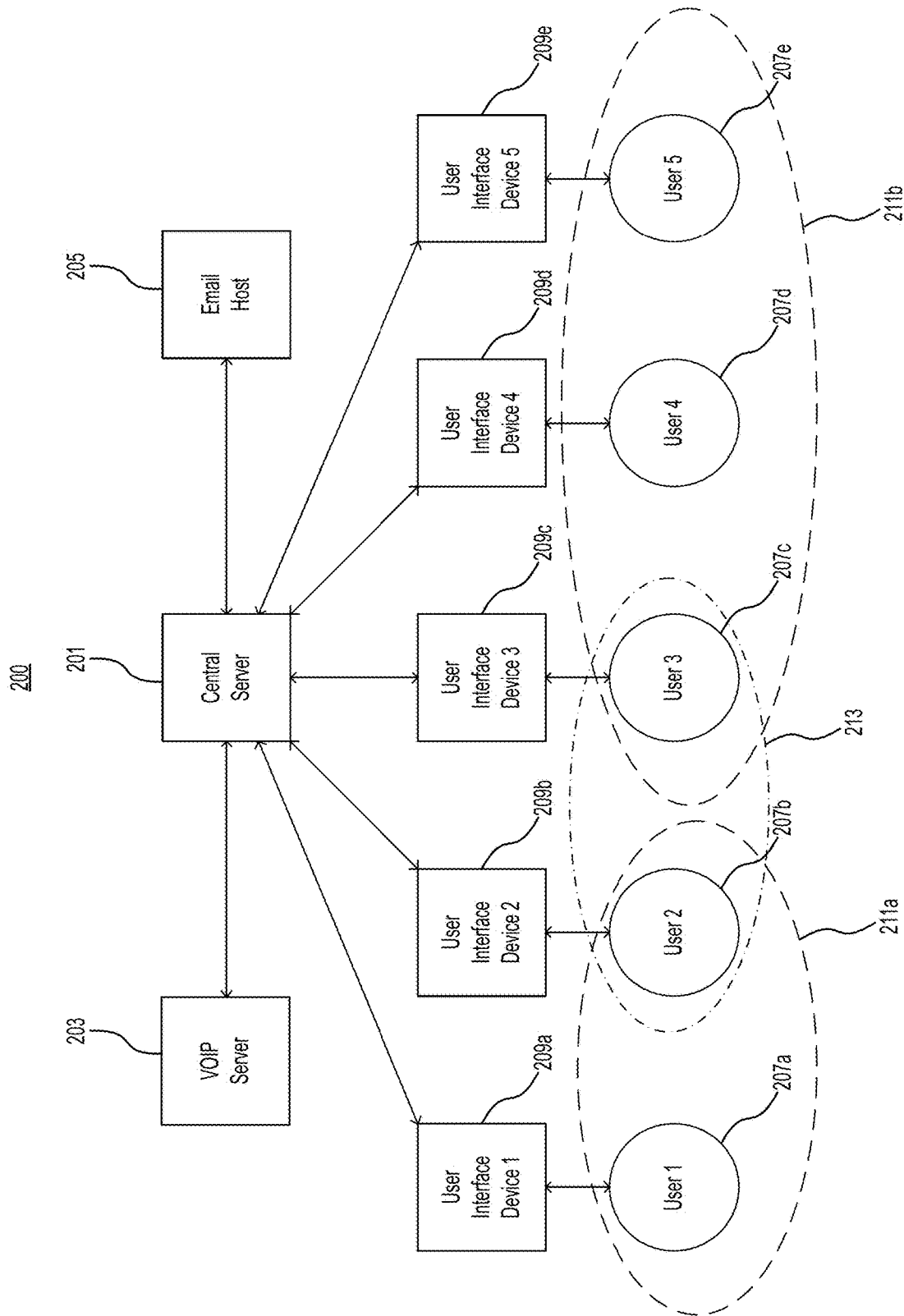
FIG. 2 is a diagram of another example system for collaboration, according to another example embodiment of the present disclosure.

FIG. 2 shows a diagram of example system 200 for collaboration. As depicted in FIG. 2, system 200 may include. The descriptions of central server 201, VoIP server 203, and email host 205 are the same as those of central server 101, VoIP server 103, and email host 105 of FIG. 1 and will not be repeated here.

As depicted in FIG. 2, system 200 includes user 207a, user 207b, user 207c, user 207d, and user 207e. Although FIG. 2 depicts system 200 as having five users, one skilled in the art would understand that system 200 may have any number of users.

Similarly to FIG. 1, each user depicted in FIG. 2 is operably connected to the system via at least one user interface device. For example, user 207a is connected via user interface device 209a, user 207b is connected via user interface device 209b, user 207c is connected via user interface device 209c, user 207d is connected via user interface device 209d, and user 207e is connected via user interface device 209e. A user interface device may comprise, for example, a smartphone, a tablet, a laptop computer, a desktop computer, or the like. Although not depicted in FIG. 2, one or more users may also be separately operably connected to VoIP server 203 and/or email host 205 via the same and/or a different user interface device.

As depicted in FIG. 2, one or more users may belong to one or more organizations, e.g., organization 211a or organization 211b. As used herein, "organization" may refer to a legally cognizable grouping (for example, an organization may comprise a business or corporations and its employees may be the users therein) or an artificial grouping (for example, an organization may comprise a neighborhood and the residences thereof may comprise users within the organization).

In some embodiments, one or more users may subscribe to a service that permits access to central server 101 for collaboration functions. The subscription may be required for all collaboration functions or may be required for only a subset of "premium" collaboration functions. In other embodiments, an organization may subscribe to the service on behalf of its users. For example, a business or corporation may subscribe to the service for some or all of its employees, granting the relevant employees access to whatever collaboration functions require a subscription.

As further depicted in FIG. 2, central server 201 may allow for one or more users to organize into teams, e.g., team 213. As depicted in FIG. 2, team 213 includes users from different groups or organizations. Users may also belong to more than one team simultaneously. In other embodiments, however, a team may comprise users from only one organization. Organizing into teams may allow for more seamless collaboration between users who are members of a team, for example, by allowing for integration of group chat conversations within the team with repositories for files and/or links, by allowing for automatic invitation of all team members to all tasks and events associated with the team, and the like.

As with system 100, system 200 may perform one or more of the disclosed methods to facilitate collaboration between two or more users of system 200 or between members of a team (e.g., team 213). For example, central server 202 may allow for messaging between one or more users (or within a team) of system 200; converting of one or more emails from a user (or from a team member) of system 200 to a group chat conversation (or to a team chat conversation) using email host 205; converting of a chat conversation between users (or within a team) of system 200 to an audio or video conference using VoIP server 203; and other methods of facilitating collaboration consistent with the disclosed embodiments.

Figure 3:
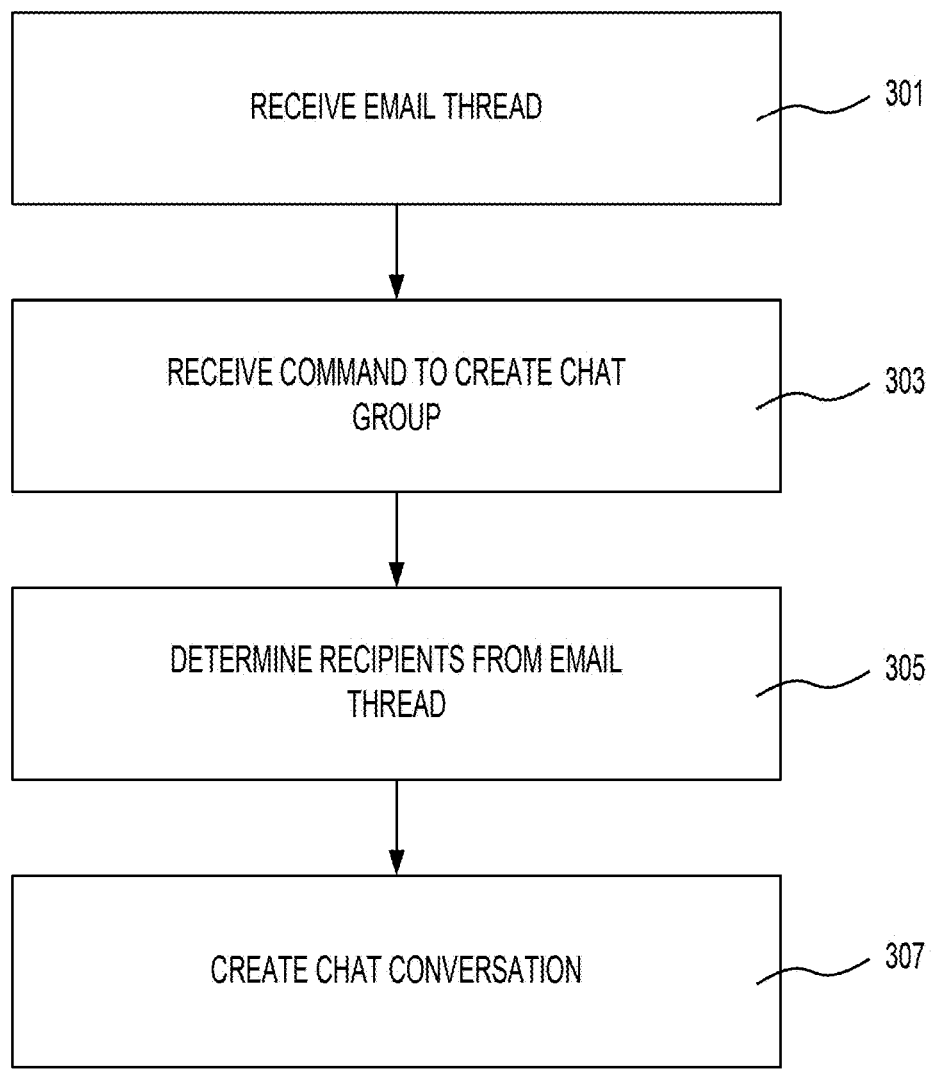
FIG. 3 is a flowchart of an example method for creating a chat group based on one or more emails, according to an example embodiment of the present disclosure.

FIG. 3 shows a flowchart of example method 300 for creating a chat group based on one or more emails. Method 300 may be implemented using a general-purpose computer including a processor, e.g., collaboration server 7201 of FIG. 72. Alternatively, a special-purpose computer may be built for implementing method 300 using suitable logic elements.

At step 301, the processor receives an email thread having at least one email. For example, the email thread may be one email with quoted text from previous emails or may be a plurality of emails, at least some of which may contain quoted text. If the email thread is a plurality of emails, at least some of the emails within the plurality may be connected by a common subject and/or recipients or may be unrelated either by subject or by recipients.

Receiving an email thread may include receiving the thread via file upload. For example, the processor may receive the email thread as one or more .msg files. Alternatively or concurrently, receiving an email thread may include receiving an authorization to retrieve the email thread from an email host and retrieving the emails from the email host using the authorization.

At step 303, the processor receives a request to create a chat group. In some embodiments, step 301 and step 303 may be performed concurrently. For example, the processor may receive the email thread together with the request.

In one example, the processor may receive a forwarded email comprising or containing the email thread from a dedicated email address configured to receive emails for conversion to a chat group. In such an example, receiving the request may include determining that the email thread was received from the dedicated email address and implying the request based on the determination.

At step 305, the processor determines one or more recipients from the email thread. For example, the processor may determine the recipients by extracting email addresses from the To, From, CC, and/or BCC fields within the email thread. By way of further example, the processor may parse text within the email thread (whether quoted text or body text) to determine the one or more recipients. In such an example, the processor may parse the text directly for one or more email addresses and/or may parse the text for context clues. For example, the processor may parse the text for names (or partial names or nicknames or the like) that are included in a contact list that the processor may use to map the parsed names to email addresses associated with the parsed names.

At step 307, the processor creates a chat conversation. For example, the processor may activate a synchronous conferencing protocol or an asynchronous conferencing protocol. In certain aspects, the processor may automatically add one or more of the determined recipients to the chat conversation. Alternatively or concurrently, the processor may automatically notify one or more of the determined recipients about the created chat conversation and request a response. In response, a recipient may either accept the invite and be added to the chat conversation or reject the invite and not be added to the chat conversation.

Method 300 may further include additional steps. For example, method 300 may include pre-populating the chat conversation based on content of the email thread. In such an example, the processor may extract at least a portion of the body text from one or more emails in the thread and generate one or more chat messages between the determined recipients containing the extracted portion(s) of the email thread.

By way of further example, method 300 may further include authenticating a user before steps 301, 303, and/or 305. For example, authenticating a user may include at least one of method 600 or method 700, described below, a combination thereof, or any other appropriate authentication method (e.g., sending a confirmation link, such as a URL, to the user).

Figure 4:
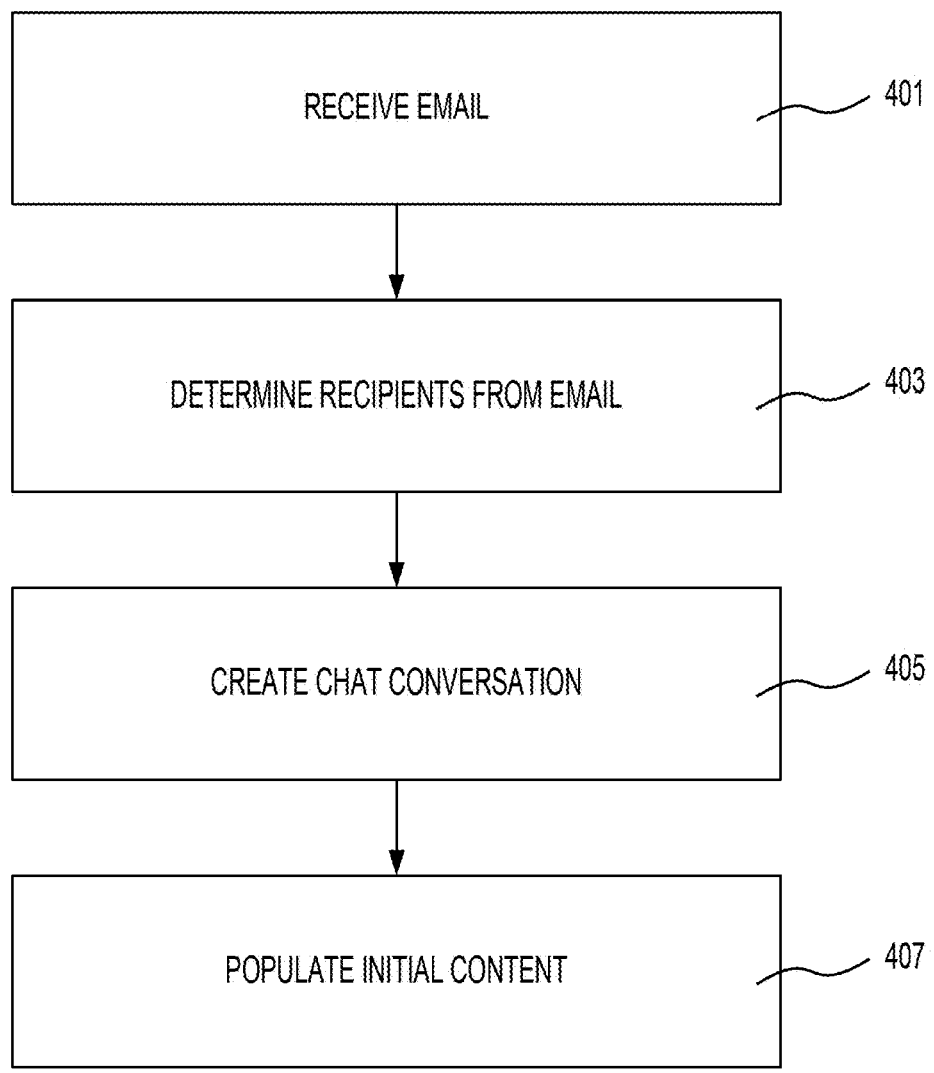
FIG. 4 is a flowchart of an example method for creating a chat conversation based on one or more emails, according to another example embodiment of the present disclosure.

FIG. 4 shows a flowchart of example method 400 for creating a chat conversation based on one or more emails. Method 400 may be implemented using a general-purpose computer including a processor, e.g., collaboration server 7201 of FIG. 72. Alternatively, a special-purpose computer may be built for implementing method 400 using suitable logic elements.

At step 401, the processor receives an email. For example, the processor may receive an email comprising an email thread included in quoted text within the email or containing an email thread included in a file attachment (e.g., an attachment comprising one or more .msg files). In some embodiments, the email may be received from a dedicated email address configured to receive emails for conversion to a chat group. In other embodiments, the email may be received via a file upload.

At step 403, the processor determines one or more recipients from the email. For example, the processor may determine the recipients by extracting email addresses from the To, From, CC, and/or BCC fields within the email (and/or within the quoted text of the email). By way of further example, the processor may parse text within the email (whether quoted text or body text) to determine the one or more recipients. In such an example, the processor may parse the text directly for one or more email addresses and/or may parse the text for context clues. For example, the processor may parse the text for names (or partial names or nicknames or the like) that are included in a contact list that the processor may use to map the parsed names to email addresses associated with the parsed names.

At step 405, the processor creates a chat conversation. For example, the processor may activate a synchronous conferencing protocol or an asynchronous conferencing protocol. In certain aspects, the processor may automatically add one or more of the determined recipients to the chat conversation. Alternatively or concurrently, the processor may automatically notify one or more of the determined recipients about the created chat conversation and request a response. In response, a recipient may either accept the invite and be added to the chat conversation or reject the invite and not be added to the chat conversation.

At step 407, the processor populates initial content of the chat conversation. For example, method 400 may include pre-populating the chat conversation based on content of the email thread. In such an example, the processor may extract at least a portion of the body text from one or more emails in the thread and generate one or more chat messages between the determined recipients containing the extracted portion(s) of the email thread.

Method 400 may include additional steps. For example, method 400 may further include authenticating a user before steps 401 and/or 403. For example, authenticating a user may include at least one of method 600 or method 700, described below, a combination thereof, or any other appropriate authentication method (e.g., sending a confirmation link, such as a URL, to the user).

Figure 5:
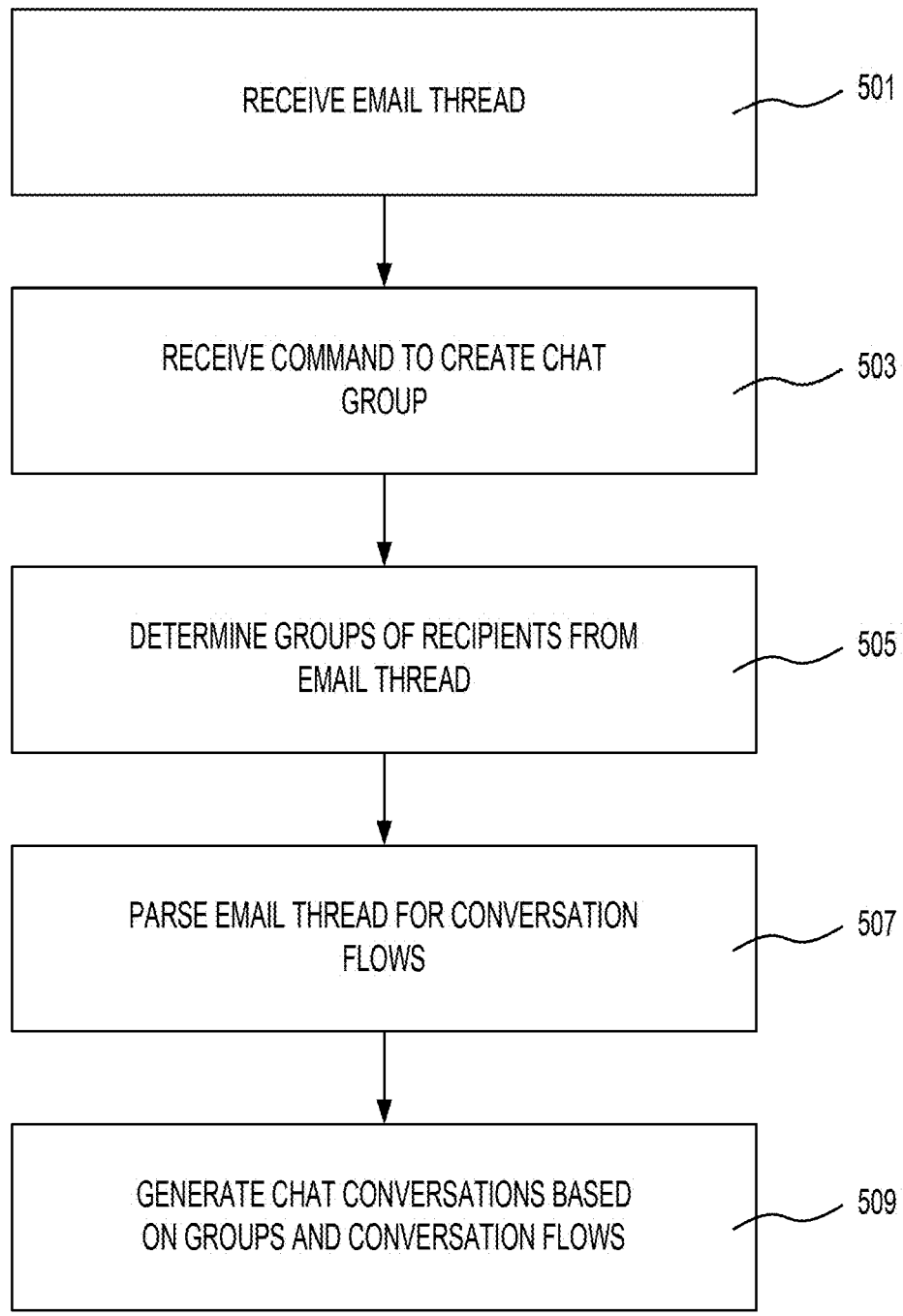
FIG. 5 is a flowchart of an example method for automatically converting one or more emails to one or more chat conversations, according to yet another example embodiment of the present disclosure.

FIG. 5 shows a flowchart of example method 500 for automatically converting one or more emails to one or more chat conversations. Method 500 may be implemented using a general-purpose computer including a processor, e.g., collaboration server 7201 of FIG. 72. Alternatively, a special-purpose computer may be built for implementing method 500 using suitable logic elements.

At step 501, the processor receives an email thread having at least one email. For example, the email thread may be one email with quoted text from previous emails or may be a plurality of emails, at least some of which may contain quoted text. If the email thread is a plurality of emails, at least some of the emails within the plurality may be connected by a common subject and/or recipients or may be unrelated either by subject or by recipients.

Receiving an email thread may include receiving the thread via file upload. For example, the processor may receive the email thread as one or more .msg files. Alternatively or concurrently, receiving an email thread may include receiving an authorization to retrieve the email thread from an email host and retrieving the emails from the email host using the authorization.

At step 503, the processor receives a request to create a chat group. In some embodiments, step 501 and step 503 may be performed concurrently. For example, the processor may receive the email thread together with the request.

In one example, the processor may receive a forwarded email comprising or containing the email thread from a dedicated email address configured to receive emails for conversion to a chat group. In such an example, receiving the request may include determining that the email thread was received from the dedicated email address and implying the request based on the determination.

At step 505, the processor determines one or more groups of recipients from the email thread. For example, the processor may determine the groups of recipients by extracting email addresses from the To, From, CC, and/or BCC fields within the email (and/or within the quoted text of the email) and grouping the email addresses accordingly (e.g., the addresses in CC and/or BCC fields may comprise one group, the addresses in "To" and/or "From" fields may comprise another group, etc.). By way of further example, the processor may parse text within the email (whether quoted text or body text) to determine the groups of recipients. In such an example, the processor may parse the text directly for one or more email addresses and/or may parse the text for context clues. For example, the processor may parse the text for names (or partial names or nicknames or the like) that are included in a contact list that the processor may use to map the parsed names to email addresses associated with the parsed names. The processor may further use context clues to assist with grouping. For example, the processor may group the addresses based on the frequency with which the addresses and/or associated names appear in the text.

At step 507, the processor parses the email thread to determine one or more conversation flows. For example, the processor may determine a temporal flow within the email thread by ranking the emails within the thread based on timestamps indicating when the emails were sent and/or timestamps indicating when the emails were received. This information may be directly extracted from quoted text in the emails within the thread or from metadata of the emails within the thread. Alternatively or concurrently, this information may be extracted from context clues based on text within the emails. For example, text within the emails may refer back to previous portions of the conversation or may state that a follow-up will be forthcoming. The processor may map these context clues to particular emails or to quoted text within one or more emails and then construct a conversation timeline based on the context clues and the mapping. The timeline may comprise one line or may be multi-lined. For example, if the email thread split into two sub-groups of recipients with concurrent emails exchanged within the sub-groups, the processor may construct a fork within the timeline representing a split in the temporal flow. The fork may represent a divide between a main timeline and a tributary timeline, and, in some embodiments, the sub-groups may correspond to the determined groups from step 505.

By way of further example, the processor may determine a logical flow within the email thread based on conversation dynamics. For example, context clues within the emails may indicate if a particular email or particular piece of quoted text is related to one or more subjects. The one or more subjects may be from a pre-populated list or may be derived on-the-fly by the processor. Based on this subject categorization, the processor may construct a conversation map of the logical flow within the email thread. The map may comprise one thread or may be multi-threaded. For example, if a side conversation ensues within an email thread, the processor may construct a fork within the map representing a split in the logical flow. The fork may represent a divide between a main map and a tributary map, and, in some embodiments, sub-groups of recipients in one or more tributary maps may correspond to the determined groups from step 505.

Any of the above algorithms for determining a temporal flow or a logical flow may be enhanced with machine learning. For example, the processor may be seeded with a learning library or construct a learning library on-the-fly which then allows for the algorithm (and/or the library) to be updated each time it is used. Other machine learning approaches are also possible, for example, neural networks, Bayesian networks, deep learning, or the like.

At step 509, the processor generates one or more chat conversations based on the determined group(s) and the determined conversation flow(s). For example, the processor may activate a synchronous conferencing protocol or an asynchronous conferencing protocol. The processor may automatically add one or more of the recipients of a group to an associated chat conversation. Alternatively, the processor may automatically notify one or more of the recipients of the chat conversation and request a response, as described above.

In cases where the conversation timeline or the conversation map contains a fork, the processor may generate two chat conversations, one associated with the main timeline or map and one associated with the tributary timeline or map. If the timeline or map contains a plurality of forks, the processor may repeat this process for some or all of the forks. In certain aspects, a chat conversation associated with a tributary timeline or map may include the same recipients as the conversation associated with the main timeline or map. In other aspects, a chat conversation associated with a tributary timeline or map may include a sub-group of the recipients of the conversation associated with the main timeline or map. In still other aspects, some or all of the recipients of a chat conversation associated with a tributary timeline or map may differ from the recipients of the chat conversation associated with the main timeline or map.

Furthermore, the processor may pre-populate the chat conversation(s) based on the one or more conversation flows. For example, the processor may generate chat messages between recipients that contain portions of the email thread in an order determined by the conversation flows. For example, if the conversation flow is temporal, the order may follow the constructed conversation timeline. Similarly, if the conversation flow is logical, the order may follow the constructed conversation map. The pre-populated chat messages may be generated within a chat conversation associated with a main or particular tributary timeline or map, depending on the location of the corresponding portion of the email thread within the timeline or map.

Method 500 may further include additional steps. For example, method 500 may further include authenticating a user before steps 501, 503, and/or 505. For example, authenticating a user may include at least one of method 600 or method 700, described below, a combination thereof, or any other appropriate authentication method (e.g., sending a confirmation link, such as a URL, to the user).

Figure 6:
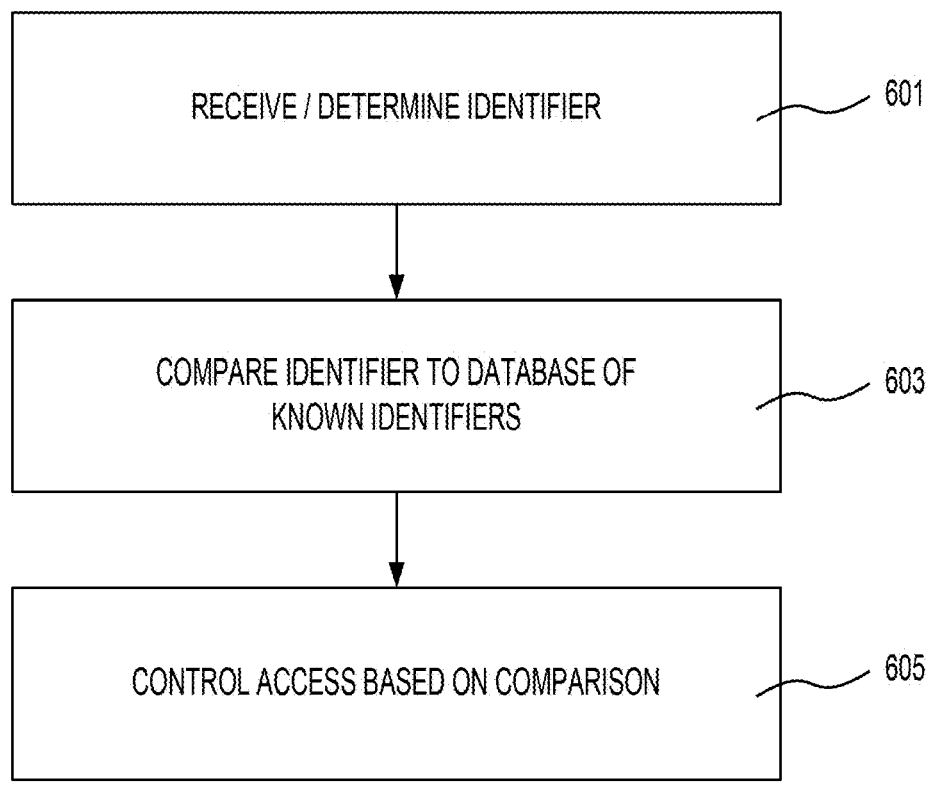
FIG. 6 is a flowchart of an example method for authenticating a user of a collaboration service, according to yet another example embodiment of the present disclosure.

FIG. 6 shows a flowchart of example method 600 for authenticating a user of a collaboration service. Method 600 may be implemented using a general-purpose computer including a processor, e.g., collaboration server 7201 of FIG. 72. Alternatively, a special-purpose computer may be built for implementing method 600 using suitable logic elements.

At step 601, the processor receives an identifier from and/or determines an identifier associated with a user. For example, in embodiments where the processor receives the identifier, the identifier may comprise a known identity, e.g., a username, an email address, or the like, or an authenticator, e.g., a password, a PIN, biometric data, or the like. On the other hand, in embodiments where the processor determines the identifier, the identifier may comprise a machine identifier, e.g., an IP address, a computer name, or the like.

According to an aspect of the present disclosure, the processor may control access to the collaboration service based on the comparison. For example, if the identifier does not match a known identifier, the processor may refuse to accept data and/or requests from the user. Similarly, if the identifier matches a known identifier, the processor may then accept data from the user and/or execute requests received from the user At step 603, the processor compares the identifier to a database of known identifiers. For example, the processor may confirm that an IP address matches a known IP address in the database. In certain aspects, the processor may hash or otherwise encrypt some or all of the identifier and compare the encrypted identifier to a database of known encrypted identifiers. For example, the processor may hash a received PIN and then confirm that the hashed PIN matches a known hashed PIN in the database.

At step 605, the processor controls access to the collaboration service based on the comparison. For example, if the identifier does not match a known identifier, the processor may refuse to accept data and/or requests from the user. Similarly, if the identifier matches a known identifier, the processor may then accept data from the user and/or execute requests received from the user. In some embodiments, authentication may be required for only a subset of "premium" collaboration functions. For example, in such embodiments, the processor may only accept subsets of data and/or subsets of requests from the user unless the identifier matches a known identifier. Alternatively or concurrently, the database of known identifiers may also indicate whether the associated user is permitted to access the "premium" functions.

Figure 7:
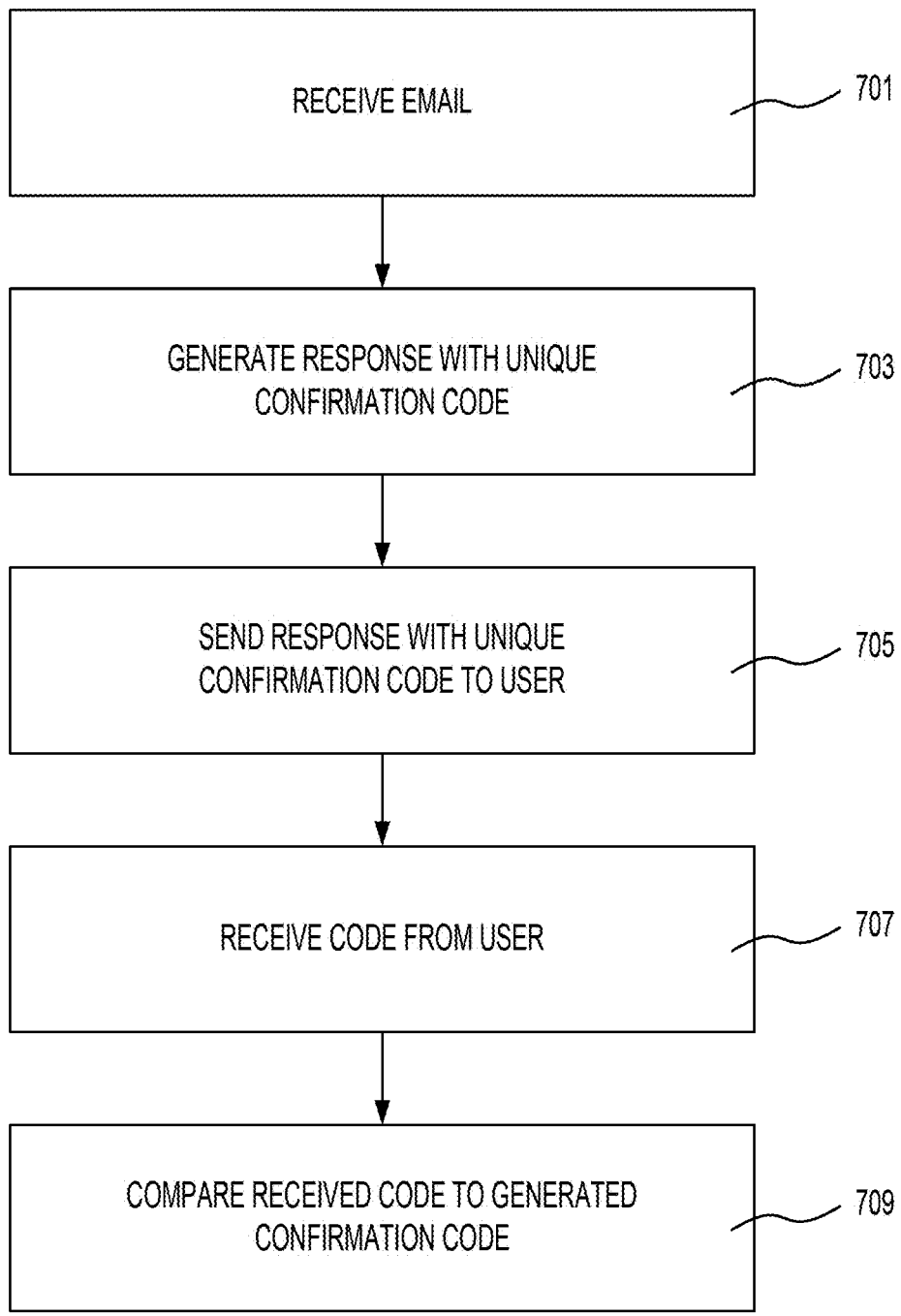
FIG. 7 is a flowchart of another example method for authenticating a user of a collaboration service, according to yet another example embodiment of the present disclosure.

FIG. 7 shows a flowchart of example method 700 for authenticating a user of a collaboration service. Method 700 may be implemented using a general-purpose computer including a processor, e.g., collaboration server 7201 of FIG. 72. Alternatively, a special-purpose computer may be built for implementing method 700 using suitable logic elements. Method 700 may be implemented independently of or in combination with method 600 of FIG. 6.

At step 701, the processor receives an email from a user. For example, the email may comprise an email thread for converting to a chat conversation.

At step 703, the processor generates a response having a unique confirmation code. For example, the confirmation code may be a one-time passcode or other unique code. By way of further example, the processor may generate a response having a unique CAPTCHA.

At step 705, the processor sends the response having the unique confirmation code to the user. For example, the processor may transmit an email having the confirmation code to the user (e.g., via an email host) or may transmit a Short Message Service (SMS) message, a Multimedia Messaging Service (MMS) message, or the like having the confirmation code to a device associated with the user (e.g., a smartphone). By way of further example, the processor may present the confirmation code directly to the user—for example, if the confirmation code is a CAPTCHA, the processor may transmit the CAPTCHA (e.g., to a web browser) for display on a screen associated with the user (e.g., on a laptop or desktop computer).

At step 707, the processor receives a code from the user. For example, the processor may receive an email or text message (SMS message, MMS message, etc.) from the user having a code. By way of further example, the processor may use a text box within a GUI to receive the code from the user.

At step 709, the processor compares the received code to the unique confirmation code. In some embodiments, the processor may hash or otherwise encrypt some or all of the code received from the user and compare the encrypted code to the encrypted unique confirmation code. For example, the processor may hash the code received from the user and then confirm that it matches the hashed unique confirmation code.

Method 700 may further include additional steps. For example, method 700 may further include controlling access to the collaboration service based on the comparison. For example, if the received code does not match the unique confirmation code, the processor may refuse to accept data and/or requests from the user. Similarly, if the received code matches the unique confirmation code, the processor may then accept data from the user and/or execute requests received from the user. In some embodiments, authentication may be required for only a subset of "premium" collaboration functions. For example, in such embodiments, the processor may only accept subsets of data and/or subsets of requests from the user unless the received code matches the unique confirmation code.

Figure 8:
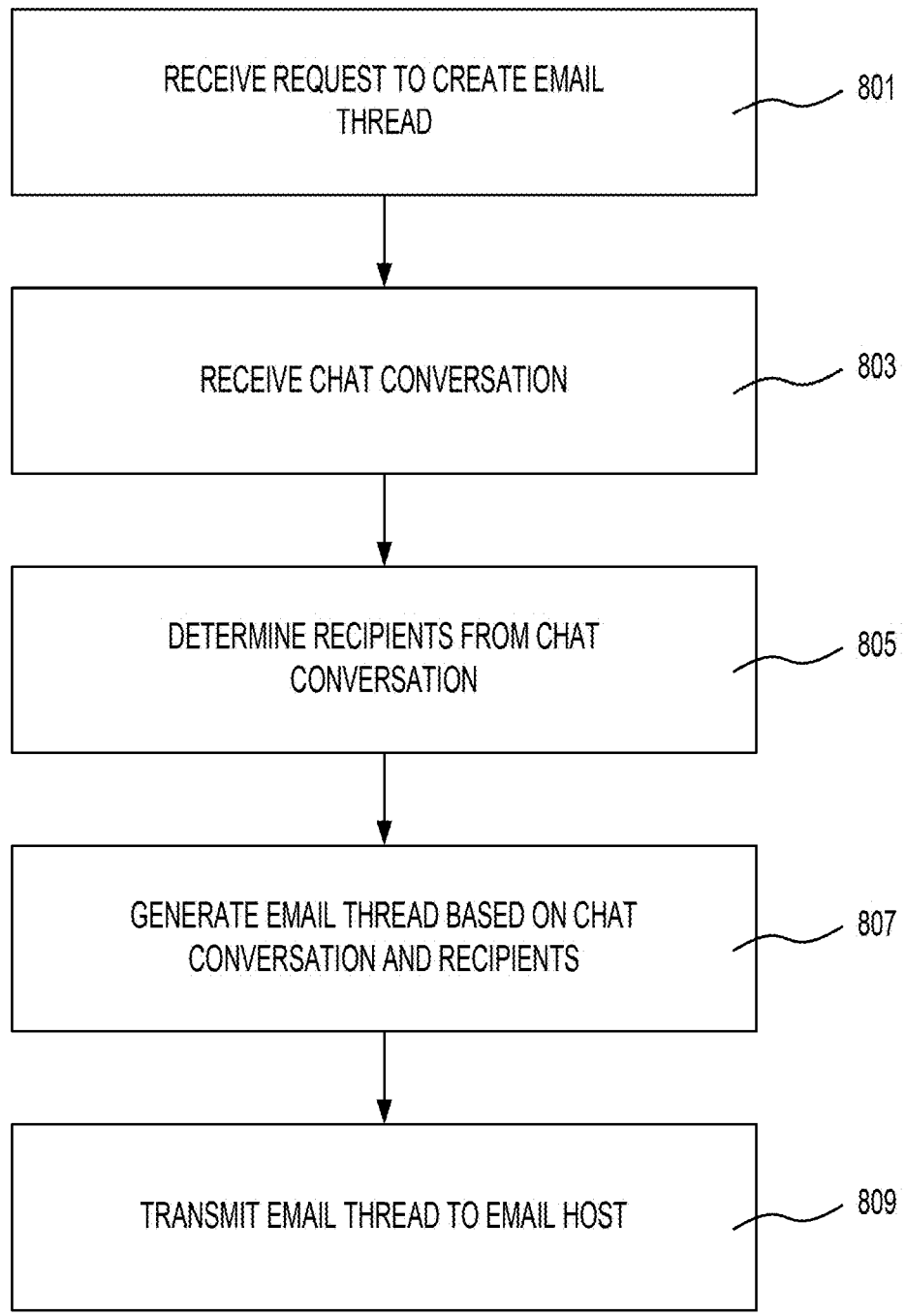
FIG. 8 is a flowchart of an example method for automatically converting a chat conversation to an email thread, according to yet another example embodiment of the present disclosure.

FIG. 8 shows a flowchart of example method 800 for automatically converting a chat conversation to an email thread. Method 800 may be implemented using a general-purpose computer including a processor, e.g., collaboration server 7201 of FIG. 72. Alternatively, a special-purpose computer may be built for implementing method 800 using suitable logic elements.

At step 801, the processor receives a request to create an email thread. At step 803, the processor receives a chat conversation. For example, the processor may receive one or more files (e.g., .msg files) having the chat conversation either directly from one or more storage devices or over one of more networks. Alternatively or concurrently, the processor may receive an authorization to retrieve the chat conversation from one or more servers in a chat network and then retrieve the chat messages from the servers using the authorization.

In some embodiments, step 801 and step 803 may be performed concurrently. For example, the processor may receive the chat conversation together with the request.

At step 805, the processor determines one or more recipients from the chat conversation. For example, the processor may determine the recipients by extracting email addresses directly from the chat conversation. By way of further example, the processor may extract usernames directly from the chat conversation and then map the extracted usernames to email addresses associated with the usernames.

By way of further example, the processor may parse text within the chat conversation to determine the one or more recipients. The processor may parse the text directly for one or more email addresses and/or may parse the text for context clues. For example, the processor may parse the text for names (or partial names or nicknames or the like) that are included in a contact list maintained by the user. Such a contact list may allow the processor to map the parsed names to email addressed associated with the parsed names. Alternatively or concurrently, the processor may send a request to, for example, a VoIP server or other chat server, to receive a list of participants, match names of the participants, and provide the processor (and/or an email host) with a list of email addresses.

At step 807, the processor generates an email thread based on the chat conversation. For example, as described above with respect to method 500, the processor may determine a temporal flow or a logical flow for the chat conversation and construct a conversation timeline or conversation map therefrom. Based on this timeline or map, the processor may generate a plurality of emails between the determined recipients. For example, the processor may generate an email from a first recipient to a second recipient with a third and fourth recipient list on the CC line. In this example, the generated email may include text, files, and/or links from the chat conversation.

By way of further example, the plurality of emails may include one or more initial emails and include replies thereto or forwards thereof. The plurality of emails may further include replies to replies, forwards of replies, replies to forwards, forwards of forwards, or the like. In certain aspects, replies and forwards may include all of the same recipients as emails to which the replies and forwards are related or may include different recipients. In certain aspects, a reply or a forward may shift some recipients from a CC field to a BCC field or vice versa, from a CC field to the To field or vice versa, from a BCC field to the To field or vice versa, or the like.

For example, the processor may determine whether to place a recipient on a CC field, a BCC field, or a To field based on how active the recipient was in the chat conversation(s), based on context clues within the chat conversation(s), or the like. In some examples, a user that sent a number of chat messages over a first threshold may be included on a To field, a user that sent a number of chat messages under the first threshold but over a lower, second threshold may be included on a CC field, and a user that sent a number of messages under the second threshold may be included on a BCC field. In certain aspects, the processor may receive input from the user indicating whether a recipient should be placed on a CC field, a BCC field, or a To field. The processor may also use a combination of automatic determination and user input in order to place a recipient on a CC field, a BCC field, or a To field.

At step 809, the processor transmits the generated email thread to an email host. For example, the processor may forward at least a portion of the email thread to the email host for direct placement in the email accounts of at least one of the recipients. In another example, the processor may transmit at least a portion of the email thread to the email host for delivery. In such an example, the processor may recreate the chat conversation by having emails sent between the recipients that mimic the chat messages between the recipients. The processor may use a combination of forwarding the email thread and transmitting the emails for delivery in order to recreate the chat conversation.

Method 800 may further include additional steps. For example, method 800 may further include authenticating a user before steps 801, 803, and/or 805. For example, authenticating a user may include at least one of method 600 or method 700, described above, a combination thereof, or any other appropriate authentication method (e.g., sending a confirmation link, such as a URL, to the user).

Figure 9:
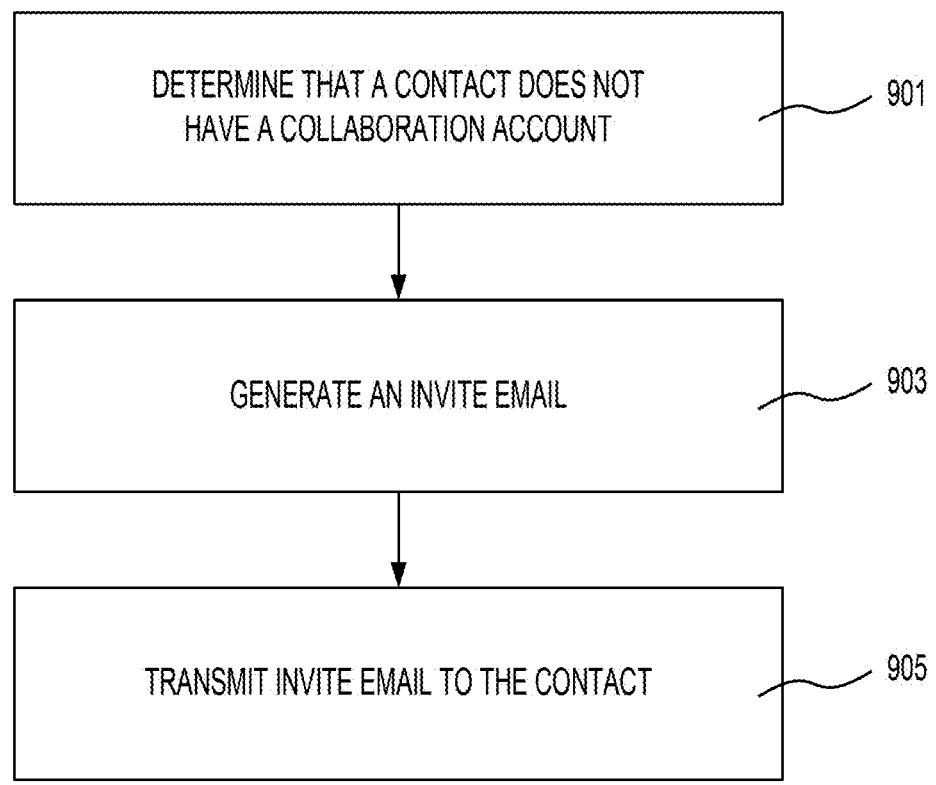
FIG. 9 is a flowchart of an example method for automatically inviting a user to join a collaboration service, according to yet another example embodiment of the present disclosure.

FIG. 9 shows a flowchart of example method 900 for automatically inviting a user to join a collaboration service. Method 900 may be implemented using a general-purpose computer including a processor, e.g., collaboration server 7201 of FIG. 72. Alternatively, a special-purpose computer may be built for implementing method 900 using suitable logic elements.

At step 901, the processor determines that a contact does not have an account with the collaboration service. The processor may make this determination using a database of known users. For example, if the processor receives an email address or a phone number that does not appear in the database, the processor may determine that the contact associated with the email address or phone number does not have an account. Similarly, if the processor receives a username that does not appear in the database, the processor may determine that the contact associated with the username does not have an account. In certain aspects, the processor may hash or otherwise encrypt some or all of the email address, username, or the like and compare the encrypted code to a database of known users. For example, the processor may hash the received email address and then determine whether the hashed email address appears in the database of known users.

In some embodiments, the processor may receive the contact directly from a user. For example, the user may send the contact to the processor with a request to invite the contact to join the collaboration service. In other embodiments, the processor may make the determination after the user sends the contact to the processor for adding to a chat conversation, to a team, or the like.

At step 903, the processor generates an invite email. For example, an invite email may comprise an email addressed to the contact that includes a link to register for (that is, create an account with) the collaboration service in the subject and/or body of the email. An example of an email having a link to register is depicted in GUI 2400 of FIG. 24.

Alternatively or concurrently at step 903, the processor may generate a different kind of invite message, e.g., a text message (e.g., SMS message, MMS message, etc.). The invite message may be addressed to the contact and include a link to register for the collaboration service. An example of a text message having a link to register is depicted in GUI 2500 of FIG. 25.

In some embodiments, the link may send the contact to a pre-registered account. For example, if the user sends the link to the contact, the processor may determine demographic information (e.g., name, email, or the like) from the user and create an account associated with the contact based on the demographic information. In such an example, the contact need not re-enter any demographic information in order to register because the contact has already been pre-registered by the processor.

At step 905, the processor transmits the invite email to the contact. For example, the processor may transmit the email to an email host for delivery to the inbox associated with the contact. Other methods of transmission may be used if the kind of invite message is different. For example, if the message is a text message, the processor may transmit the email to an SMS host for delivery to a phone associated with the contact.

Method 900 may further include additional steps. For example, method 900 may further include authenticating a user before steps 901 and/or 903. For example, authenticating a user may include at least one of method 600 or method 700, described above, a combination thereof, or any other appropriate authentication method (e.g., sending a confirmation link, such as a URL, to the user).

Figure 10:
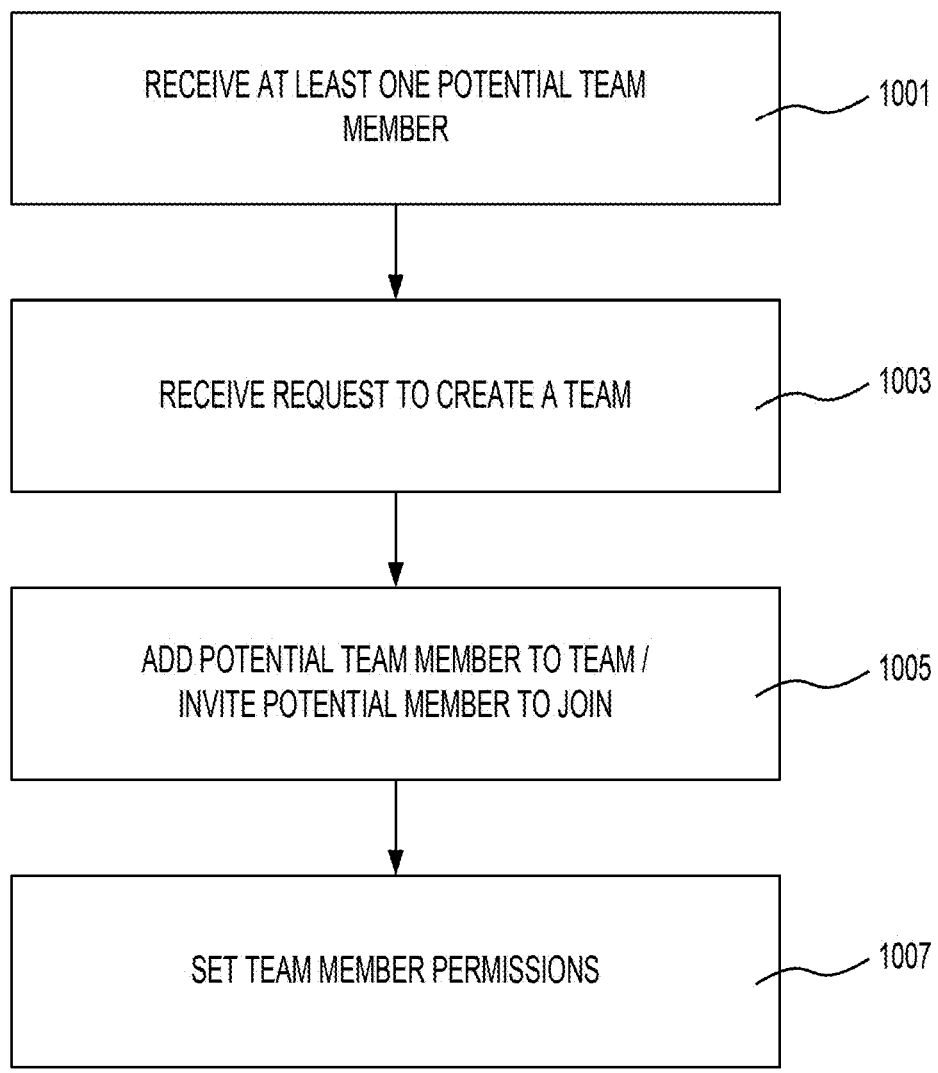
FIG. 10 is a flowchart of an example method for creating a collaborative team, according to yet another example embodiment of the present disclosure.

FIG. 10 shows a flowchart of example method 1000 for creating a collaborative team. Method 1000 may be implemented using a general-purpose computer including a processor, e.g., collaboration server 7201 of FIG. 72. Alternatively, a special-purpose computer may be built for implementing method 1000 using suitable logic elements.

At step 1001, the processor receives at least one identifier of a potential team member. For example, the processor may receive the at least one identifier of a potential team member from a user. In some embodiments, the processor may send the user a list of contacts associated with the user. The user may then select at least one contact from the list as the at least one potential team member, and the processor may extract the identifier of the at least one potential team member from the contact list.

At step 1003, the processor receives a request to create a team. In some embodiments, the processor also receives a request to add the at least one potential team member to the team. The two requests may comprise the same request. For example, the user may select one or more potential team members and then submit the potential team members with a request to create a team with the potential team members using a single button.

At step 1005, the processor adds the at least one potential team member to team and/or invites the at least one potential team member to join. By being added to a team, the at least one potential team member becomes a team member. Accordingly, the processor may make the added team member visible to the user, to the added team member, and/or to other team members within the team. Alternatively, the processor may invite the at least one potential team member using method 900 of FIG. 9 or any other appropriate method of invitation.

At step 1007, the processor sets team member permissions. For example, the processor may set permissions such that some team members are allowed to add and/or remove team members while other team members are not. Similarly, the processor may set permissions such that some team members are allowed to add certain kinds of content to the team (e.g., files, links, notes, events, tasks, etc.) while other team members are not. These permissions may be based on default settings, options received from a user initiating creation of the team or from other team members, or the like.

Method 1000 may further include additional steps. For example, method 1000 may further include authenticating a user before steps 1001, 1003, and/or 1005. For example, authenticating a user may include at least one of method 600 or method 700, described above, a combination thereof, or any other appropriate authentication method (e.g., sending a confirmation link, such as a URL, to the user).

Figure 11:
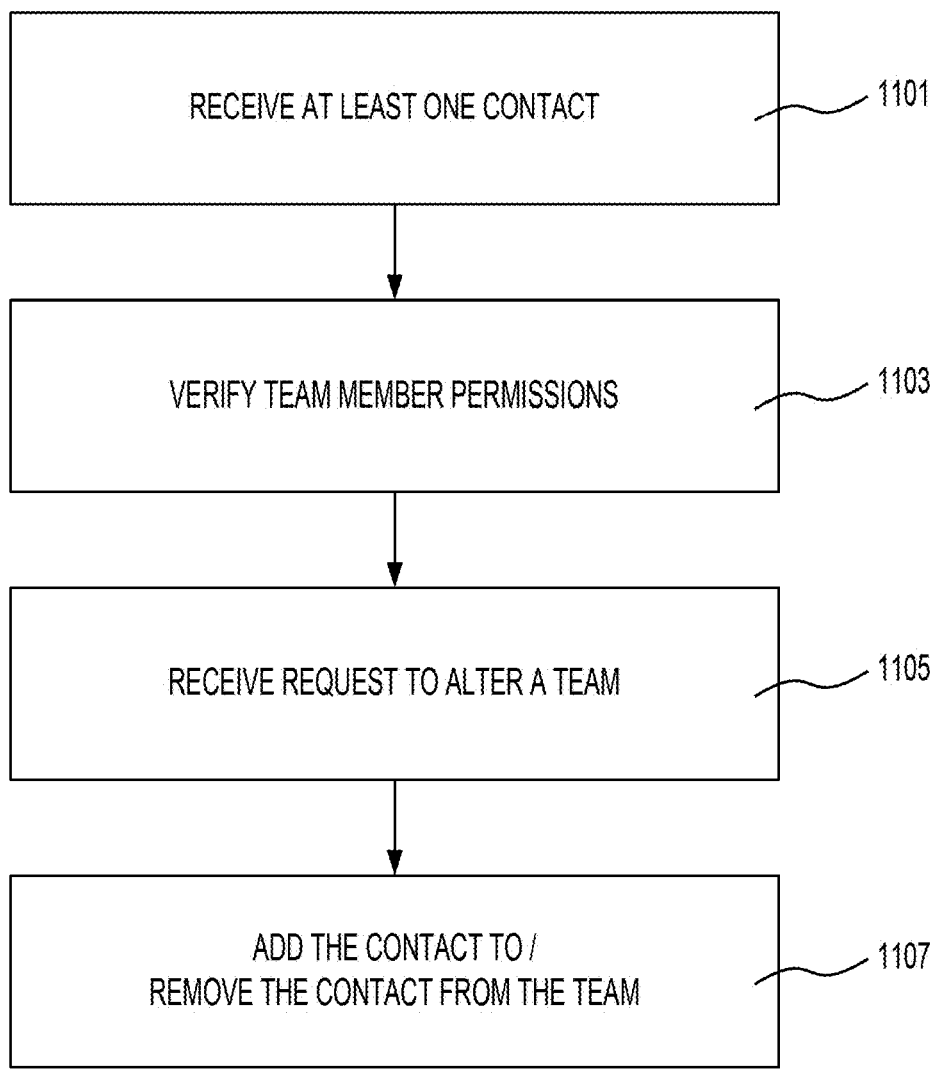
FIG. 11 is a flowchart of an example method for altering a collaborative team, according to yet another example embodiment of the present disclosure.

FIG. 11 shows a flowchart of example method 1100 for altering a collaborative team. Method 1100 may be implemented using a general-purpose computer including a processor, e.g., collaboration server 7201 of FIG. 72. Alternatively, a special-purpose computer may be built for implementing method 1100 using suitable logic elements.

At step 1101, the processor receives at least one contact from a user. For example, the contact may be associated with an already-created team or may be unassociated with a team. In some embodiments, the processor may send the user a list of contacts associated with the user. The user may then select a contact from the list as the contact, and the processor may extract the contact from the contact list. For example, the user may see a contacts list on a GUI and then select a contact using one or more buttons on the GUI.

At step 1103, the processor verifies team permissions associated with the user. Permissions may refer to what requests and data the processor accepts from the user and what requests and data the processor rejects from the user. For example, if the user does not have permission to send requests, the processor may reject requests from the user. Similarly, if the user does not have permission to send certain requests, the processor may reject requests from the user for which the user does not have permission.

At step 1105, the processor receives a request to alter the team associated with the user and/or the at least one contact. For example, the processor may receive a request to add the contact to team, a request to remove the contact from the team, a request to alter one or more team member permissions, etc.

At step 1107, the processor alters the team in accordance with the request. For example, if the user sends a request to add the contact to the team, the processor may add the contact as a team member. Afterward, the new member may be visible to the user, the added team member, and/or to other team members within the team. By way of further example, if the user sends a request to remove the contact from the team, the processor may remove the contact as a team member.

Method 1100 may further include additional steps. For example, method 1100 may further include authenticating a user before step 1101. For example, authenticating a user may include at least one of method 600 or method 700, described above, a combination thereof, or any other appropriate authentication method (e.g., sending a confirmation link, such as a URL, to the user).

Figure 12:
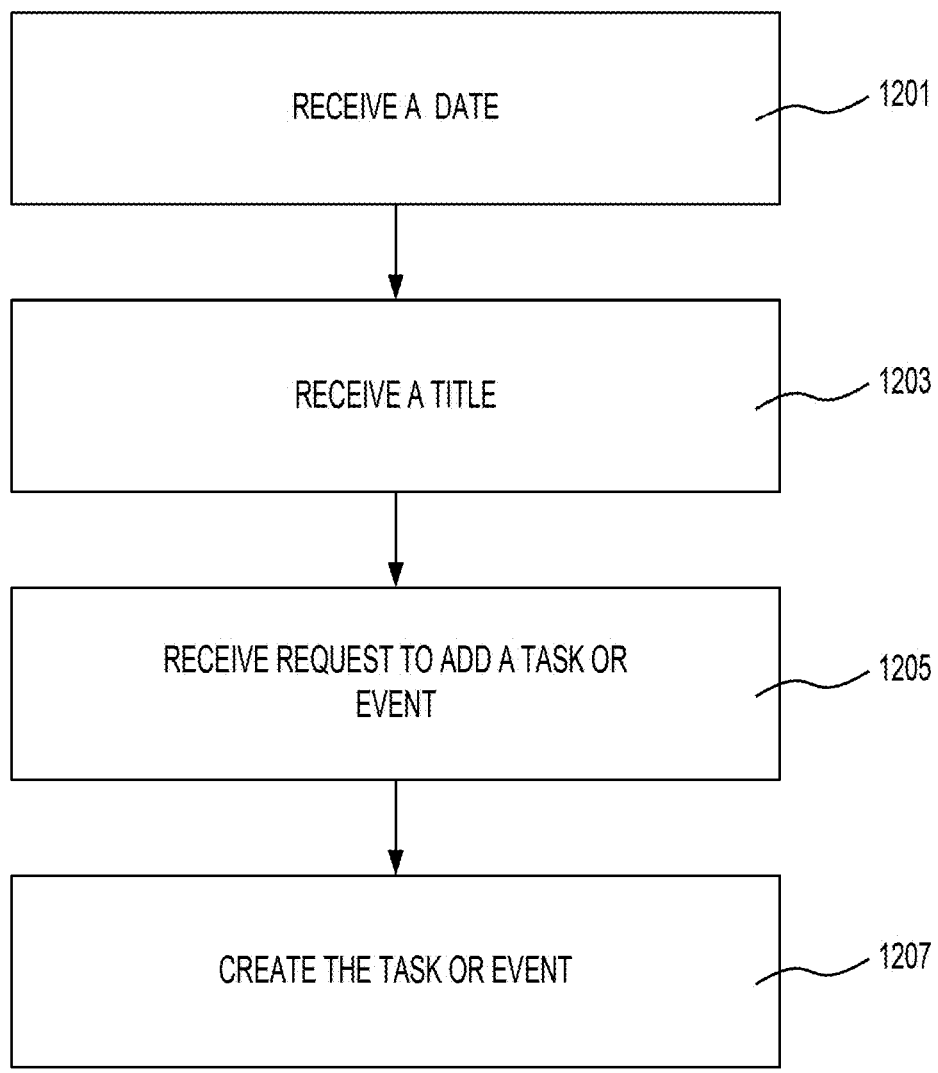
FIG. 12 is a flowchart of an example method for creating a task or event, according to yet another example embodiment of the present disclosure.

FIG. 12 shows a flowchart of example method 1200 for creating a task or event. Method 1200 may be implemented using a general-purpose computer including a processor, e.g., collaboration server 7201 of FIG. 72. Alternatively, a special-purpose computer may be built for implementing method 1200 using suitable logic elements.

At step 1201, the processor receives a date. For example, the processor may receive data stored in one or more known data models with associated serialization formats. Such models may include serialized data from which the processor may extract the date. By way of further example, the processor may receive metadata or data having demarcated locations. In such an example, the processor may extract the date from the metadata or demarcated locations. By way of further example, the processor may extract the date by searching for predetermined formats within received text data. For example, the received date may comprise text in a particular format, e.g., "XX/XX"; "XX/XX/XX"; "XX/XX/XXXX"; "X/X"; "X/X/XX"; "X/X/XXXX"; "X/XX/XX"; "X/XX/XXXX"; "XX/X/XX"; "XX/X/XXXX"; or the like.

At step 1203, the processor receives a title. For example, the received title may comprise text.

At step 1205, the processor receives a request to add a task or event. At step 1207, the processor creates the task or event based on at least the received date and the received title. Afterward, the task or event may be visible to the user, to team members within a team, and/or to other users within a conversation.

Method 1200 may further include additional steps. For example, method 1200 may further include authenticating a user. For example, authenticating a user may include at least one of method 600 or method 700, described above, a combination thereof, or any other appropriate authentication method (e.g., sending a confirmation link, such as a URL, to the user).

By way of further example, method 1200 may further include receive a start time and/or an end time. For example, the processor may receive data stored in one or more known data models with associated serialization formats. Such models may include serialized data from which the processor may extract the time(s). By way of further example, the processor may receive metadata or data having demarcated locations. In such an example, the processor may extract the time(s) from the metadata or demarcated locations. By way of further example, the processor may extract the time(s) by searching for predetermined formats within received text data. For example, the received time may comprise text in a particular format, e.g., "X:XX"; "XX:XX"; "X:XX [AM/PM]"; "XX:XX [AM/PM]"; or the like. In such examples, the created task or request may also be based on the received start time and/or the received end time.

In some examples, the processor may receive one or more participants from the user to add as participants for the task or event. In such an example, the processor may then invite the one or more participants, for example, using an email message, a chat message, an SMS message, or the like.

By way of further example, the processor may receive a request to assign a task to one or more team members. In such an example, the processor may then notify the assigned team members, for example, using an email message, a chat message, an SMS message, or the like. In certain aspects, a task may be reassigned from some team member(s) to other team member(s). In these aspects, the processor may notify both the formerly assigned team members and the newly assigned team members of the reassignment.

Figure 13:
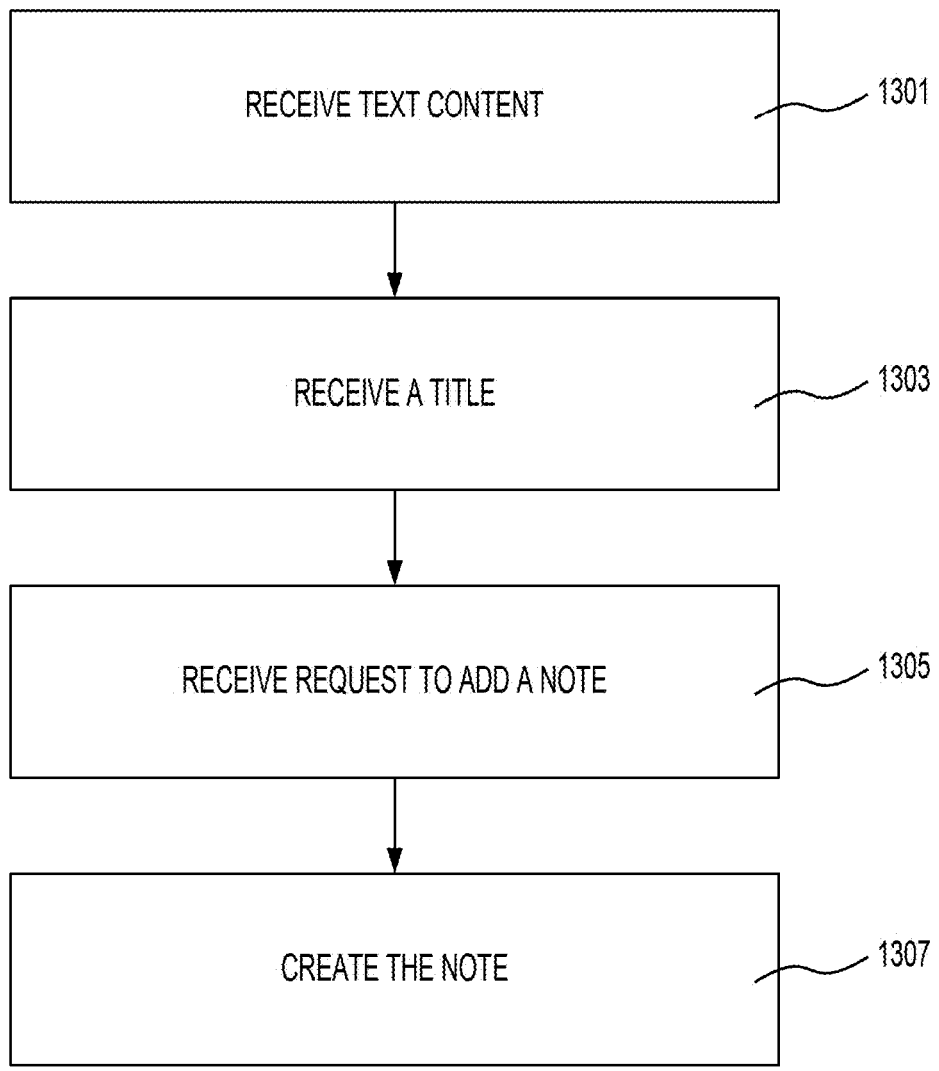
FIG. 13 is a flowchart of an example method for creating a note, according to yet another example embodiment of the present disclosure.

FIG. 13 shows a flowchart of example method 1300 for creating a note. Method 1300 may be implemented using a general-purpose computer including a processor, e.g., collaboration server 7201 of FIG. 72. Alternatively, a special-purpose computer may be built for implementing method 1300 using suitable logic elements.

At step 1301, the processor receives text content. Alternatively or concurrently, the processor may receive images, links, or other data.

At step 1303, the processor receives a title. For example, the received title may comprise text.

At step 1305, the processor receives a request to create a note. At step 1307, the processor creates the note based on at least the received text content and the received title. Afterward, the note may be visible to the user, to team members within a team, and/or to other users within a conversation Method 1300 may further include additional steps. For example, method 1300 may further include authenticating a user. For example, authenticating a user may include at least one of method 600 or method 700, described above, a combination thereof, or any other appropriate authentication method (e.g., sending a confirmation link, such as a URL, to the user).

Figure 14:
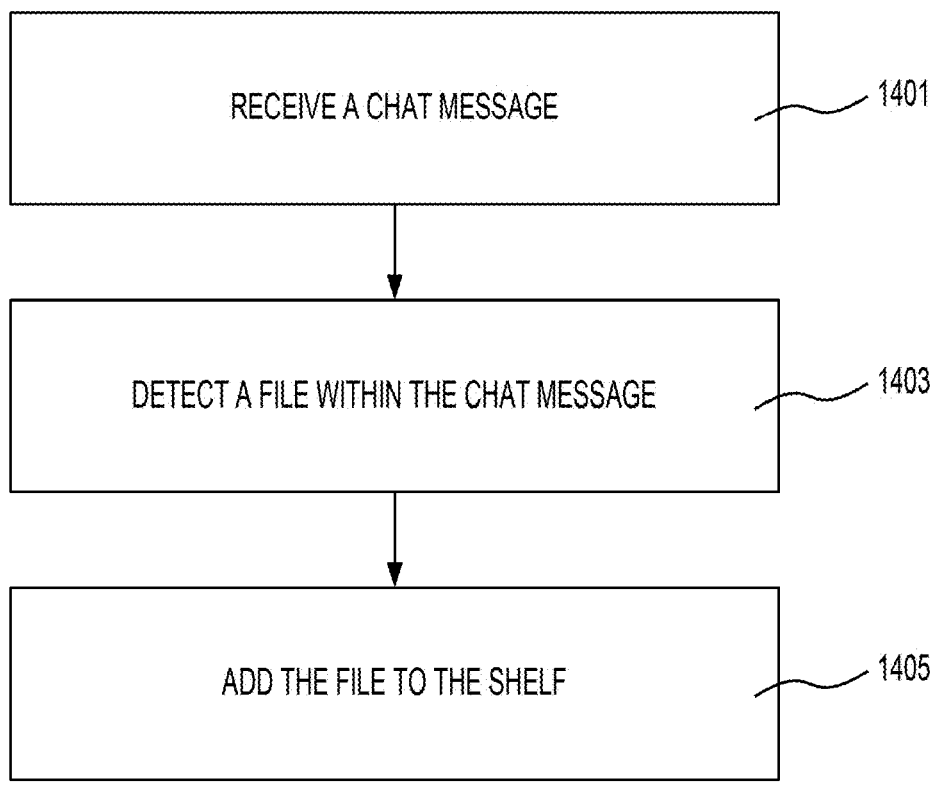
FIG. 14 is a flowchart of an example method for automatically facilitating file uploads in a chat conversation, according to yet another example embodiment of the present disclosure.

FIG. 14 shows a flowchart of example method 1400 for automatically facilitating file uploads in a chat conversation. Method 1400 may be implemented using a general-purpose computer including a processor, e.g., collaboration server 7201 of FIG. 72. Alternatively, a special-purpose computer may be built for implementing method 1400 using suitable logic elements.

At step 1401, the processor receives a chat message. At step 1403, the processor automatically detects that the chat message includes at least one file. For example, the processor may determine that the chat message includes a photo along with text (as depicted in GUI 5400 of FIG. 54). Although the file comprises a single photo in this example, the chat message may include a plurality of files, either all of the same type (e.g., audio, photo, video, pdf, etc.) or of different types.

At step 1405, the processor adds the at least one file to a repository (also termed "the shelf"). In some examples, the shelf may be represented as a GUI element that allows a user to place items onto the shelf that are then accessible through the same GUI element. The repository may be associated with a chat conversation including the received chat message or with a team including the received chat message. After being added, the at least one file may be visible to the recipients within the conversation or to team members within the team.

Method 1400 may further include additional steps. For example, method 1400 may further include authenticating a user. For example, authenticating a user may include at least one of method 600 or method 700, described above, a combination thereof, or any other appropriate authentication method (e.g., sending a confirmation link, such as a URL, to the user).

By way of further example, in lieu of steps 1401 and 1403, the processor may instead receive a file with a request to add the file to the repository.

Figure 15:
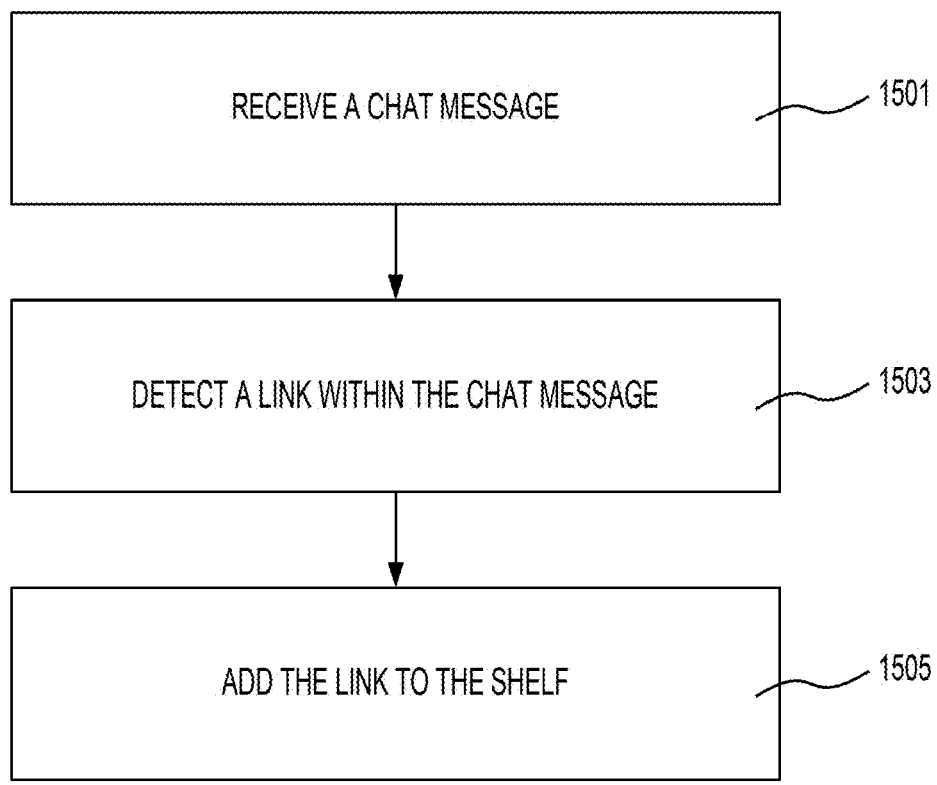
FIG. 15 is a flowchart of an example method for automatically collating links in a chat conversation, according to yet another example embodiment of the present disclosure.

FIG. 15 shows a flowchart of example method 1500 for automatically collating links in a chat conversation. Method

Figure 72:
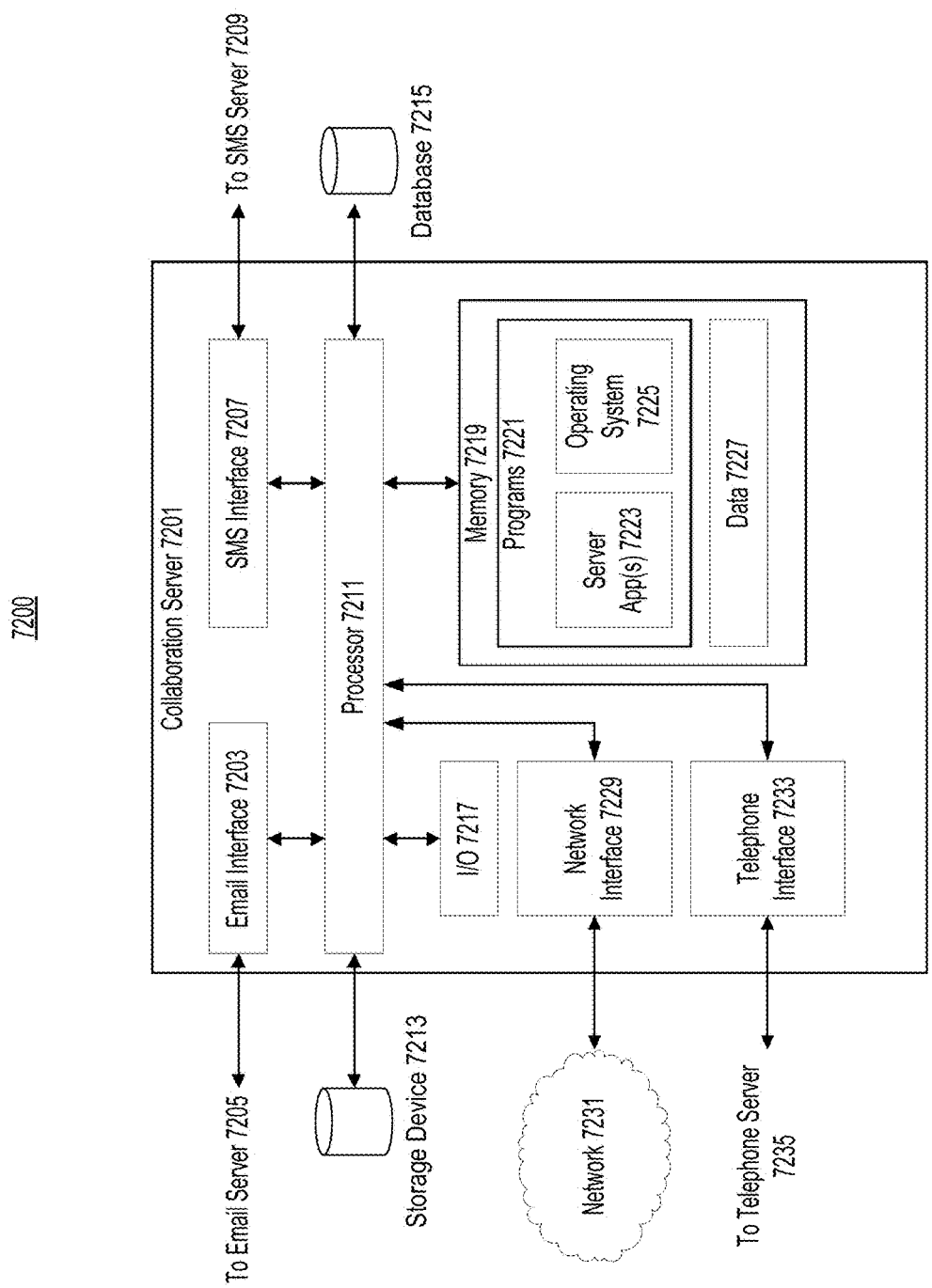
FIG. 72 is a block diagram of an example computing system with which the systems, methods, and apparatuses of the present disclosure may be implemented.

1500 may be implemented using a general-purpose computer including a processor, e.g., collaboration server 7201 of FIG. 72. Alternatively, a special-purpose computer may be built for implementing method 1500 using suitable logic elements.

At step 1501, the processor receives a chat message. At step 1503, the processor automatically detects that the chat message includes at least one link. For example, the processor may determine that text included in the chat message contains one or more links. The processor may make this determination using predetermined context clues (such as the text containing the character sequences "www."; ".com"; ".org"; ".html"; or the like) and/or employ a URL pattern matcher regular expression. Alternatively or concurrently, the processor may integrate one or more machine learning techniques with the determination such that the determination algorithm is modified each time it is used. For example, the processor may update a learning library each time the determination is made.

At step 1505, the processor adds the at least one link to a repository (also termed "the shelf"). The repository may be associated with a chat conversation including the received chat message or with a team including the received chat message. After being added, the at least one link may be visible to the recipients within the conversation or to team members within the team.

Method 1500 may further include additional steps. For example, method 1500 may further include authenticating a user. For example, authenticating a user may include at least one of method 600 or method 700, described above, a combination thereof, or any other appropriate authentication method (e.g., sending a confirmation link, such as a URL, to the user).

By way of further example, in lieu of steps 1501 and 1503, the processor may instead receive a link with a request to add the link to the repository.

Figure 16:
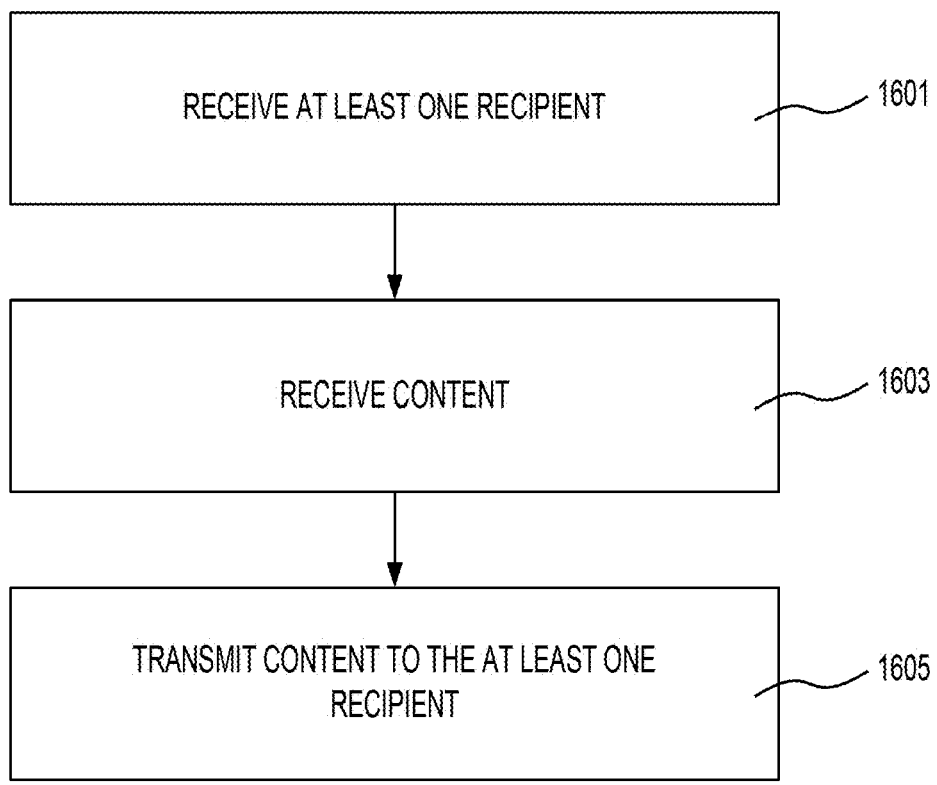
FIG. 16 is a flowchart of an example method for facilitating messaging between users, according to yet another example embodiment of the present disclosure.

FIG. 16 shows a flowchart of example method 1600 for facilitating messaging between users. Method 1600 may be implemented using a general-purpose computer including a processor, e.g., collaboration server 7201 of FIG. 72. Alternatively, a special-purpose computer may be built for implementing method 1600 using suitable logic elements.

At step 1601, the processor receives at least one recipient from a user. In some embodiments, the processor may send the user a list of contacts associated with the user. The user may then select at least one contact from the list as the at least one recipient, and the processor may extract the at least one recipient from the contact list.

At step 1603, the processor receives content from the user. For example, the processor may receive text content (e.g., ASCII text, Unicode text, etc.), audio/video content (e.g., in the form of a video file, a photo file, an audio file, or the like), or the like.

At step 1605, the processor transmits a message addressed to the at least one recipient and having the content. For example, if the content comprises a combination of text and a file, the processor may bundle the file with the text into a single message addressed to the at least one recipient. On the other hand, if the content comprises text over a threshold length, the processor may divide the text into a plurality of messages addressed to the at least one recipient. For example, a threshold length may comprise a certain number of characters, such as 10 characters, 20 characters, etc.

Method 1600 may further include additional steps. For example, method 1600 may further include authenticating a user. For example, authenticating a user may include at least one of method 600 or method 700, described above, a combination thereof, or any other appropriate authentication method (e.g., sending a confirmation link, such as a URL, to the user).

Figure 17:
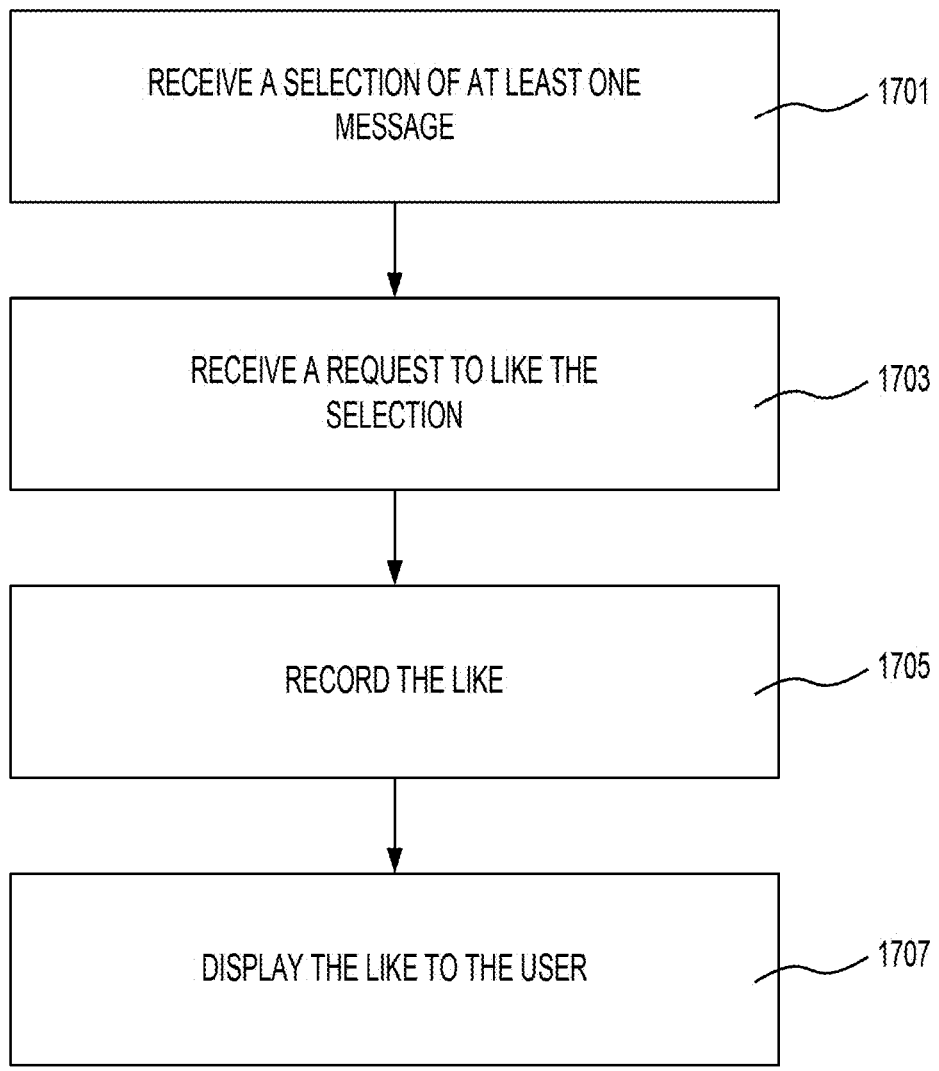
FIG. 17 is a flowchart of an example method for facilitating reactions to messages between users, according to yet another example embodiment of the present disclosure.

FIG. 17 shows a flowchart of example method 1700 for facilitating reactions to messages between users. Method 1700 may be implemented using a general-purpose computer including a processor, e.g., collaboration server 7201 of FIG. 72. Alternatively, a special-purpose computer may be built for implementing method 1700 using suitable logic elements.

At step 1701, the processor receives a selection of at least one message. The at least one message may have a plurality of recipients. In some embodiments, the user may receive a list of chat conversations (comprised of messages) from the processor. The user may then select a conversation from the list, thereby selecting the messages therein as the at least one message. The processor may thus receive the selection and extract the at least one message from the selected conversation.

At step 1703, the processor receives a request to react to the selection. For example, the processor may receive a request to "like" the selection. In certain aspects, the processor may receive the selection separately from the request. In other aspects, the processor may receive the selection concurrently with the request.

At step 1705, the processor records the reaction. For example, the processor may record the reaction on a remote server and/or on a user interface device associated with the user. Thus, in some embodiments, the reaction may be visible only to the user while, in other embodiments, the reactions may be visible to other users.

At step 1707, the processor displays the reaction with the selection to the user. In certain aspects, the reaction may also be transmitted for display to one or more of the plurality of recipients.

Method 1700 may further include additional steps. For example, method 1700 may further include authenticating a user. For example, authenticating a user may include at least one of method 600 or method 700, described above, a combination thereof, or any other appropriate authentication method (e.g., sending a confirmation link, such as a URL, to the user).

Figure 18:
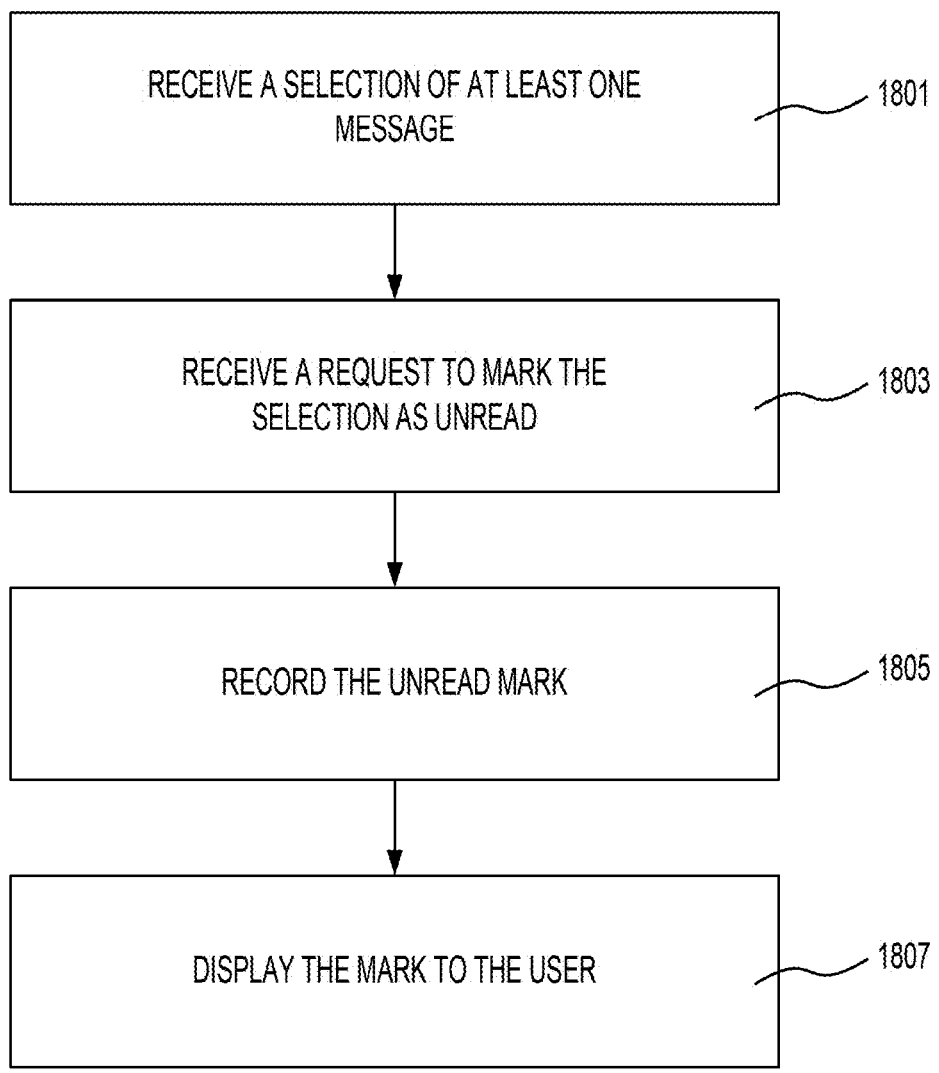
FIG. 18 is a flowchart of an example method for changing a status of a message, according to yet another example embodiment of the present disclosure.

FIG. 18 shows a flowchart of example method 1800 for changing a status of a message. Method 1800 may be implemented using a general-purpose computer including a processor, e.g., collaboration server 7201 of FIG. 72. Alternatively, a special-purpose computer may be built for implementing method 1800 using suitable logic elements.

At step 1801, the processor receives a selection of at least one message. The at least one message may have a plurality of recipients. In some embodiments, the user may receive a list of chat conversations (comprised of messages) from the processor. The user may then select a conversation from the list, thereby selecting the messages therein as the at least one message. The processor may thus receive the selection and extract the at least one message from the selected conversation.

At step 1803, the processor receives a request to mark the selection as "read" (or as "unread"). In certain aspects, the processor may receive the selection separately from the request. In other aspects, the processor may receive the selection concurrently with the request.

At step 1805, the processor records the read mark. For example, the processor may record the mark on a remote server and/or on a user interface device associated with the user.

At step 1807, the processor displays the mark with the selection to the user. In certain aspects, the mark may also be transmitted for display to one or more of the plurality of recipients.

Method 1800 may further include additional steps. For example, method 1800 may further include authenticating a user. For example, authenticating a user may include at least one of method 600 or method 700, described above, a combination thereof, or any other appropriate authentication method (e.g., sending a confirmation link, such as a URL, to the user).

Figure 19:
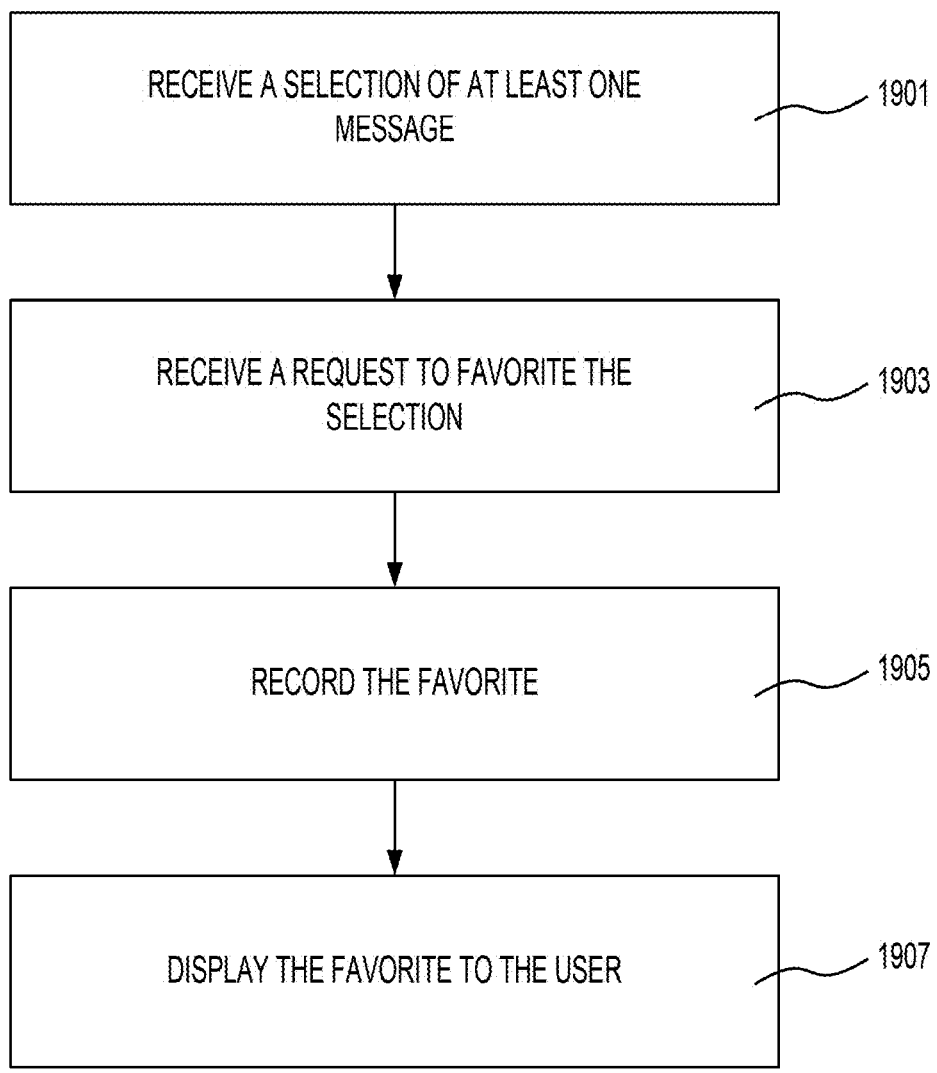
FIG. 19 is a flowchart of another example method for changing a status of a message, according to yet another example embodiment of the present disclosure.

FIG. 19 shows a flowchart of example method 1900 for changing a status of a message. Method 1900 may be implemented using a general-purpose computer including a processor, e.g., collaboration server 7201 of FIG. 72. Alternatively, a special-purpose computer may be built for implementing method 1900 using suitable logic elements.

At step 1901, the processor receives a selection of at least one message. The at least one message may have a plurality of recipients. In some embodiments, the user may receive a list of chat conversations (comprised of messages) from the processor. The user may then select a conversation from the list, thereby selecting the messages therein as the at least one message. The processor may thus receive the selection and extract the at least one message from the selected conversation.

At step 1903, the processor receives a request to favorite (or unfavorite) the selection. In certain aspects, the processor may receive the selection separately from the request. In other aspects, the processor may receive the selection concurrently with the request.

At step 1905, the processor records the favorite. For example, the processor may record the favorite on a remote server and/or on a user interface device associated with the user.

At step 1907, the processor displays the favorite with the selection to the user. In certain aspects, the favorite may also be transmitted for display to one or more of the plurality of recipients.

Method 1900 may further include additional steps. For example, method 1900 may further include authenticating a user. For example, authenticating a user may include at least one of method 600 or method 700, described above, a combination thereof, or any other appropriate authentication method (e.g., sending a confirmation link, such as a URL, to the user).

Figure 20:
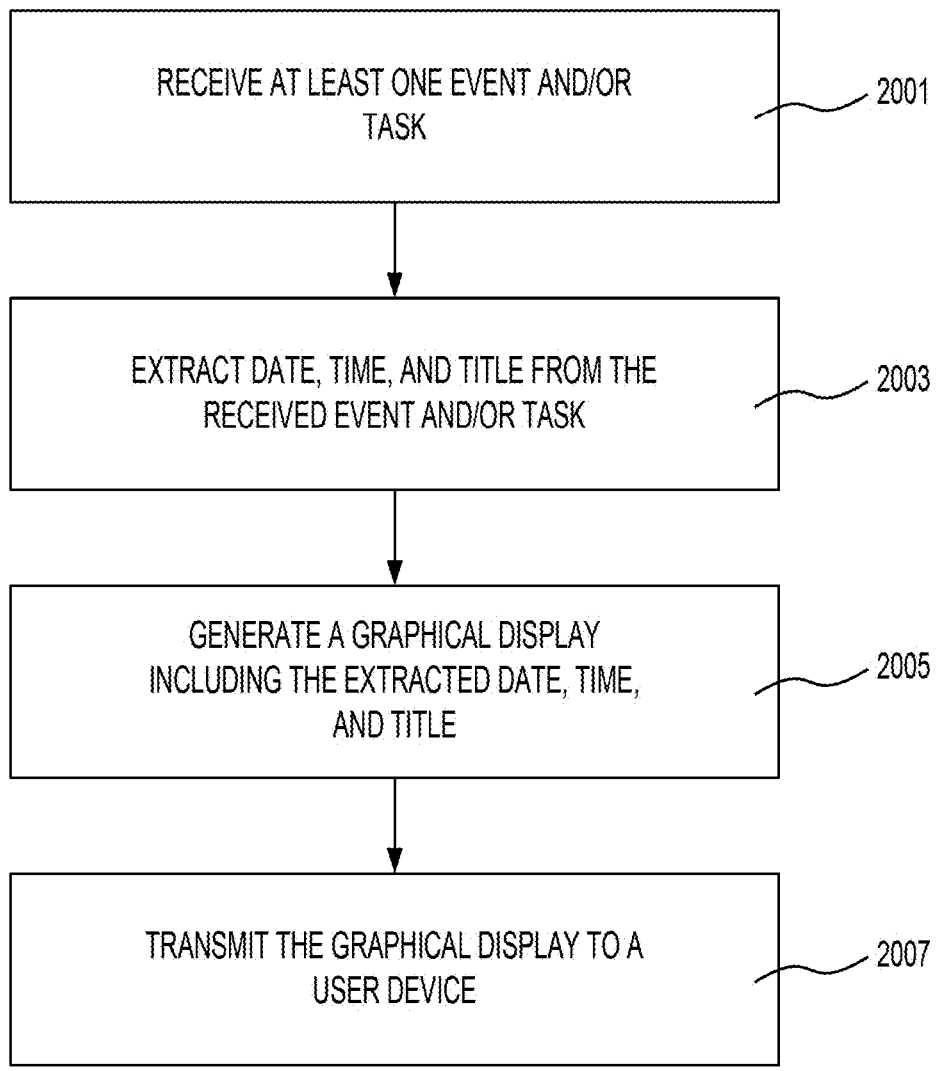
FIG. 20 is a flowchart of an example method for displaying events and tasks in a graphical format, according to yet another example embodiment of the present disclosure.

FIG. 20 shows a flowchart of example method 2000 for displaying events and tasks in a graphical format. Method 2000 may be implemented using a general-purpose computer including a processor, e.g., collaboration server 7201 of FIG. 72. Alternatively, a special-purpose computer may be built for implementing method 2000 using suitable logic elements.

At step 2001, the processor receives at least one event or task. The event or task may be retrieved from a storage device operably connected to the processor and/or over a computer network.

At step 2003, the processor may automatically extract at least one date, at least one time, and at least one title from the received events or tasks. For example, the received at least one event or task may be stored in one or more known data models with associated serialization formats. Such models may include serialized data from which the processor may extract the date. Alternatively or concurrently, the received at least one event or task may have metadata and/or demarcated locations within the data. In such an example, the processor may extract the date from the metadata or demarcated locations. Alternatively or concurrently, the received at least one event or task may comprise text data, and the processor may extract the date by searching for predetermined formats within received text data. For example, the processor may search for possible date formats, including, e.g., "XX/XX"; "XX/XX/XX"; "XX/XX/XXXX"; "X/X"; "X/X/XX"; "X/X/XXXX"; "X/XX/XX"; "X/XX/XXXX"; "XX/X/XX"; "XX/X/XXXX"; and the like.

Similarly, the received at least one event or task may be stored in one or more known data models with associated serialization formats, and such models may include serialized data from which the processor may extract the time. Alternatively or concurrently, the received at least one event or task may have metadata and/or demarcated locations within the data. In such an example, the processor may extract the time from the metadata or demarcated locations. Alternatively or concurrently, the received at least one event or task may comprise text data, and the processor may extract the time by searching for predetermined formats within received text data. For example, the processor may search for possible time formats, including, e.g., "X:XX"; "XX:XX"; "X:XX [AM/PM]"; "XX:XX [AM/PM]"; and the like.

Alternatively or concurrently, the processor may integrate one or more machine learning techniques with the searching such that the searching algorithm is modified each time it is used. For example, the processor may update a learning library each time for which a date and/or a time is searched.

At step 2005, the processor generates a graphical display including the extracted dates, times, and titles. At step 2007, the processor transmits the graphical display to a user device. For example, a user device (also termed a "user interface device") may comprise, for example, a smartphone, a tablet, a laptop computer, a desktop computer, or the like.

Method 2000 may further include additional steps. For example, method 2000 may further include authenticating a user. For example, authenticating a user may include at least one of method 600 or method 700, described above, a combination thereof, or any other appropriate authentication method (e.g., sending a confirmation link, such as a URL, to the user).

Figure 21:
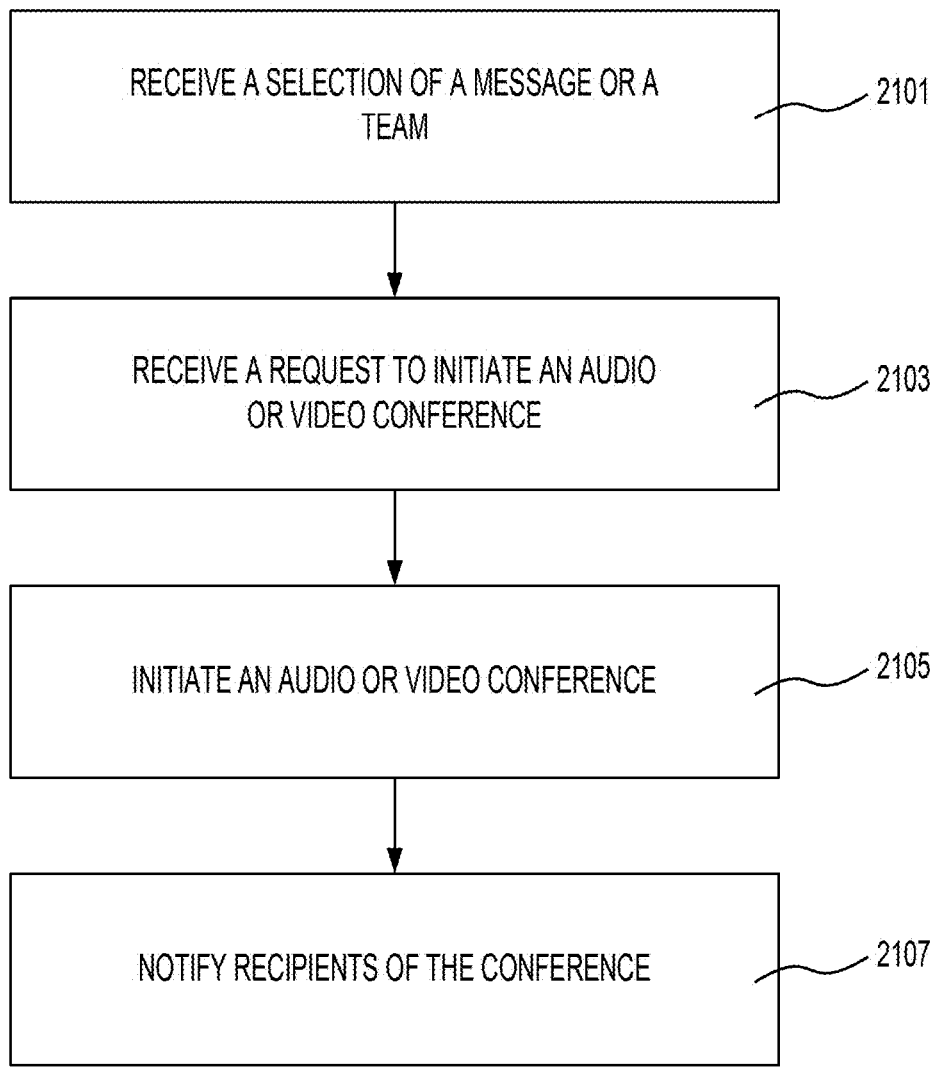
FIG. 21 is a flowchart of an example method for converting a chat conversation to an audio or video conference, according to yet another example embodiment of the present disclosure.

FIG. 21 shows a flowchart of example method 2100 for converting a chat conversation to an audio or video conference. Method 2100 may be implemented using a general-purpose computer including a processor, e.g., collaboration server 7201 of FIG. 72. Alternatively, a special-purpose computer may be built for implementing method 2100 using suitable logic elements.

At step 2101, the processor receives a selection of at least one message or of at least one team. The at least one message may have a plurality of recipients, and the at least one team may have a plurality of team members.

At step 2103, the processor receives a request to initiate an audio or video conference. In certain aspects, the processor may receive the selection separately from the request. In other aspects, the processor may receive the selection concurrently with the request.

At step 2105, the processor initiates an audio or video conference. After initiation, and at step 2107, the processor notifies the plurality of recipients or the plurality of team members of the initiation. For example, initiating a conference may comprise activating a synchronous conferencing protocol or an asynchronous conferencing protocol. In activating the protocol, the processor may automatically add some or all of the plurality of recipients or the plurality of team members to the conference and then send a notification to the added recipients/team members. Alternatively, the notification sent to some or all of the plurality of recipients or the plurality of team members may include a request for a response. For example, the notification may allow a recipient or member to either accept and be added to the conference, or to reject and not be added to the conference.

Method 2100 may include additional steps. For example, method 2100 may further include authenticating a user. For example, authenticating a user may include at least one of method 600 or method 700, described above, a combination thereof, or any other appropriate authentication method (e.g., sending a confirmation link, such as a URL, to the user).

FIG. 22 shows an example GUI 2200 for authenticating a user of a collaboration service. As depicted in FIG. 22, GUI 2200 includes a first text box 2201 for receiving a username and a second text box 2203 for receiving a password. In some embodiments, text box 2203 may mask the entered characters (for example, by replacing the entered characters with * or with •).

As further depicted in FIG. 22, GUI 2200 includes a button 2205 for receiving a request to submit the username entered in first text box 2201 and the password entered in second text box 2203. GUI 2200 may thus be used in one or more implementations of method 600 of FIG. 6, method 700 of FIG. 7, a combination thereof, or other appropriate authentication methods.

Figure 23:
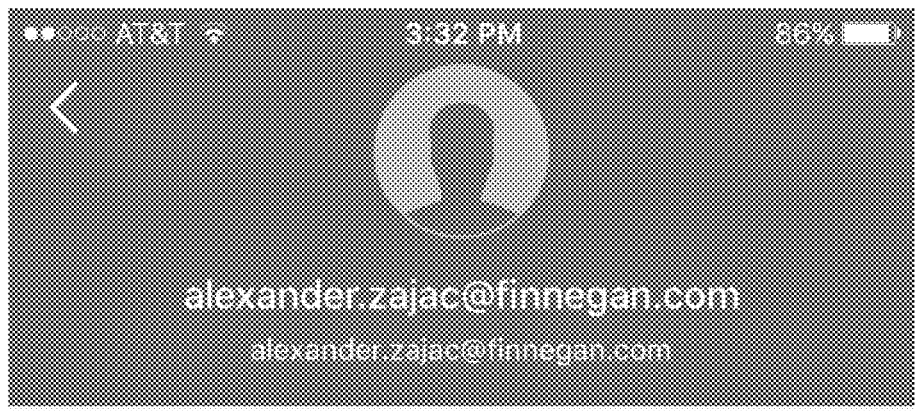
FIG. 23 is an example graphical user interface (GUI) for receiving a sign off request from a user, according to yet another example embodiment of the present disclosure.

FIG. 23 shows an example GUI 2300 for receiving a sign out request from a user. As depicted in FIG. 23, GUI 2300 includes a button 2301 for receiving a sign out request.

As further depicted in FIG. 23, GUI 2300 may also include a first drop-down box 2303 for modifying settings related to a user interface device (such as a smartphone) and/or a phone number associated with the user and a second drop-down box 2305 for modifying settings related to an email associated with the user. For example, settings related to the user interface device may include settings regarding frequency, number, etc. of notifications provided to the user via the user interface device. Furthermore, GUI 2300 may also include a help button 2307 for receiving documents related to one or more functionalities of an application including GUI 2300 and may also include an about button 2309 for receiving version information, copyright information, and the like related to an application including GUI 2300.

Figure 24:
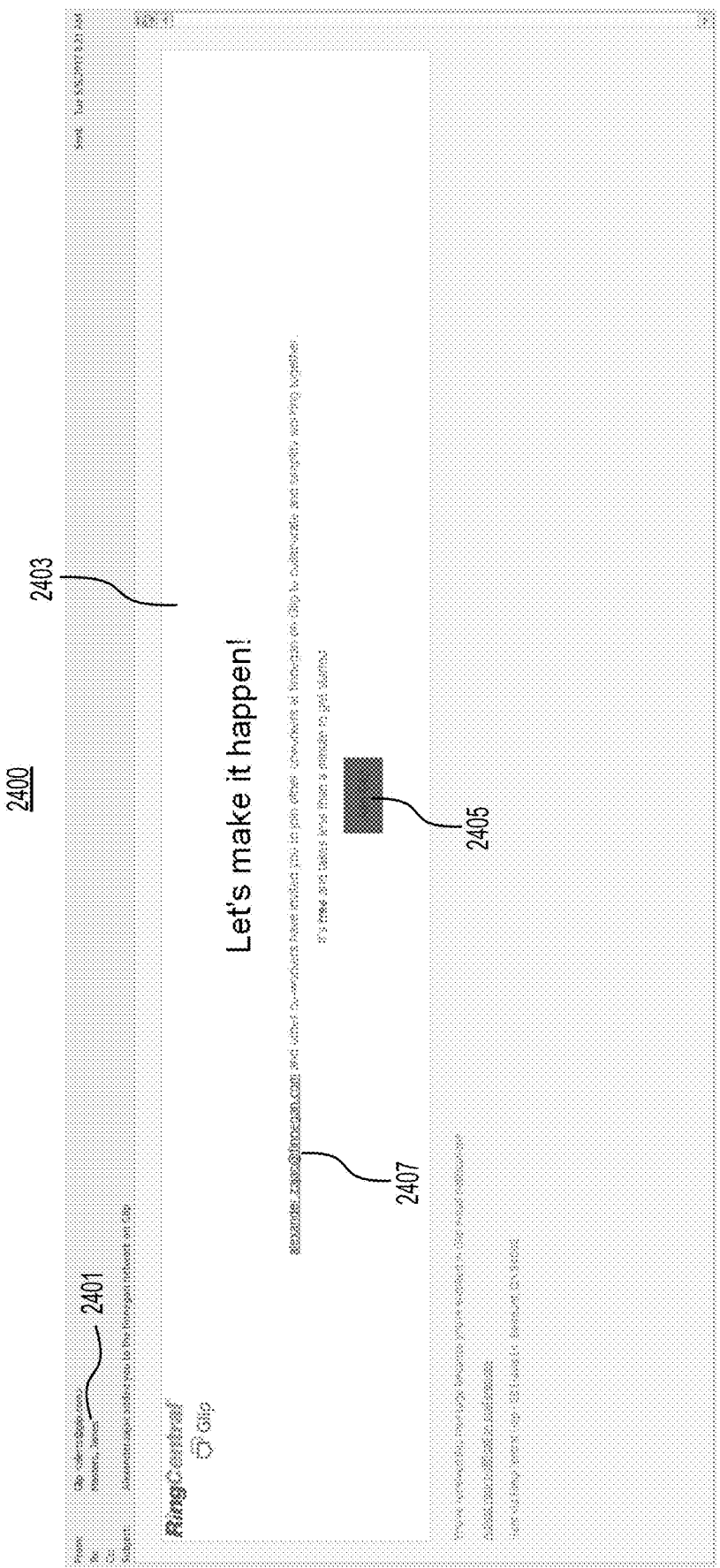
FIG. 24 is an example graphical user interface (GUI) including an example email having a link to register for a collaboration service, according to yet another example embodiment of the present disclosure.

FIG. 24 shows an example GUI 2400 including an example email having a link to register for a collaboration service. As depicted in FIG. 24, the email may be addressed to at least one contact 2401. The email may further include a body 2403 having, for example, a link 2405 to join the collaboration service and an identification of a user 2407. For example, the at least one contact may have been invited to join the collaboration service by the user.

FIG. 25 shows an example GUI 2500 including an example text message having a link to register for a collaboration service. As depicted in FIG. 25, the text message may be addressed to at least one contact, e.g., the contact(s) indicated in "To" line 2501. As further depicted in FIG. 25, the text message may include a body 2503 having, for example, a link to join the collaboration service.

FIG. 26 shows an example GUI 2600 for creating a collaborative team. As depicted in FIG. 26, GUI 2600 may include a text box 2601 for receiving a title for the team, a drop-down box 2603 for selecting one or more settings related to the team (e.g., whether the team is private, public, etc.), and a space 2605 for receiving one or more potential team members. As further depicted in FIG. 26, GUI 2600 may include a first button 2607 for submitting a request to create the team, and a second button 2609 for receiving a contact list associated with a user of GUI 2600. For example, when clicked, second button 2609 may present the user GUI 2700 of FIG. 27 or other appropriate GUI for displaying a contacts list to the user.

Figure 27:
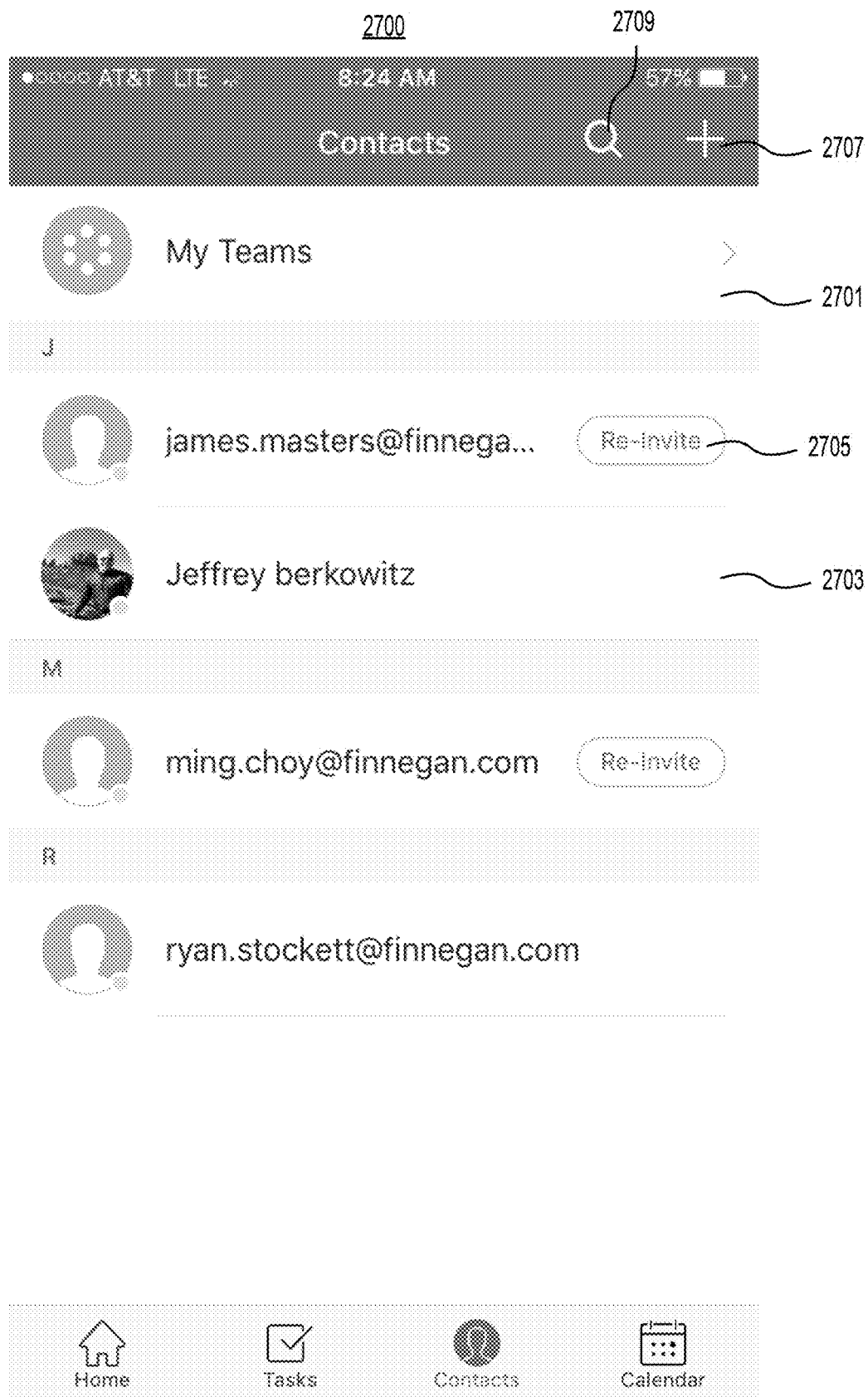
FIG. 27 is an example graphical user interface (GUI) including a contacts list, according to yet another example embodiment of the present disclosure.

FIG. 27 shows an example GUI 2700 including a contacts list. As depicted in FIG. 27, GUI 2700 may include a list of one or more teams (e.g., team 2701) in which a user of GUI 2700 is a team member and may further include a list of one or more contacts (e.g., contact 2703) stored in a contacts list associated with the user. GUI 2700 may also include one or more buttons (e.g., button 2705) for sending an invite (e.g., using GUI 2500 and/or GUI 2400) to a contact on the contacts list. As further depicted in FIG. 27, GUI 2700 may include a first button 2707 for submitting a request to add a contact to the contacts list.

As further depicted in FIG. 27, GUI 2700 may include a second button 2709 for implementing a search function. For example, the search function may search the contacts list. In some embodiments, when clicked, second button 2709 may present the user GUI 6400 of FIG. 64 or other appropriate GUI for implementing a search function.

Figure 28:
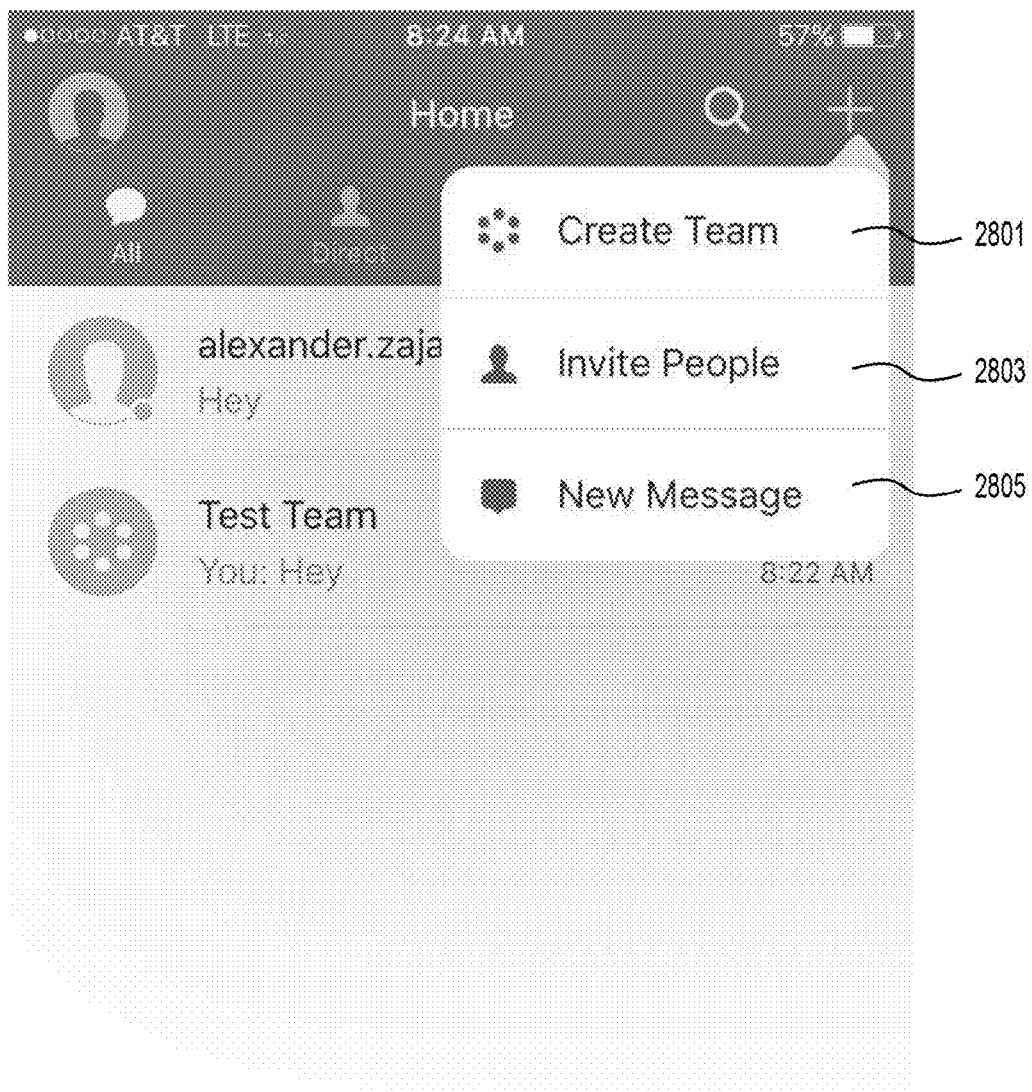
FIG. 28 is an example graphical user interface (GUI) for sending requests to create a collaborative team, message one or more recipients, or invite one or more recipients to use a collaborative service, according to yet another example embodiment of the present disclosure.

FIG. 28 shows an example GUI 2800 for sending requests to create a collaborative team, message one or more recipients, or invite one or more recipients to use a collaborative service. As depicted in FIG. 28, GUI 2800 may include a first button 2801 for receiving a request to create a team, a second button 2803 for receiving a request for sending an invite, and a third button 2805 for receiving a request to send a message.

FIG. 29 shows an example GUI 2900 for displaying a list of collaborative teams. As depicted in FIG. 29, GUI 2900 may include a list of one or more teams (e.g., team 2901) in which a user of GUI 2900 is a team member. For example, the list may include the title of the team, the sender and content of the last-sent message within the team, and the like. As further depicted in FIG. 29, and similar to GUI 2700, GUI 2900 may include a first button 2903 for submitting a request to create a team.

As further depicted in FIG. 29, and similar to GUI 2700, GUI 2900 may include a second button 2905 for implementing a search function. For example, the search function may search the list of collaborative teams. In some embodiments, when clicked, second button 2705 may present the user GUI 6400 of FIG. 64 or other appropriate GUI for implementing a search function.

Figure 30:
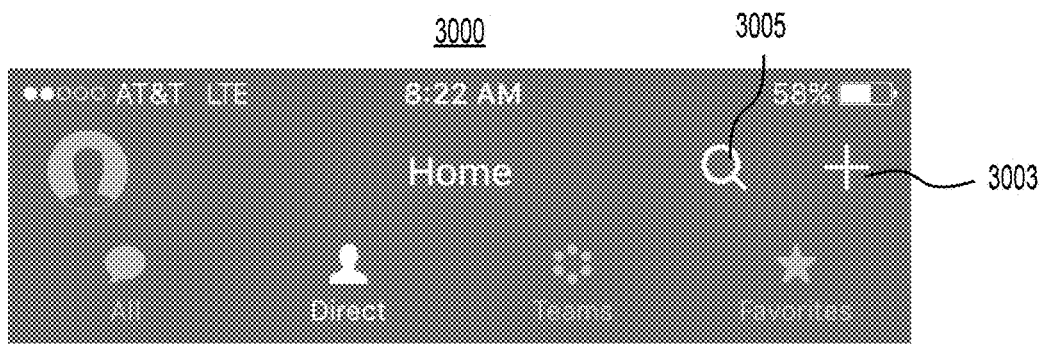
FIG. 30 is an example graphical user interface (GUI) for displaying a list of chat conversations, according to yet another example embodiment of the present disclosure.

FIG. 30 shows an example GUI 3000 for displaying a list of chat conversations. As depicted in FIG. 30, GUI 3000 may include a list of one or more chat conversations (e.g., conversation 3001) in which a user of GUI 3000 is a recipient. For example, the list may include one or more recipients of the conversation, the sender and content of the last-sent message within the conversation, and the like. As further depicted in FIG. 30, GUI 3000 may include a first button 3003 for submitting a request to send a message.

As further depicted in FIG. 30, and similar to GUI 2700 and GUI 2900, GUI 3000 may include a second button 3005 for implementing a search function. For example, the search function may search the list of chat conversations. In some embodiments, when clicked, second button 3005 may present the user GUI 6400 of FIG. 64 or other appropriate GUI for implementing a search function.

Figure 31:
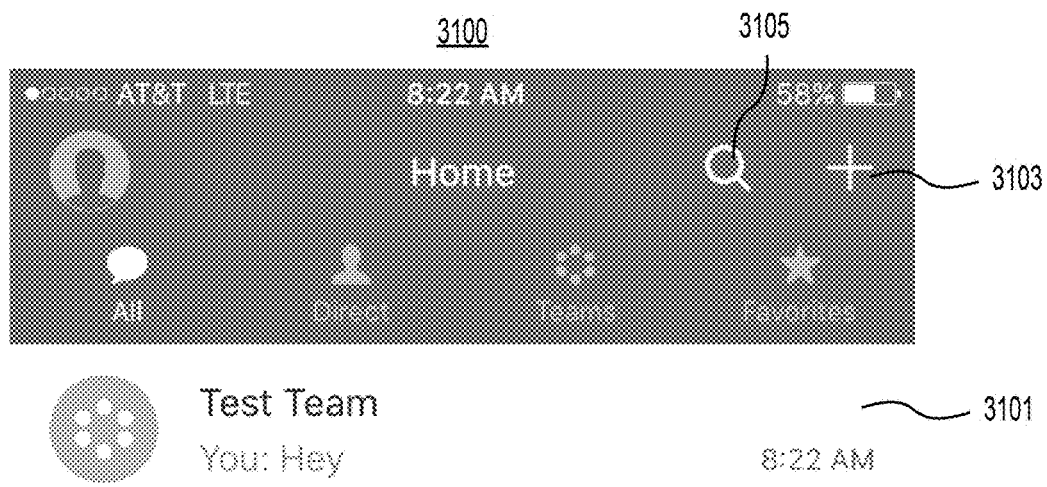
FIG. 31 is an example graphical user interface (GUI) for displaying a combined list of collaborative teams and chat conversations, according to yet another example embodiment of the present disclosure.

FIG. 31 shows an example GUI 3100 for displaying a combined list of collaborative teams and chat conversations. As depicted in FIG. 31, GUI 3100 may include a combined list having one or more teams (e.g., team 3101) in which a user of GUI 3100 is a team member and one or more chat conversations (not shown) in which a user of GUI 3100 is a recipient. As further depicted in FIG. 31, and similar to GUI 2700, GUI 2900, and GUI 3000, GUI 3100 may include a first button 3103 for submitting a request to create a team and/or a request to send a message. As depicted in FIG. 31, first button 3103 may comprise a "plus" button.

As further depicted in FIG. 31, and similar to GUI 2700, GUI 2900, and GUI 3000, GUI 3100 may include a second button 3105 for implementing a search function. For example, the search function may search the combined list of teams and conversations. In some embodiments, when clicked, second button 3105 may present the user GUI 6400 of FIG. 64 or other appropriate GUI for implementing a search function.

Figure 32:
FIG. 32 is an example graphical user interface (GUI) for displaying a list of team members, according to yet another example embodiment of the present disclosure.

FIG. 32 shows an example GUI 3200 for displaying a list of team members within a team. As depicted in FIG. 32, GUI 3200 may include a list of one or more team members (e.g., team member 3201) in which a user of GUI 3200 is a recipient. The list may include the user of GUI 3200 as shown in FIG. 32 (team member 3203 labeled "me" is the user of GUI 3200 in the example of FIG. 32) or may exclude the user of GUI 3200 (that is, only show the other members of the team). As further depicted in FIG. 32, GUI 3200 may include a button 3205 for receiving a request to add a team member.

Figure 33:
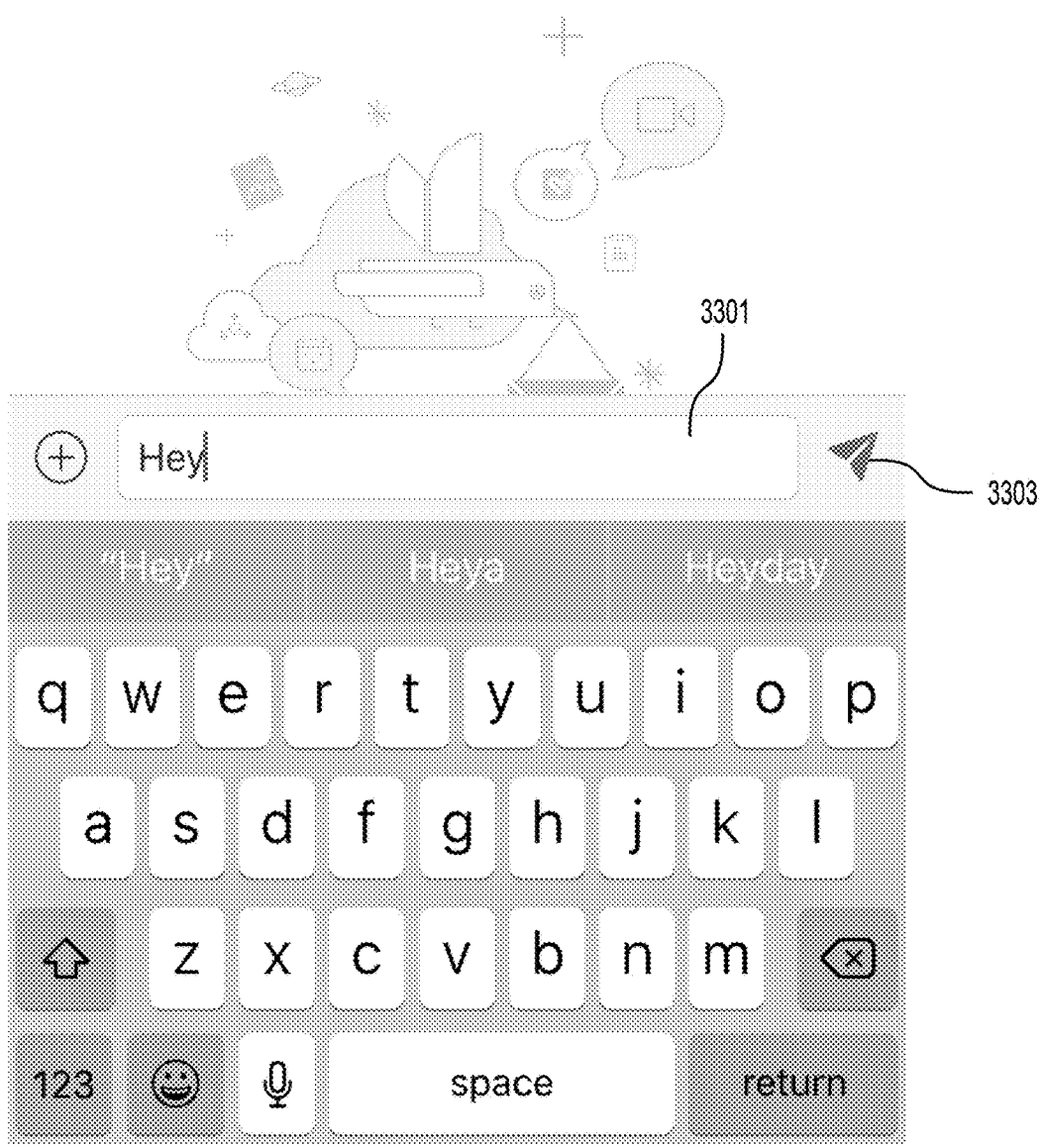
FIG. 33 is an example graphical user interface (GUI) for receiving input of a message for transmitting to a team and/or to one or more recipients, according to yet another example embodiment of the present disclosure.

FIG. 33 shows an example GUI 3300 for receiving a message for transmitting to a team and/or to one or more recipients. As depicted in FIG. 33, GUI 3300 may include a text box 3301 for receiving text content and a button 3305 for submitting a request to send a message. In the example of FIG. 33, the message is sent to a team (i.e., to the team members within the team). However, other embodiments are possible in which the message is sent to a subset of team members within the team or to one or more individually specified recipients.

Figure 34:
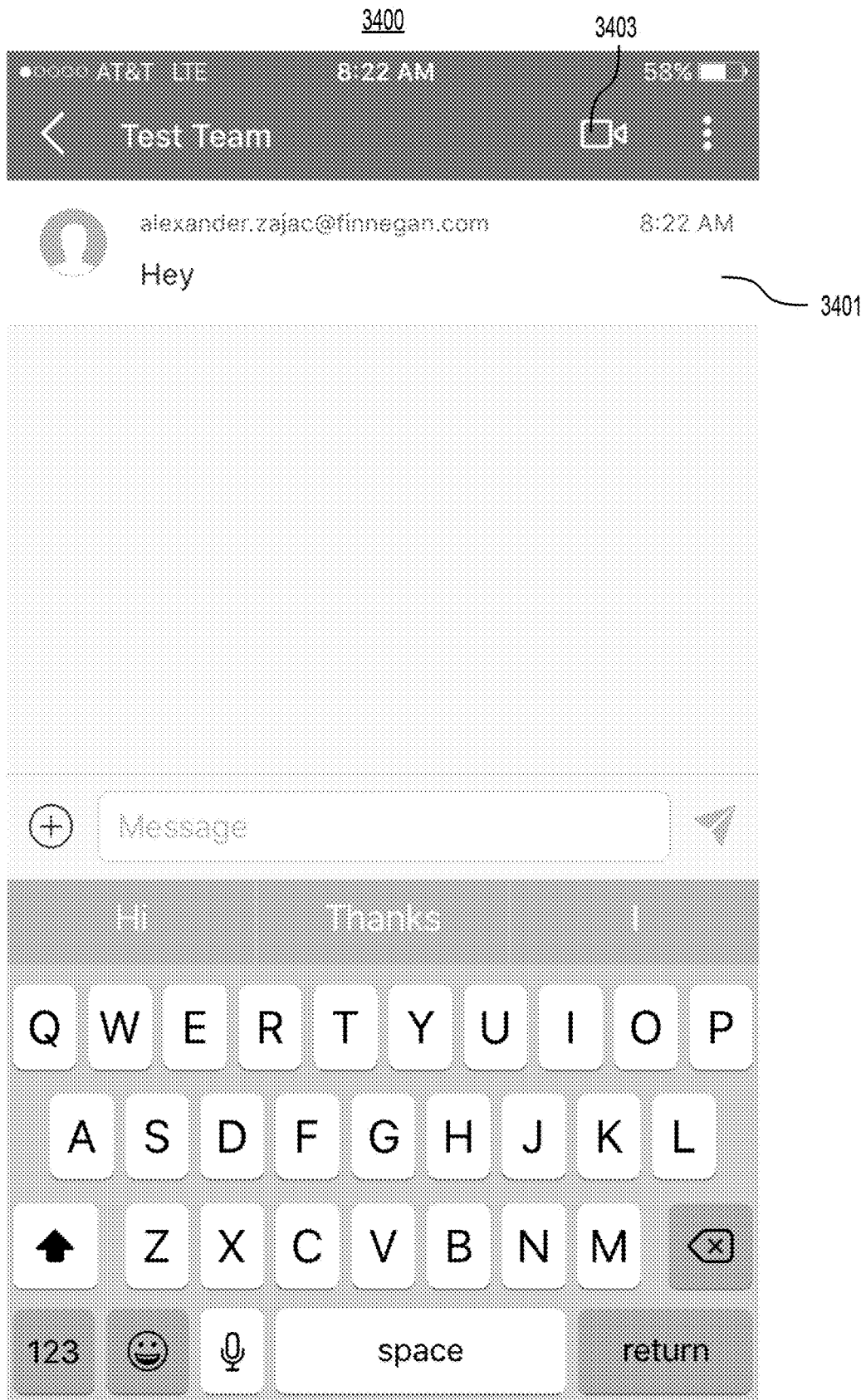
FIG. 34 is an example graphical user interface (GUI) for displaying a chat conversation associated with a team and/or with one or more recipients, according to yet another example embodiment of the present disclosure.

FIG. 34 shows an example GUI 3400 for displaying a chat conversation associated with a team and/or with one or more recipients. As depicted in FIG. 34, GUI 3400 may include a list of one or more chat messages (e.g., message 3401) in the chat conversation associated with a team and/or with one or more recipients. For example, for each chat message, the list may include the sender of the chat message, the content of the chat message, a date and/or time of sending the chat message, a date and/or time of receiving the chat message, and the like. As further depicted in FIG. 34, GUI 3400 may include a button 3403 for receiving a request to convert the chat conversation to an audio conference and/or a video conference. This request may be used in one or more implementations of method 2100 of FIG. 21 and/or other appropriate methods.

FIG. 35 shows another example GUI 3500 for displaying a chat conversation associated with a team. As depicted in FIG. 35, GUI 3500 may include a list of one or more chat messages (e.g., message 3501*a* and message 3501*b*) in the chat conversation associated with a team. For example, for each message, the list may include the sender of the chat message, the content of the chat message, a date and/or time of sending the chat message, a date and/or time of receiving the chat message, and the like. As further depicted in FIG. 35, GUI 3500 may include tasks (not shown), events (e.g., event 3503), files (not shown), or the like in the chat conversation.

FIG. 36 shows an example GUI 3600 for displaying a reaction to a message. As depicted in FIG. 36, GUI 3600 may include a list of one or more messages (e.g., message 3601*a* and message 3601*b*) in a chat conversation associated with a team and/or associated with one or more recipients. For example, for each message, the list may include the sender of the message, the content of the message, a date and/or time of sending the message, a date and/or time of receiving the message, and the like. GUI 3600 may also include tasks (not shown), events (e.g., event 3603), files (not shown), or the like in the chat conversation. As further depicted in FIG. 36, GUI 3600 may show one or more reactions (e.g., a "like") to one or more messages in the list (e.g., message 3601*b*). Even though the example of FIG. 36 shows a reaction associated with a message, other embodiments may show reactions to tasks, events, files, or other objects included in the chat conversation.

FIG. 37 shows an example GUI 3700 for receiving a request to react to a message. In the example of FIG. 37, a message (which may be associated with a team) has been selected by a user of GUI 3700. For example, a user may have left-clicked the message, right-clicked the message, double-clicked the message, tapped the message, held down a finger or stylus on the message, or the like.

As depicted in FIG. 37, GUI 3700 may include a drop down list with options which may comprise first button 3701 for receiving a request to react to the selected message. Even though the reaction in the example of FIG. 37 comprises an "unlike," other embodiments may include other reactions (such as "like," "angry," "happy," "funny," "embarrassed," or the like). As further depicted in FIG. 37, GUI 3700 may include other buttons, such as a second button 3703 for placing the text content of the selected message on a clipboard (that is, copying the text content), a third button 3705 for editing the text content of the selected message, and/or a fourth button 3707 for deleting the selected message. A user of GUI 3700 may also deselect the selected message, e.g., by using fifth button 3709.

FIG. 38 shows an example GUI 3800 for receiving a request to add a task associated with a team and/or with one or more recipients. As depicted in FIG. 38, GUI 3800 may include a button 3801 for receiving a request to add a task associated with a user of GUI 3800, associated with a team, and/or associated with one or more recipients.

FIG. 39 shows an example GUI 3900 for receiving a request to add an event associated with a team and/or with one or more recipients. As depicted in FIG. 39, GUI 3900 may include a button 3901 for receiving a request to add an event associated with a user of GUI 3900, associated with a team, and/or associated with one or more recipients.

FIG. 40 shows an example GUI 4000 for displaying a list of events (or tasks) associated with a team. As depicted in FIG. 40, GUI 4000 may include list of one or more events (e.g., event 4001) and/or tasks (not shown) associated with a team. For example, for each event, the list may include the title associated with the event, the start date and/or time of the event, the end date and/or time of the event, and the like. As further depicted in FIG. 40, GUI 4000 may include a button 4003 for receiving a request to add an event and/or a task associated with a team (e.g., a team in which a user of GUI 4000 is a team member).

FIG. 41 shows an example GUI 4100 for receiving a request to add a note associated with a team and/or with one or more recipients. As depicted in FIG. 41, GUI 4100 may include a button 4101 for receiving a request to add a note associated with a user of GUI 4100, associated with a team, and/or associated with one or more recipients.

FIG. 42 shows an example GUI 4200 for displaying a list of files associated with a team. As depicted in FIG. 42, GUI 4200 may include a list 4201 of one or more files associated with a team. (Although empty in GUI 4200, list 4201 may, in other embodiments, include one or more files.) For example, for each file, the list may include the name of the file, the size of the file, the identity of the user who shared the file, and the like. In some embodiments, GUI 4200 may further include a button (not shown) for receiving a request to add a file associated with a team (e.g., a team in which a user of GUI 4200 is a team member).

FIG. 43 shows an example GUI 4300 for receiving a request to add an event, task, note, and/or file. As depicted in FIG. 43, GUI 4300 may include a first button 4301 for receiving a request to add an event associated with a team. In some embodiments, first button 4301 may also be used to add a task associated with the team. In other embodiments, like the example depicted in FIG. 43, GUI 4300 may include a second button 4303 separate from first button 4301 for receiving a request to add a task associated with the team.

As further depicted in FIG. 43, GUI 4300 may also include a third button 4305 for receiving a request to add a note associated with the team. In addition, GUI 4300 may further include a fourth button 4307 for receiving a request to add a file associated with the team. Even though the example of FIG. 43 has a fourth button 4307 for adding a photo, other embodiments may have a fourth button 4307 for adding one or more other types of files, either in addition to or in lieu of photos.

Figure 44:
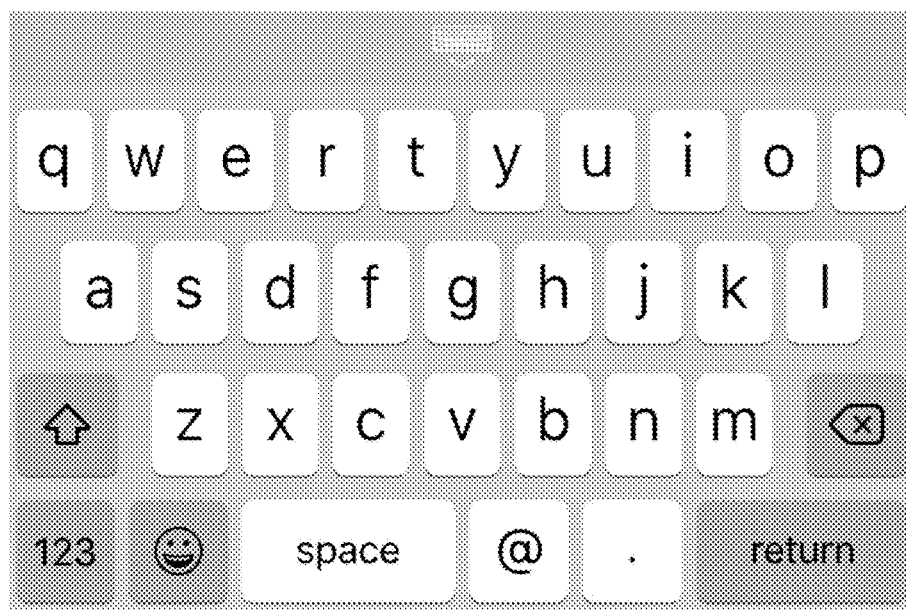
FIG. 44 is an example graphical user interface (GUI) for adding a recipient as a team member, according to yet another example embodiment of the present disclosure.

FIG. 44 shows an example GUI 4400 for adding a recipient as a team member. As depicted in FIG. 44, GUI 4400 may include a text box 4401 for receiving an identifier associated with the recipient (e.g., a name, an email address, a phone number, or the like). As further depicted in FIG. 44, GUI 4400 may include a first button 4403 for receiving a request to add the recipient to a team.

In the example of FIG. 44, GUI 4400 may also include a second button 4405 for receiving a contacts list associated with a user of GUI 4400. Accordingly, second button 4405 may, for example, result in the user being presented with GUI 2700 of FIG. 27 and/or other appropriate GUI for displaying a contacts list.

Figure 45:
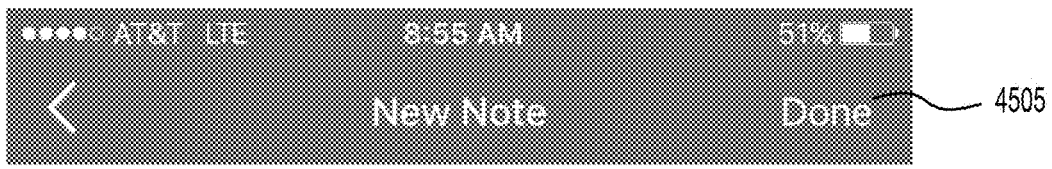
FIG. 45 is an example graphical user interface (GUI) for creating a note, according to yet another example embodiment of the present disclosure.

FIG. 45 shows an example GUI 4500 for creating a note. As depicted in FIG. 45, GUI 4500 may include a first text box 4501 for receiving a title and a second text box 4503 for receiving text content. For example, a title may generally have a length shorter than the text content. By way of further example, a title may generally lack line breaks while the text content may generally contain line breaks. In the example of FIG. 45, the title ("Grocery list") comprises a single line of text while the text content ("Eggs\nBread") contains a single line break. As further depicted in FIG. 45, GUI 4500 may include a button 4505 for receiving a request to create a note.

FIG. 46 shows an example GUI 4600 for creating a task. As depicted in FIG. 46, GUI 4600 may include a first text box 4601 for receiving a title, a second text box 4603 for receiving a start date, and a third text box 4605 for receiving an end date. At least one of second text box 4603 and third text box 4605 may automatically receive text from a date selector 4607. Although the example of FIG. 46 includes second text box 4603 and third text box 4605, other embodiments may include only one text box for receiving a single date.

As further depicted in FIG. 46, GUI 4600 may include a fourth text box 4609 for receiving a time. In some embodiments, fourth text box 4609 may automatically receive text from a time selector (not shown). GUI 4600 may also include a first drop-down box 4611 for selecting one or more repeat settings related to the task (e.g., "never," "every day," "every weekday," "every week," etc.) and may also include a second drop-down box 4613 for selecting one or more completion settings related to the task (e.g., complete when checked, complete when checked by all assignees, complete when 100% done, etc.). GUI 4600 may further include a button 4615 for receiving a request to create a task.

FIG. 47 shows another example GUI 4700 for creating a task. GUI 4600 of FIG. 46 and GUI 4700 of FIG. 47 may be used in combination or separately.

As depicted in FIG. 47, and similar to GUI 4600, GUI 4700 may include a first text box 4701 for receiving a start date, a second text box 4703 for receiving an end date, and a third text box 4705 for receiving a time. In some embodiments, at least one of first text box 4701 and second text box 4703 may automatically receive text from a date selector (not shown). Similarly, third text box 4705 may automatically receive text from a time selector (not shown). Although the example of FIG. 47 includes first text box 4701 and second text box 4703, other embodiments may include only one text box for receiving a single date.

As further depicted in FIG. 47, and similar to GUI 4600, GUI 4700 may include a first drop-down box 4707 for selecting one or more repeat settings related to the task (e.g., "never," "every day," "every weekday," "every week," etc.) and may include a second drop-down box 4709 for selecting one or more completion settings related to the task (e.g., complete when checked, complete when checked by all assignees, complete when 100% done, etc.).

In some embodiments, GUI 4700 may include additional components for receiving options related to the task. For example, as depicted in FIG. 47, GUI 4700 may include a set of checkboxes 4711 for receiving a color selection related to the task, a fourth text box 4713 for receiving section information (which may comprise text) related to the task, and a fifth text box 4715 for receiving a description (which may also comprise text) related to the task. Moreover, similar to GUI 4600, GUI 4700 may further include a button 4717 for receiving a request to create a task.

FIG. 48 shows an example GUI 4800 for creating an event. As depicted in FIG. 48, and similar to GUI 4600 and GUI 4700, GUI 4800 may include a first text box 4801 for receiving a title.

As further depicted in FIG. 48, GUI 4800 may include a second text box 4803 for receiving location information (which may comprise text) related to the event and a third text box 4805 for receiving a description (which may also comprise text) related to the event. In some embodiment, the received location information may be provided to a module or separate application using global position system (GPS) or other location device(s).

As further depicted in FIG. 48, GUI 4800 may include a checkbox 4807 for selecting whether the event is an all-day event or not. Moreover, similar to GUI 4600 and GUI 4700, GUI 4800 may include a first drop-down box 4809 for selecting one or more repeat settings related to the event (e.g., "never," "every day," "every weekday," "every week," etc.).

Similar to GUI 4600 and GUI 4700, GUI 4800 may further include a fourth text box 4811 for receiving a start date and/or time and a fifth text box 4813 for receiving an end date and/or time. In some embodiments, at least one of fourth text box 4811 and fifth text box 4813 may automatically receive text from a date selector (not shown). Similarly, third text box 4705 may automatically receive text from a date selector (not shown), a time selector (not shown), or a combination thereof. Although the example of FIG. 48 includes fourth text box 4811 and fifth text box 4813, other embodiments may include only one text box for receiving a single date and/or time.

As further depicted in FIG. 48, and similar to GUI 4700, GUI 4800 may include a set of checkboxes 4815 for receiving a color selection related to the event and a button 4817 for receiving a request to create an event.

Figure 49:
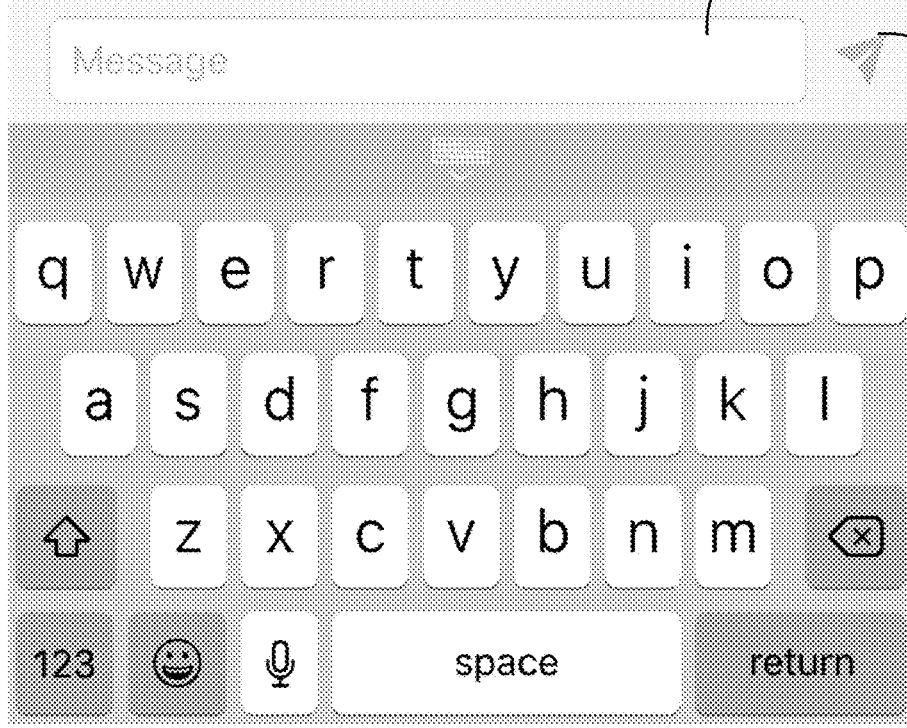
FIG. 49 is an example graphical user interface (GUI) for sending a message to at least one recipient, according to yet another example embodiment of the present disclosure.

FIG. 49 shows an example GUI 4900 for sending a message to at least one recipient. As depicted in FIG. 49, GUI 4900 may include a first text box 4901 for receiving an identifier associated with the at least one recipient (e.g., a name, an email address, a phone number, or the like). GUI 4900 may further include a list of one or more contacts (e.g., contact 4903) stored in a contacts list associated with a user of GUI 4900.

As further depicted in FIG. 49, GUI 4900 may include a second text box 4905 for receiving text content and a button 4907 for submitting a request to send a message. The message may include the text content from second text box 4905 and be addressed to the at least one recipient identified in first text box 4901.

FIG. 50 shows another example GUI 5000 for sending a message to at least one recipient. As depicted in FIG. 50, and similar to GUI 4900, GUI 5000 may include a first text box 5001 for receiving an identifier associated with the at least one recipient. Although the identifier in the example of FIG. 50 is an email address, the identifier may instead be a name, a phone number, or the like.

As further depicted in FIG. 50, and similar to GUI 4900, GUI 5000 may include a second text box 5003 for receiving text content and a button 5005 for submitting a request to send a message. The message may include the text content from second text box 5003 and be addressed to the at least one recipient identified in first text box 5001.

Figure 51:
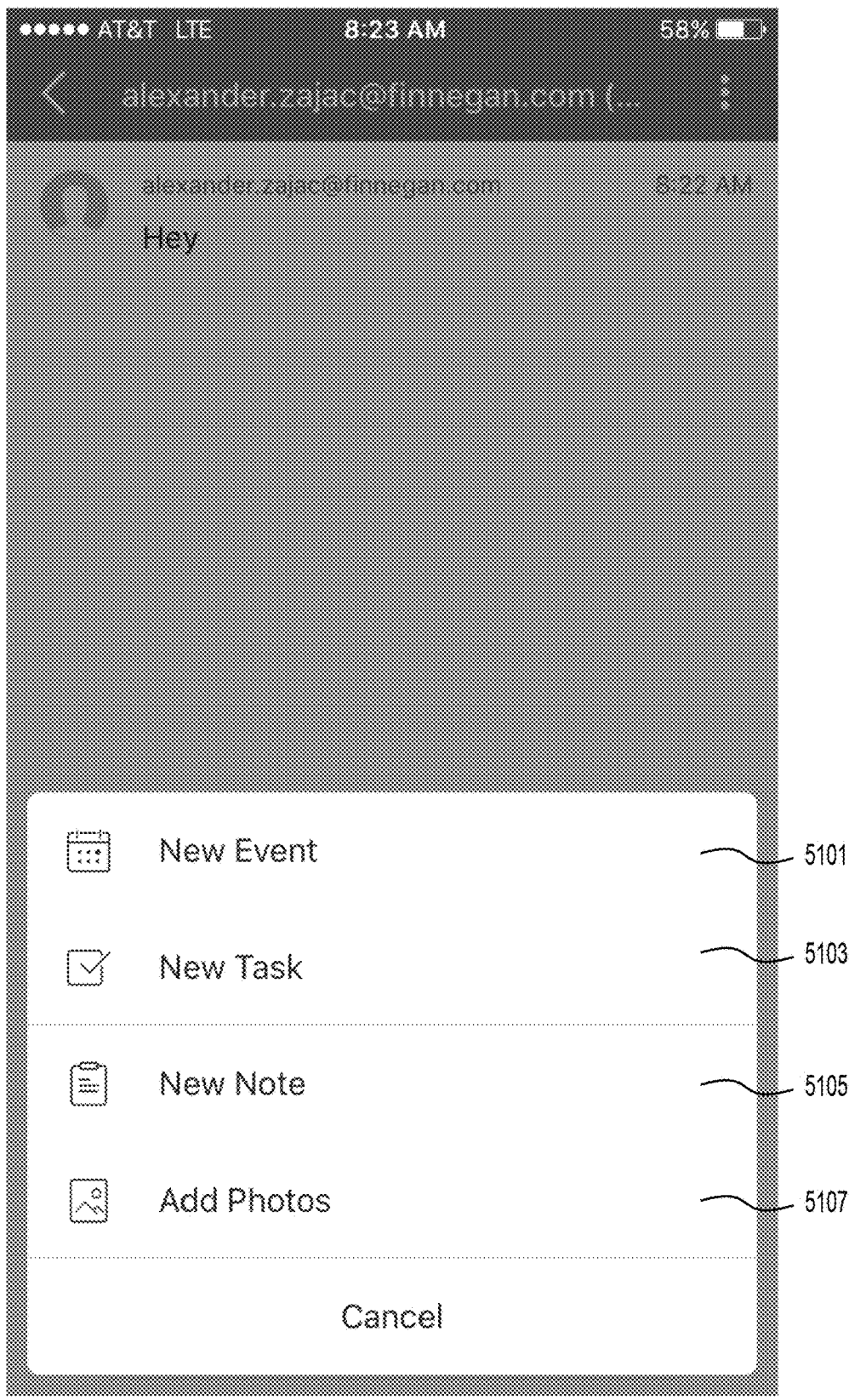
FIG. 51 is another example graphical user interface (GUI) for receiving a request to add an event, task, note, and/or file, according to yet another example embodiment of the present disclosure.

FIG. 51 shows another example GUI 5100 for receiving a request to add an event, task, note, and/or file. As depicted in FIG. 51, and similar to GUI 4300, GUI 5100 may have a first button 5101 for receiving a request to add an event associated with one or more recipients. In some embodiments, first button 5101 may also be used to add a task associated with the team. In other embodiments, like the example depicted in FIG. 51, GUI 5100 may include a second button 5103 separate from first button 5101 for receiving a command to add a task associated with the one or more recipients.

As further depicted in FIG. 51, and similar to GUI 4300, GUI 5100 may also include a third button 5105 for receiving a request to add a note associated with the one or more recipients. In addition, GUI 5100 may further include a fourth button 5107 for receiving a request to add a file associated the one or more recipients. Even though the example of FIG. 51 has a fourth button 5107 for adding a photo, other embodiments may have a fourth button 5107 for adding one or more other types of files, either in addition to or in lieu of photos.

Figure 52:
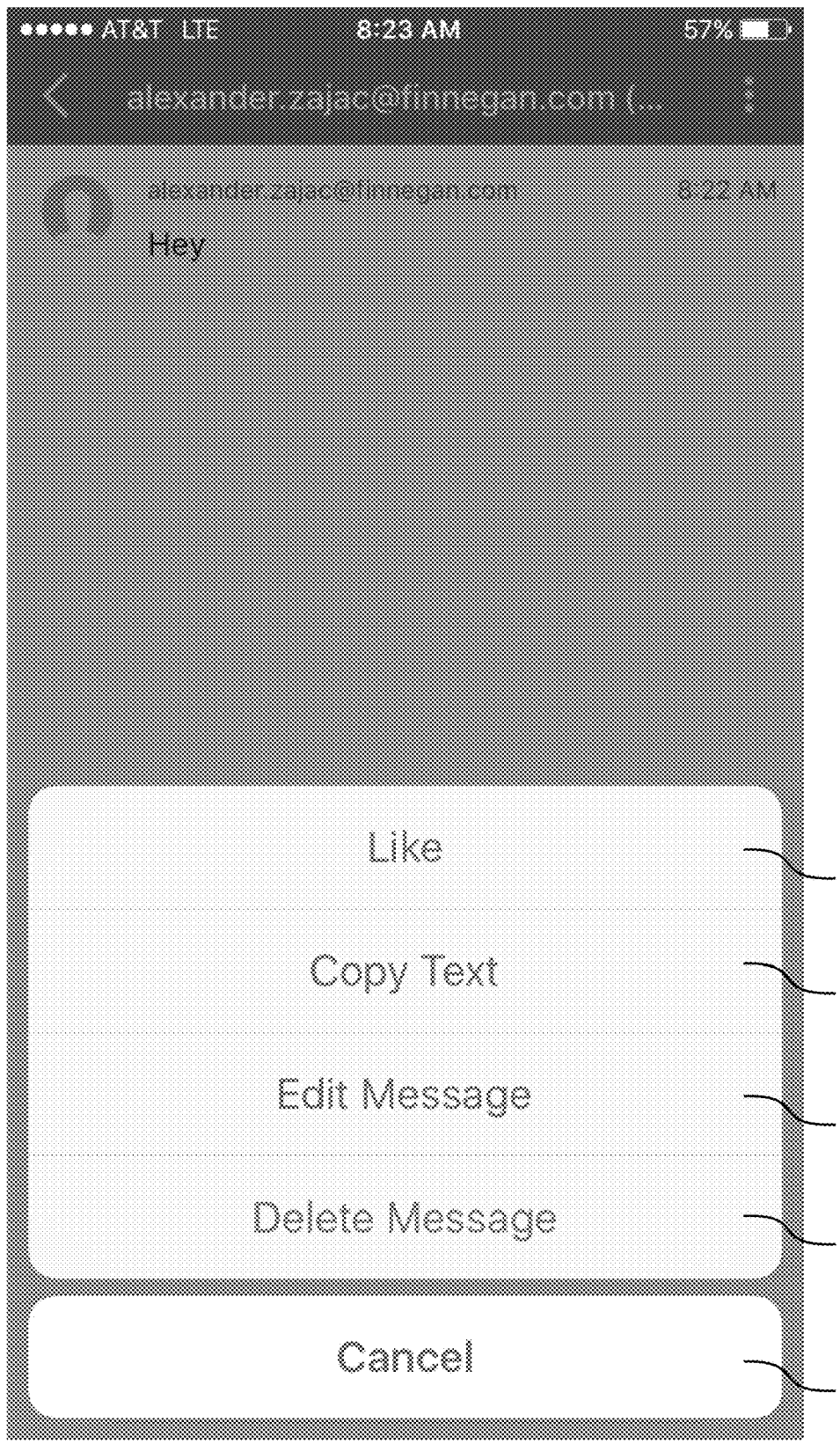
FIG. 52 is another example graphical user interface (GUI) for receiving a request to react to a message, according to yet another example embodiment of the present disclosure.

FIG. 52 shows another example GUI 5200 for receiving a request to react to a message. In the example of FIG. 52, a message (which may be associated with one or more recipients) has been selected by a user of GUI 5200. For example, a user may have left-clicked the message, right-clicked the message, double-clicked the message, tapped the message, held down a finger or stylus on the message, or the like.

As depicted in FIG. 52, and similar to GUI 3700, GUI 5200 may include a first button 5201 for receiving a request to react to the selected message. Even though the reaction in the example of FIG. 52 comprises a "like," other embodiments may include other reactions (such as "unlike," "angry," "happy," "funny," "embarrassed," or the like). As further depicted in FIG. 52, and similar to GUI 3700, GUI 5200 may include other buttons, such as a second button 5203 for placing the text content of the selected message on a clipboard (that is, copying the text content), a third button 5205 for editing the text content of the selected message, and/or a fourth button 5207 for deleting the selected message. A user of GUI 5200 may also deselect the selected message and/or close first button 5201, second button 5203, third button 5205, and fourth button 5207, e.g., by using fifth button 5209.

Figure 53:
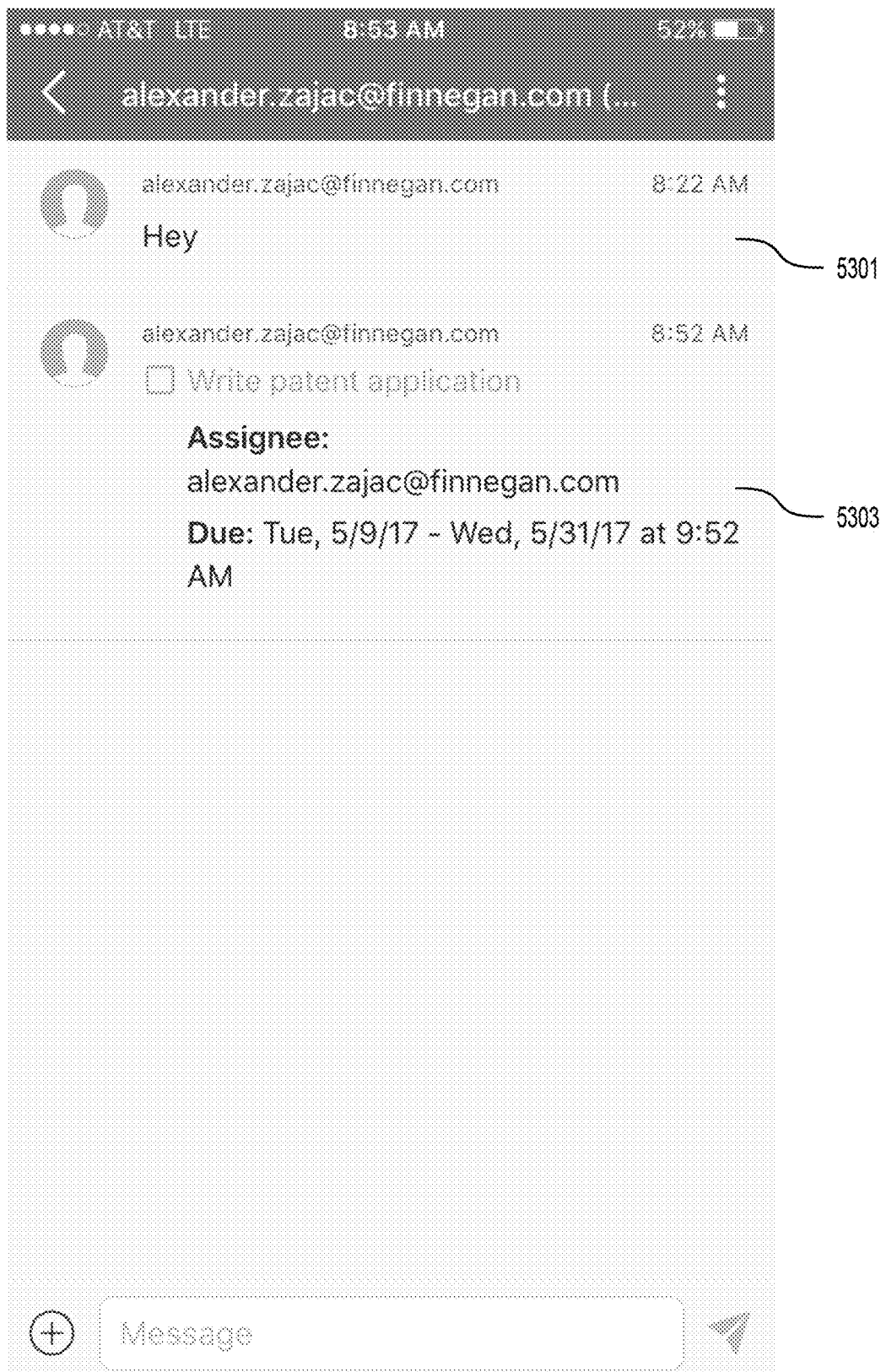
FIG. 53 is an example graphical user interface (GUI) for displaying a chat conversation having one or more recipients, according to yet another example embodiment of the present disclosure.

FIG. 53 shows an example GUI 5300 for displaying a chat conversation having one or more recipients. As depicted in FIG. 53, GUI 5300 may include one or more chat messages (e.g., message 5301) in the chat conversation. For example, for each chat message, the list may include the sender of the chat message, the content of the chat message, a date and/or time of sending the chat message, a date and/or time of receiving the chat message, and the like. As further depicted in FIG. 53, GUI 5300 may include one or more tasks (e.g., task 5303) and/or one or more events (not shown) associated with the chat conversation. For example, for each task, the list may include the title associated with the task, the due date and/or time of the task, one or more assignees associated with the task, and the like.

Figure 54:
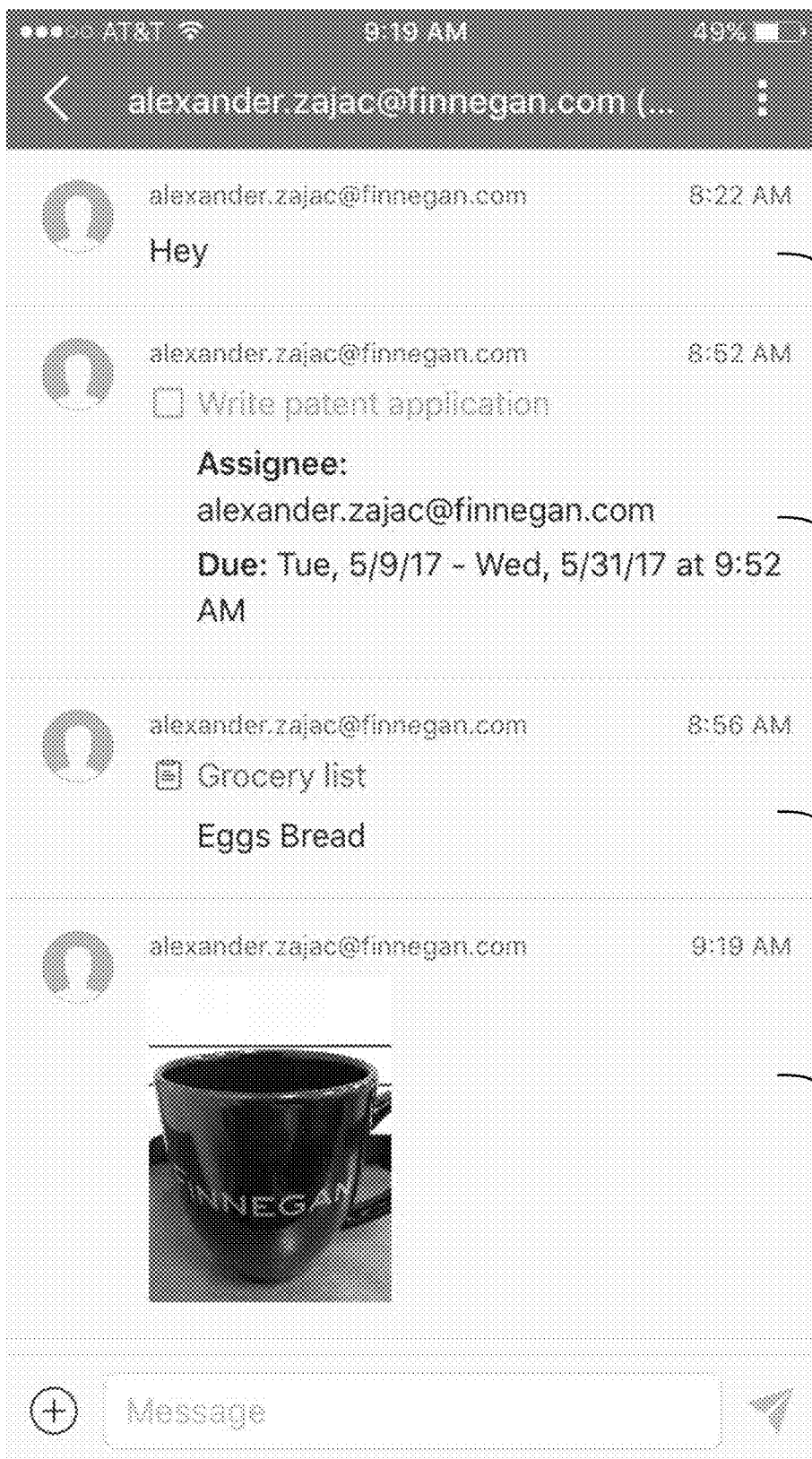
FIG. 54 is another example graphical user interface (GUI) for displaying a chat conversation having one or more recipients, according to yet another example embodiment of the present disclosure.

FIG. 54 shows another example GUI 5400 for displaying a chat conversation having one or more recipients. As depicted in FIG. 54, and similar to GUI 5300, GUI 5400 may include one or more chat messages (e.g., message 5401) in the chat conversation and may include one or more tasks (e.g., task 5403) and/or one or more events (not shown) associated with the chat conversation.

As further depicted in FIG. 54, GUI 5400 may include one or more notes (e.g., note 5405) in the chat conversation. For example, for each note, the list may include the author of the note, the title associated with the note, a sample of the text content associated with the note, and the like. A sample may comprise, for example, a subset of the text content associated with the note.

As further depicted in FIG. 54, GUI 5400 may include one or more files (e.g., file 5407) in the chat conversation. For example, for each file, the list may include the sender of the file, the name of the file, a sample of the file, and the like. In the example of GUI 5400, file 5407 comprises a photo, and the list includes a thumbnail of the photo. Other embodiments with other types of files are possible (e.g., audio, video, etc.), and the sample may vary depending on the type of file (e.g., a sample may comprise an audio clip, a video clip, a video thumbnail, etc.).

Figure 55:
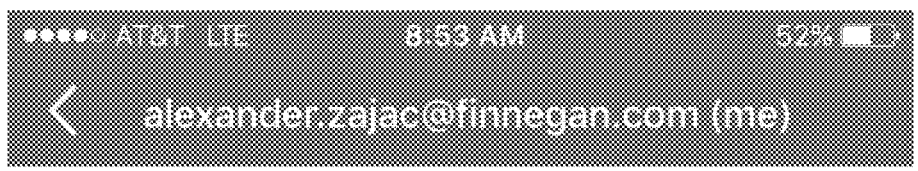
FIG. 55 is an example graphical user interface (GUI) for displaying a list of tasks (or events) associated with one or more recipients, according to yet another example embodiment of the present disclosure.

FIG. 55 shows an example GUI 5500 for displaying a list of tasks (or events) associated with one or more recipients. As depicted in FIG. 55, GUI 5500 may include list of one or more tasks (e.g., task 5501) and/or events (not shown) associated with one or more recipients. For example, for each task, the list may include the title associated with the task, the due date and/or time of the task, one or more assignees associated with the task, and the like. As further depicted in FIG. 55, GUI 5500 may include a button 5503 for receiving a request to add an event and/or a task associated with the one or more recipients.

Figure 56:
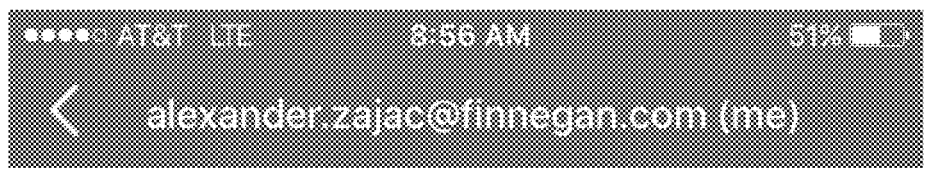
FIG. 56 is an example graphical user interface (GUI) for displaying a list of notes associated with one or more recipients, according to yet another example embodiment of the present disclosure.

FIG. 56 shows an example GUI 5600 for displaying a list of notes associated with a team and/or with one or more recipients. As depicted in FIG. 56, GUI 5600 may include a list of one or more notes (e.g., note 5601) associated with a team and/or with one or more recipients. For example, for each note, the list may include the author of the note, the title associated with the note, a sample of the text content associated with the note, and the like. As further depicted in FIG. 56, GUI 5600 may include a button 5603 for receiving a request to add a note associated with the team and/or with the one or more recipients.

Figure 57:
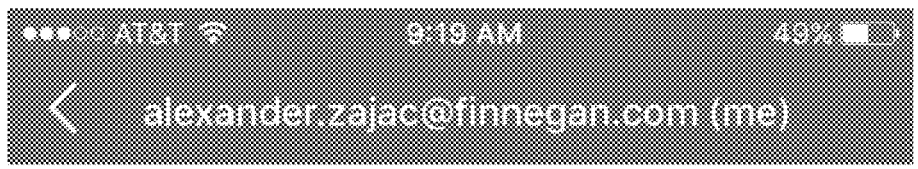
FIG. 57 is an example graphical user interface (GUI) for displaying a list of files associated with one or more recipients, according to yet another example embodiment of the present disclosure.

FIG. 57 shows an example GUI 5700 for displaying a list of files associated with one or more recipients. As depicted in FIG. 57, GUI 5700 may include a list of one or more files (e.g., file 5701) associated with one or more recipients. For example, for each file, the list may include the name of the file, the size of the file, the identity of the user who shared the file, a sample of the file, and the like. GUI 5700 may also include a button (not shown) for receiving a request to add a file associated with the one or more recipients.

FIG. 58 shows an example GUI 5800 for receiving a request to alter a status of a conversation. In the example of FIG. 58, a message 5801 (which, in the example of FIG. 58, may be associated with a team) has been selected by a user of GUI 5800. In the example of FIG. 58, a user has selected message 5801 by swiping a chat conversation or a team including message 5801 to the right. In other embodiments, a user may have swiped the conversation or team to the left, left-clicked the conversation or team, right-clicked the conversation or team, double-clicked the conversation or team, tapped the conversation or team, held down a finger or stylus on the conversation or team, or the like.

As further depicted in FIG. 58, GUI 5800 may further include a button 5803 for receiving a request to alter a status of the chat conversation or team including the selected message. In the example of FIG. 58, button 5803 receives a request to mark the chat conversation or the team including the selected message as "unread"; other embodiments are possible in which button 5803 receives a request to mark the chat conversation or team including the selected message as "new," "seen," "unseen," or the like.

FIG. 59 shows an example GUI 5900 for displaying one or more messages associated with a team having an altered status. In the example of FIG. 59, a list of chat conversations, which may be associated with a team or may be direct conversations having a plurality of recipients is shown. As further depicted in FIG. 59, a chat conversation 5901 having one or more chat messages (which, in the example of FIG. 59, may be associated with a team) has been labeled as "unread" by a user of GUI 5900. In other embodiments, conversation 5901 may have one or more other altered statuses, such as "new," "seen," "unseen," or the like.

As further depicted in FIG. 59, conversation 5901 may further include one or more indicators, e.g., indicator 5903a and indicator 5903b, indicating the altered status of conversation 5901. The example of FIG. 59 further shows the name of the team associated with message 5901 as bolded. Other indicators than those in the example of FIG. 59 are possible.

FIG. 60 shows another example GUI 6000 for receiving a request to alter a status of a conversation. In the example of FIG. 60, a message 6001 (which, in the example of FIG. 60, may be associated with a team) has been selected by a user of GUI 6000. In the example of FIG. 60, a user has selected message 6001 by swiping a chat conversation or a team including message 6001 to the right. In other embodiments, a user may have swiped the conversation or team to the left, left-clicked the conversation or team, right-clicked the conversation or team, double-clicked the conversation or team, tapped the conversation or team, held down a finger or stylus on the conversation or team, or the like.

As further depicted in FIG. 60, GUI 6000 may further include a button 6003 for receiving a request to alter a status of the chat conversation or team including the selected message. In the example of FIG. 60, button 6003 receives a request to mark the chat conversation or the team including the selected message as "read"; other embodiments are possible in which button 6003 receives a request to mark the chat conversation or team including the selected message as "unread," "new," "seen," "unseen," or the like.

FIG. 61 shows yet another example GUI 6100 for receiving a request to alter a status of a conversation. In the example of FIG. 61, a list of chat conversations, which may be associated with a team or may be direct conversations having a plurality of recipients is shown. As further depicted in FIG. 61, a chat conversation 6101 having one or more messages (which, in the example of FIG. 61, may be associated with one or more recipients) has been selected by a user of GUI 6100. In the example of FIG. 61, a user has selected conversation 6101 by swiping conversation 6101 to the left. In other embodiments, a user may have swiped conversation 6101 to the right, left-clicked conversation 6101, right-clicked conversation 6101, double-clicked conversation 6101, tapped conversation 6101, held down a finger or stylus on conversation 6101, or the like.

As further depicted in FIG. 61, GUI 6100 may further include a button 6103 for receiving a request to alter a status of the selected conversation. In the example of FIG. 61, button 6103 receives a request to mark the selected conversation as a "favorite"; other embodiments are possible in which button 6103 receives a request to mark the selected conversation as "read," "unread," "new," "seen," "unseen," or the like.

FIG. 62 shows another example GUI 6200 for displaying a conversation with an altered status. As depicted in FIG. 62, GUI 6200 may show all conversations with a particular status 6201. In the example of FIG. 62, status 6201 is a "favorite" status. In other embodiments, status 6201 may be another status, such as "read," "unread," "new," a "liked" status, etc.

FIG. 63 shows yet another example GUI 6300 for receiving a request to alter a status of a conversation. In the example of FIG. 63, a conversation 6301 (which, in the example of FIG. 63, may be associated with one or more recipients) has been selected by a user of GUI 6300. In the example of FIG. 63, a user has selected conversation 6301 by swiping conversation 6301 to the left. In other embodiments, a user may have swiped conversation 6301 to the right, left-clicked conversation 6301, right-clicked conversation 6301, double-clicked conversation 6301, tapped conversation 6301, held down a finger or stylus on conversation 6301, or the like.

As further depicted in FIG. 63, GUI 6300 may further include a button 6303 for receiving a request to alter a status of the selected conversation. In the example of FIG. 63, button 6303 receives a request to mark the selected conversation as an "unfavorite"; other embodiments are possible in which button 6303 receives a request to mark the selected message as "favorite," "read," "unread," "new," "seen," "unseen," or the like.

FIG. 64 shows an example GUI 6400 for searching teams, contacts, and/or messages. As depicted in FIG. 64, GUI 6400 may include a text box 6401 for receiving a search term. A search term may comprise one or more text characters which is matched against one or more text strings (e.g., a name, an email address, a phone number, text content, and the like) associated with teams (in which a user of GUI 6400 is a member), contacts (on a contacts list associated with a user of GUI 6400), and/or messages (having a user of GUI 6400 as a recipient).

As further depicted in FIG. 64, GUI 6400 may further include a results list 6403. Although empty in GUI 6400, list 6403 may, in other embodiments, include one or more teams, contacts, and/or messages having a text string that matches (at least in part) the search term.

FIG. 65 shows another example GUI 6500 for searching teams, contacts, and/or messages. As depicted in FIG. 65, and similar to GUI 6400, GUI 6500 may include a text box 6501 for receiving a search term. In the example of FIG. 65, the search term is "Te". Other embodiments having different search terms are possible As further depicted in FIG. 65, and similar to GUI 6400, GUI 6500 may further include a results list 6503. In the example of FIG. 65, list 6503 includes a team having a name ("Test Team") that matches, at least in part, the search term ("Te"). In other embodiments, list 6503 may include contacts and/or messages, depending on if the implemented search function searches teams, contacts, messages, or any combination thereof.

FIG. 66 shows an example GUI 6600 for displaying a list of tasks (or events) associated with a user. As depicted in FIG. 66, and similar to GUI 5500, GUI 6600 may include list of one or more tasks (e.g., task 6601) and/or events (not shown) associated with a user of GUI 6600. For example, for each task, the list may include the title associated with the task, the due date and/or time of the task, one or more assignees associated with the task, and the like. Similarly, for each event, the list may include the title associated with the event, the start date and/or time of the event, the end date and/or time of the event, and the like. As further depicted in FIG. 66, and similar to GUI 5500, GUI 6600 may include a button 6603 for receiving a request to add an event and/or a task associated with the user.

Figure 67:
FIG. 67 is an example graphical user interface (GUI) for displaying tasks in a graphical format, according to yet another example embodiment of the present disclosure.

FIG. 67 shows an example GUI 6700 for displaying tasks in a graphical format. As depicted in FIG. 67, GUI 6700 may include a calendar 6701 for receiving a selection of a date or a week from a user of GUI 6700.

As further depicted in FIG. 67, and similar to GUI 5500 and GUI 6600, GUI 6700 may include list of one or more tasks (e.g., task 6703) having a due date matching the selected date or within the selected week. For example, for each task, the list may include the title associated with the task, the due date and/or time of the task, one or more assignees associated with the task, and the like. As further depicted in FIG. 67, and similar to GUI 5500 and GUI 6600, GUI 6700 may include a button 6705 for receiving a request to add a task associated with the user.

Figure 68:
FIG. 68 is another example graphical user interface (GUI) for displaying events in a graphical format, according to yet another example embodiment of the present disclosure.

FIG. 68 shows another example GUI 6800 for displaying events in a graphical format. As depicted in FIG. 68, and similar to GUI 6700, GUI 6800 may include a calendar 6801 for receiving a selection of a date or a week from a user of GUI 6800.

As further depicted in FIG. 68, and similar to GUI 6700, GUI 6800 may include list of one or more events (e.g., event 6803) having a start date and/or end date matching the selected date or within the selected week. For example, for each event, the list may include the title associated with the event, the start date and/or time of the event, the end date and/or time of the event, and the like. As further depicted in FIG. 68, and similar to GUI 6700, GUI 6800 may include a button 6805 for receiving a request to add an event associated with the user.

Figure 69:
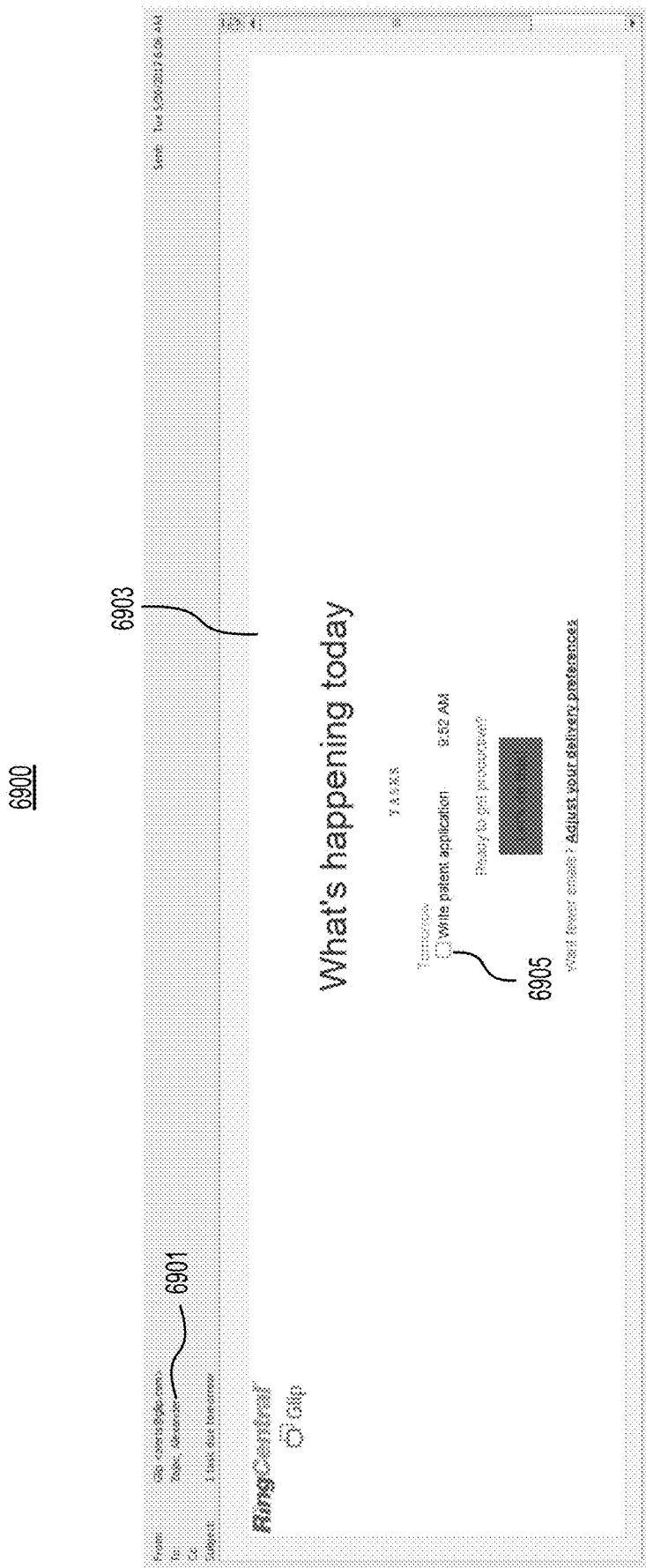
FIG. 69 is an example graphical user interface (GUI) including an example reminder email for an upcoming task (or event), according to yet another example embodiment of the present disclosure.

FIG. 69 shows an example GUI 6900 including an example reminder email for an upcoming task (or event). As depicted in FIG. 69, the email may be addressed to at least one assignee or invitee (e.g., assignee 6901). The email may further include a body 6903 having, for example, information about upcoming task 6905 (e.g., in the example of FIG. 69, task 6905 is "due tomorrow") or an upcoming event (not shown).

Figure 70:
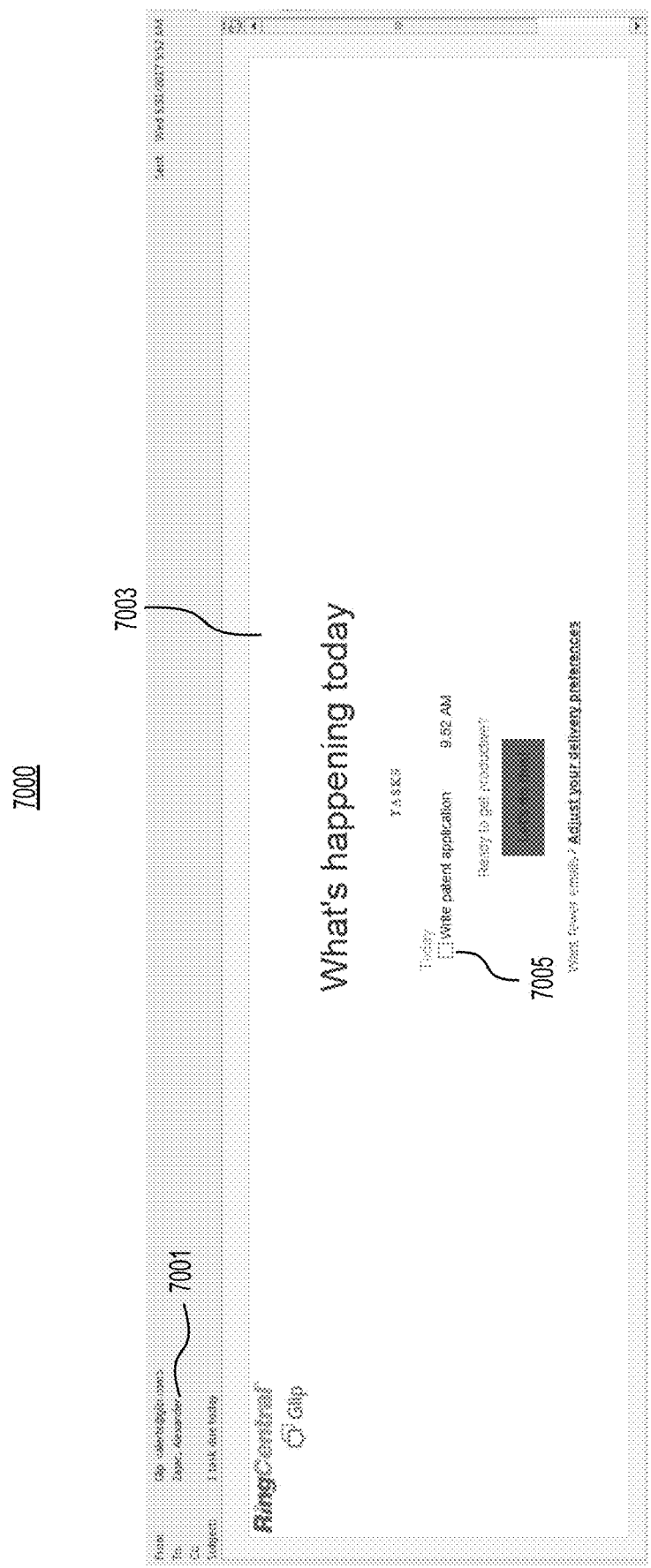
FIG. 70 is another example graphical user interface (GUI) including an example reminder email for an upcoming task (or event), according to yet another example embodiment of the present disclosure.

FIG. 70 shows another example GUI 7000 including an example reminder email for an upcoming task (or event). As depicted in FIG. 70, and similar to GUI 6900, the email may be addressed to at least one assignee or invitee (e.g., assignee 7001). The email may further include a body 7003 having, for example, information about upcoming task 7005 (e.g., in the example of FIG. 70, task 7005 is "due today") or an upcoming event (not shown).

Figure 71:
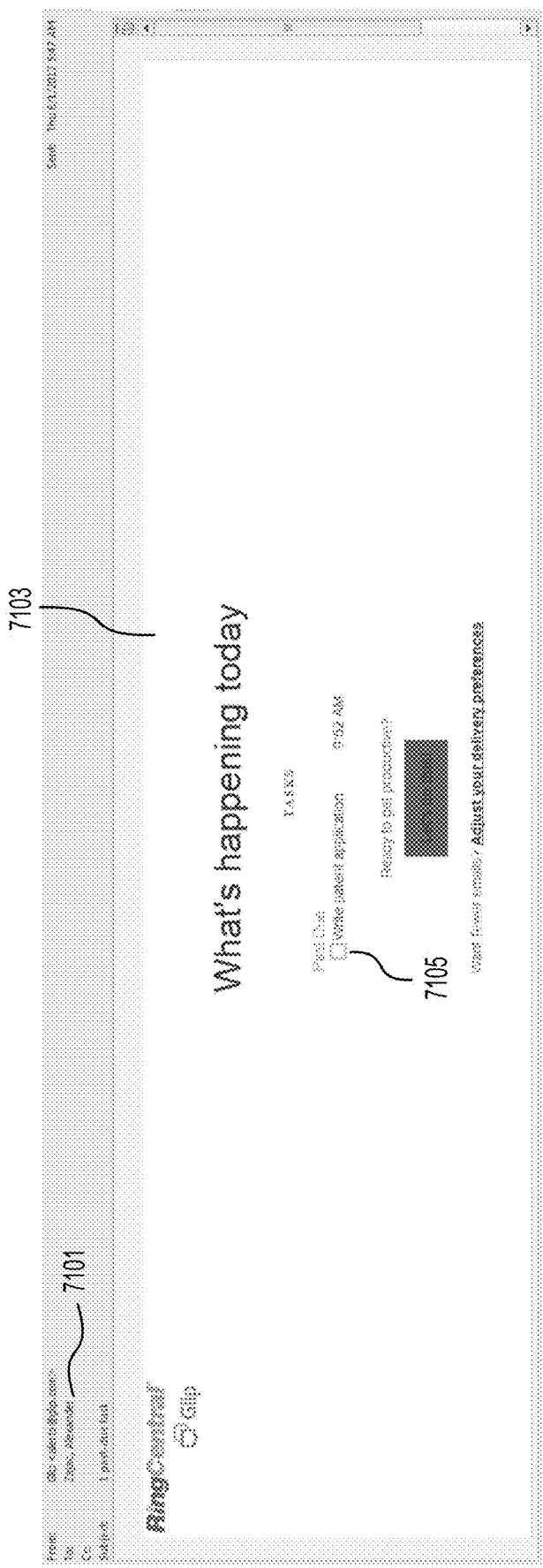
FIG. 71 is an example graphical user interface (GUI) including an example reminder email for a past due task (or event), according to yet another example embodiment of the present disclosure.

FIG. 71 shows an example GUI 7100 including an example reminder email for a past due task (or event). As depicted in FIG. 71, and similar to GUI 6900 and GUI 7000, the email may be addressed to at least one assignee or invitee (e.g., assignee 7101). The email may further include a body 7103 having, for example, information about past due task 7105 (e.g., in the example of FIG. 71, task 7105 is "past-due") or an already-occurred event (not shown).

FIG. 72 is a is a block diagram that illustrates an example of computing system 7200 suitable for implementing the disclosed systems and methods. System 7200 includes a collaboration server 7201. Server 7201 may include email interface 7203 operably connected to an external email server 7205 and SMS interface 7207 operably connected to an external SMS server 7209. Although depicted as separate in FIG. 72, email server 7205 may reside on collaboration server 7201 or at least on the same server farm as server 7201. Similarly, SMS server 7209 may reside on collaboration server 7201 or at least on the same server farm as server 7201.

As depicted in FIG. 72, server 7201 may further include at least one processor, e.g., processor 7211. Processor 7211 may be operably connected to email interface 7203, SMS interface 7207, one or more databases (e.g., database 7215), one or more storage devices (e.g., storage device 7213), an input/output module 7217, memory 7219, and/or other components of server 7201. Email interface 7203, SMS interface 7207, and/or one or more processors 7211 may comprise separate components or may be integrated in one or more integrated circuits.

I/O module 7217 may be operably connected to a keyboard, mouse, touch screen controller, and/or other input controller(s) (not shown). Other input/control devices connected to I/O module 7217 may include one or more buttons, rocker switches, thumb-wheel, infrared port, USB port, and/or a pointer device such as a stylus.

Processor 7211 may also be operably connected to memory 7219. Memory 7219 may include high-speed random access memory and/or non-volatile memory, such as one or more magnetic disk storage devices, one or more optical storage devices, and/or flash memory (e.g., NAND, NOR). Memory 7219 may include one or more programs 7221.

For example, memory 7219 may store an operating system 7225, such as DRAWIN, RTXC, LINUX, iOS, UNIX, OS X, WINDOWS, or an embedded operating system such as VXWorkS. Operating system 7225 may include instructions for handling basic system services and for performing hardware dependent tasks. In some implementations, operating system 7225 may comprise a kernel (e.g., UNIX kernel).

Memory 7219 may also store one or more server applications 7223 to facilitate communicating with one or more additional devices, one or more computers and/or one or more servers. Server applications 7223 may also include instructions to execute one or more of the disclosed methods.

Memory 7219 may also store data 7227. Data 7227 may include transitory data used during instruction execution. Data 7227 may also include data recorded for long-term storage.

Each of the above identified instructions and applications may correspond to a set of instructions for performing one or more functions described above. These instructions need not be implemented as separate software programs, procedures, or modules. Memory 7219 may include additional instructions or fewer instructions. Furthermore, various functions of server 7201 may be implemented in hardware and/or in software, including in one or more signal processing and/or application specific integrated circuits.

Communication functions may be facilitated through one or more network interfaces (e.g., interface 7229). Network interface 7229 may be configured for communications over Ethernet, radio frequency, and/or optical (e.g., infrared) frequencies. The specific design and implementation of network interface 7229 depends on the communication network(s) over which server 7201 is intended to operate. For example, in some embodiments, server 7201 includes wireless/wired network interface 7229 designed to operate over a GSM network, a GPRS network, an EDGE network, a Wi-Fi or WiMax network, and a Bluetooth® network. In other embodiments, server 7201 includes wireless/wired network interface 7229 designed to operate over a TCP/IP network. Accordingly, network 7231 may be any appropriate computer network compatible with network interface 7229.

Communication functions may be further facilitated through one or more telephone interfaces (e.g., interface 7233). For example, telephone interface 7233 may be configured for communication with a telephone server 7235. Telephone server 7235 may reside on collaboration server 7201 or at least on the same server farm as server 7201.

The various components in server 7200 may be coupled by one or more communication buses or signal lines (not shown).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for automatically converting a chat conversation to an email thread, comprising:
    a memory storing instructions; and
    a processor configured to execute the instructions to:
        receive at least one chat conversation,
        receive a request to convert the at least one chat conversation to an email thread,
        determine a plurality of participants from the at least one chat conversation,
        parse the at least one chat conversation to determine a plurality of conversation flows,
        generate a plurality of email threads between the determined participants containing portions of the chat conversation in an order determined by the plurality of conversation flows, wherein to generate the email threads further comprises:
            to determine a number of chat messages that the participant has sent in the chat conversation,
            to compare the number of chat messages to a first threshold and a second threshold,
            to place the participant on a To field of an email in response to determining that the number of chat messages is greater than the first threshold,
            to place the participant on a CC field of the email in response to determining that the number of chat messages is less than the first threshold and greater than the second threshold, and
            to place the participant on a BCC field of the email in response to determining that the number of chat messages is less than the second threshold, and
        transmit the generated email threads to an email host for delivery to the determined participants.

2. The system of claim 1, wherein the processor is further configured to execute the instructions to:
receive an identifier associated with a user,
compare the identifier to a database of known identifiers, and
continue executing the instructions only if the identifier matches a known identifier.

3. The system of claim 1, wherein the processor is further configured to execute the instructions to:
generate a unique confirmation code in response to the request,
transmit the unique confirmation code to a user,
receive a code from the user, and
continue executing the instructions only if the code from the user matches the unique confirmation code.

4. A method for automatically converting a chat conversation to an email thread, comprising:
receiving at least one chat conversation,
receiving a request to convert the at least one chat conversation to an email thread,
determining a plurality of participants from the at least one chat conversation,
parsing the at least one chat conversation to determine a plurality of conversation flows,
generating a plurality of email threads between the determined participants containing portions of the chat conversation in an order determined by the plurality of conversation flows, wherein the generating the email threads further comprises:
determining a number of chat messages that the participant has sent in the chat conversation,
comparing the number of chat messages to a first threshold and a second threshold,
placing the participant on a To field of an email in response to determining that the number of chat messages is greater than the first threshold,
placing the participant on a CC field of the email in response to determining that the number of chat messages is less than the first threshold and greater than the second threshold, and
placing the participant on a BCC field of the email in response to determining that the number of chat messages is less than the second threshold, and
transmitting the generated email threads to an email host for delivery to the determined participants.

5. The method of claim 4, further comprising:
receiving an identifier associated with a user;
comparing the identifier to a database of known identifiers; and
continuing the method only if the identifier matches a known identifier.

6. The method of claim 4, further comprising:
generating a unique confirmation code in response to the request;
transmitting the unique confirmation code to a user;
receiving a code from the user; and
continuing the method only if the code from the user matches the unique confirmation code.

* * * * *